(12) United States Patent
Hori et al.

(10) Patent No.: US 9,154,012 B2
(45) Date of Patent: Oct. 6, 2015

(54) FLUID DYNAMIC BEARING DEVICE AND ASSEMBLY METHOD FOR SAME

(75) Inventors: Masaharu Hori, Kuwana (JP); Jun Hirade, Kuwana (JP); Tatsuya Hayashi, Kuwana (JP); Yasuhiro Yamamoto, Kuwana (JP); Natsuhiko Mori, Kuwana (JP); Fuminori Satoji, Kuwawa (JP); Toshiaki Niwa, Kuwana (JP); Tetsuya Kurimura, Kuwana (JP); Kimihiko Bito, Kuwana (JP)

(73) Assignee: NTN CORPORATION, Osaka-shi (JP)

( * ) Notice: Subject to any disclaimer, the term of this patent is extended or adjusted under 35 U.S.C. 154(b) by 142 days.

(21) Appl. No.: 13/580,091

(22) PCT Filed: Mar. 28, 2011

(86) PCT No.: PCT/JP2011/057631
§ 371 (c)(1),
(2), (4) Date: Aug. 20, 2012

(87) PCT Pub. No.: WO2011/122556
PCT Pub. Date: Oct. 6, 2011

(65) Prior Publication Data
US 2012/0315169 A1    Dec. 13, 2012

(30) Foreign Application Priority Data

Mar. 29, 2010  (JP) .................................. 2010-074454
Apr. 28, 2010  (JP) .................................. 2010-103394
Aug. 23, 2010  (JP) .................................. 2010-186055

(51) Int. Cl.
*F16C 32/06* (2006.01)
*H02K 5/167* (2006.01)
(Continued)

(52) U.S. Cl.
CPC ............ *H02K 5/1672* (2013.01); *F16C 17/107* (2013.01); *F16C 33/107* (2013.01);
(Continued)

(58) Field of Classification Search
CPC .............. F16C 32/0629; F16C 32/0633; F16C 32/0664; F16C 32/0659; F16C 32/0662; F16C 32/0666; F16C 32/0688; F16C 32/067; F16C 32/06; F16C 17/022; F16C 17/026; F16C 17/045; F16C 17/102; F16C 17/107; F16C 35/08; F16C 35/10
USPC ......... 384/107, 209, 112, 113, 606, 425, 114, 384/100, 426; 417/423.12
See application file for complete search history.

(56) References Cited

U.S. PATENT DOCUMENTS 5,941,646 A     8/1999   Mori et al.
6,536,983 B1 *  3/2003   Morefield ..................... 403/278
(Continued)

FOREIGN PATENT DOCUMENTS

JP    10-311331 A      11/1998
JP    2000-249142 A     9/2000
(Continued)

OTHER PUBLICATIONS

Machine translation of JP 2007-051717.*
(Continued)

*Primary Examiner* — Richard W Ridley
*Assistant Examiner* — Yamilka Pinero Medina
(74) *Attorney, Agent, or Firm* — Westerman, Hattori, Daniels & Adrian, LLP

(57) ABSTRACT

Providing a fluid dynamic bearing device, wherein the outer member comprises a member formed by a pressing process on a plate member, the radial bearing surface and at least the one of the thrust bearing surfaces of the outer member being formed by the pressing process, and wherein at least a part of the inner member, which forms the radial bearing surface and the thrust bearing surfaces of the inner member, is made of a sintered metal.

13 Claims, 38 Drawing Sheets

(51) Int. Cl.
*F16C 17/10* (2006.01)
*F16C 33/14* (2006.01)
*F16C 43/02* (2006.01)
*F16C 33/10* (2006.01)
*F16C 33/12* (2006.01)

(52) U.S. Cl.
CPC .............. *F16C33/128* (2013.01); *F16C 33/14* (2013.01); *F16C 43/02* (2013.01); *F16C 2220/04* (2013.01); *F16C 2360/46* (2013.01); *H02K 2205/03* (2013.01); *H02K 2213/09* (2013.01)

(56) References Cited

U.S. PATENT DOCUMENTS

| | | | |
|---|---|---|---|
| 6,554,576 B2 * | 4/2003 | Rennett et al. | ............... 417/44.1 |
| 2003/0091249 A1 | 5/2003 | Kurimura et al. | |
| 2004/0120619 A1 * | 6/2004 | Chai | ............................ 384/420 |
| 2006/0120643 A1 | 6/2006 | Kurimura et al. | |
| 2007/0230843 A1 | 10/2007 | Kurimura et al. | |
| 2008/0107368 A1 | 5/2008 | Kurimura et al. | |
| 2008/0187258 A1 | 8/2008 | Kurimura et al. | |
| 2008/0212906 A1 | 9/2008 | Kurimura et al. | |
| 2008/0267544 A1 | 10/2008 | Engesser et al. | |
| 2009/0142010 A1 | 6/2009 | Ito et al. | |
| 2010/0132197 A1 | 6/2010 | Hori et al. | |
| 2011/0097025 A1 * | 4/2011 | Satoji et al. | ................... 384/100 |
| 2012/0133226 A1 * | 5/2012 | Hori et al. | ...................... 310/90 |

FOREIGN PATENT DOCUMENTS

| | | | | |
|---|---|---|---|---|
| JP | 2001-132738 A | | 5/2001 | |
| JP | 2004-108550 A | | 4/2004 | |
| JP | 2004316926 A | * | 11/2004 | .............. F16C 17/10 |
| JP | 2004-353871 A | | 12/2004 | |
| JP | 2006-189081 A | | 7/2006 | |
| JP | 2006342975 A | * | 12/2006 | |
| JP | 2007-024089 A | | 2/2007 | |
| JP | 2007-051717 A | | 3/2007 | |
| JP | 2007-162950 A | | 6/2007 | |
| JP | 2008-190711 A | | 8/2008 | |
| JP | 2008-267531 A | | 11/2008 | |
| JP | 2008-275159 A | | 11/2008 | |
| JP | 2008-298235 A | | 12/2008 | |
| JP | 2009-008160 A | | 1/2009 | |
| WO | 2009/001960 A1 | | 12/2008 | |

OTHER PUBLICATIONS

Machine Translation of JP 2004-353871.*
Machine Translation of JP H10-311331.*
Machine translation of JP 2007-024089.*
International Search Report for PCT/JP2011/057631, mailing date of Jun. 28, 2011.
Notification of Transmittal of Translation of the International Preliminary Report on Patentabililty (Form PCT/IB/338) of International Application No. PCT/JP2011/057631 mailed Nov. 1, 2012 with Forms PCT/IB/373 and PCT/ISA/237.

* cited by examiner

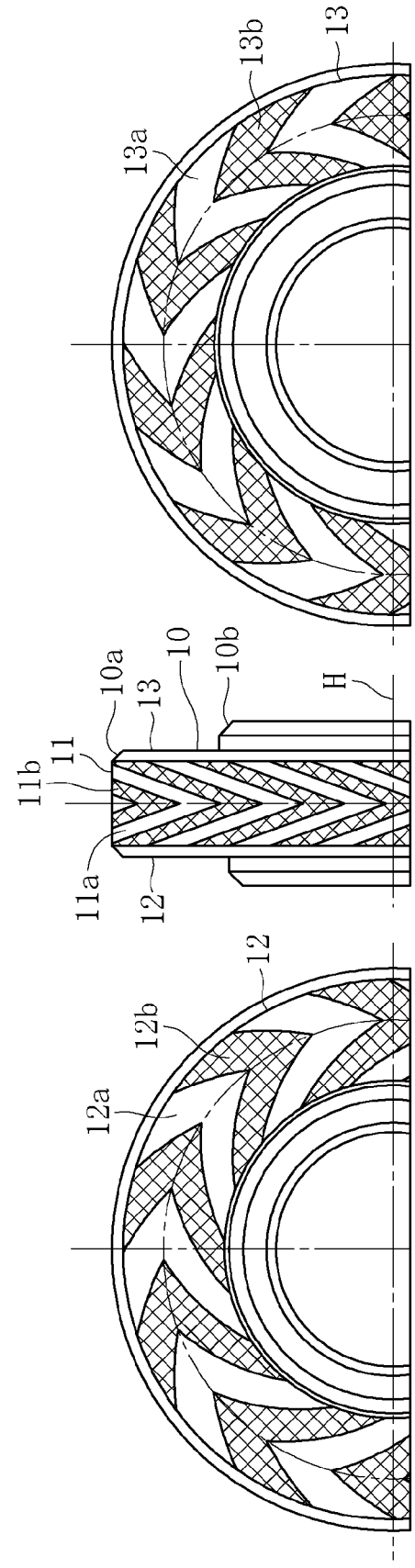

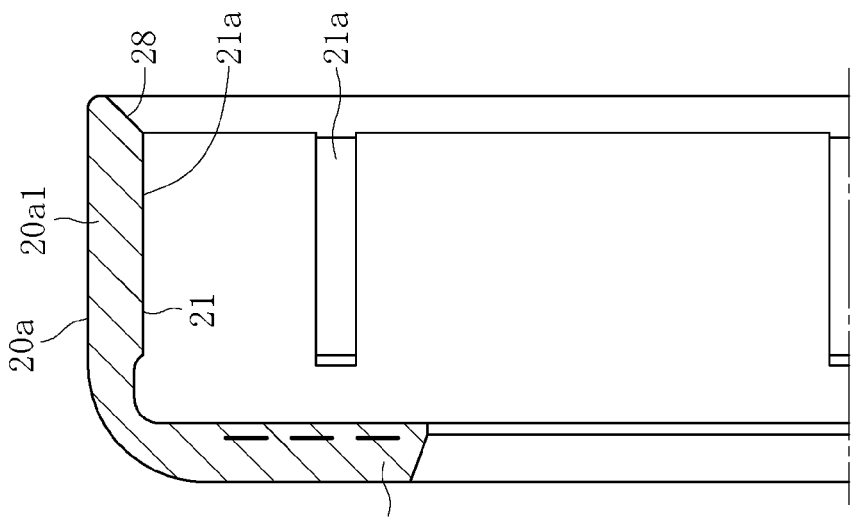
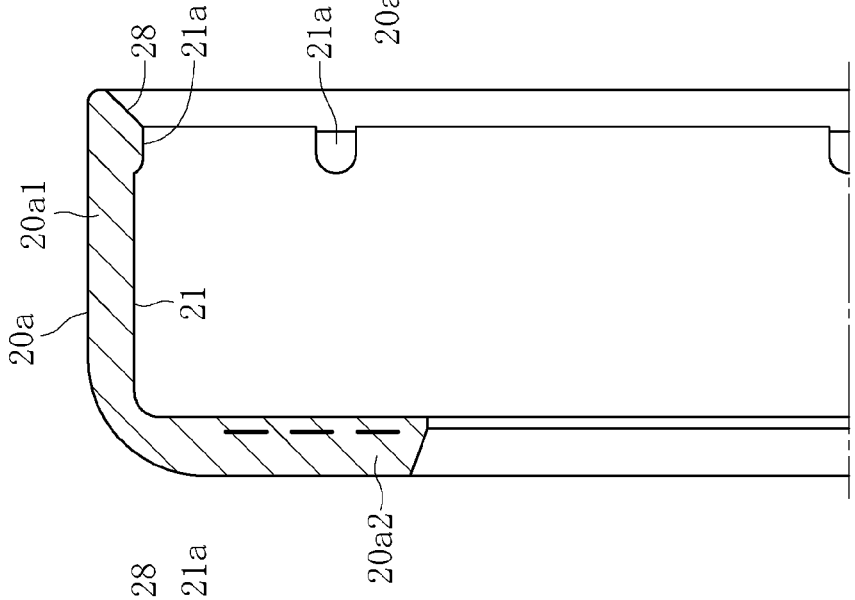
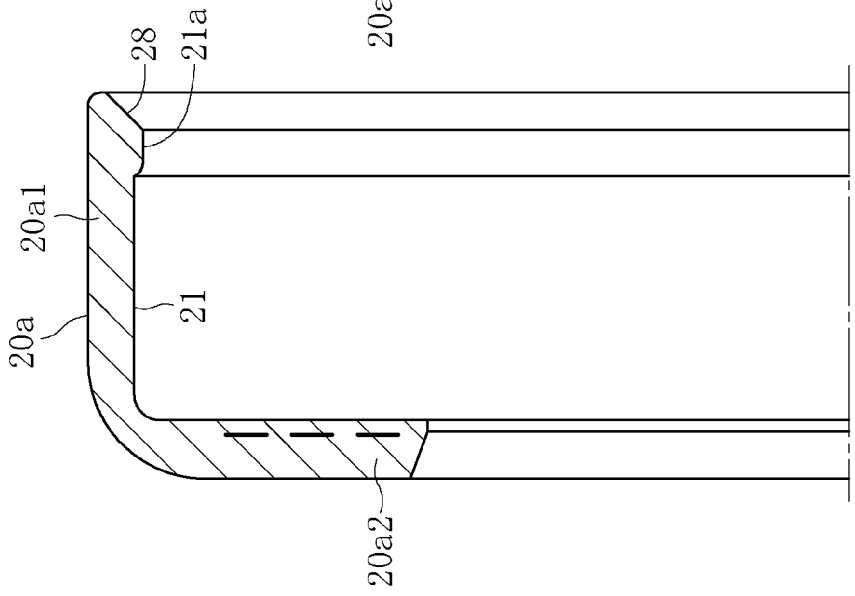

Fig. 39
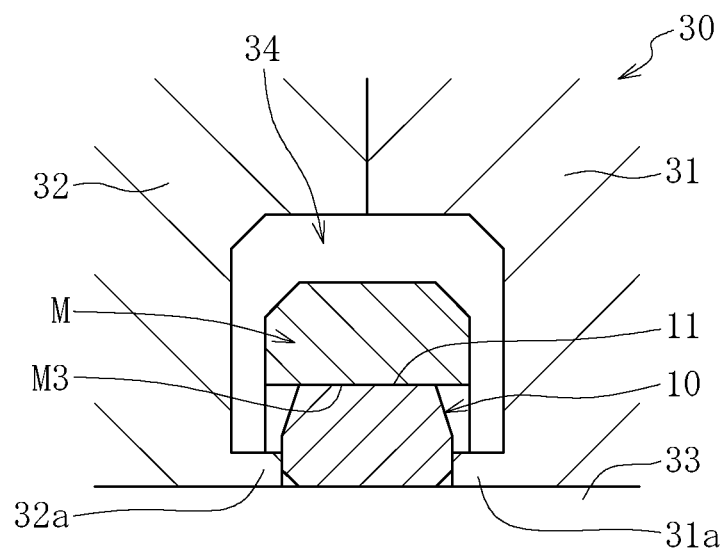
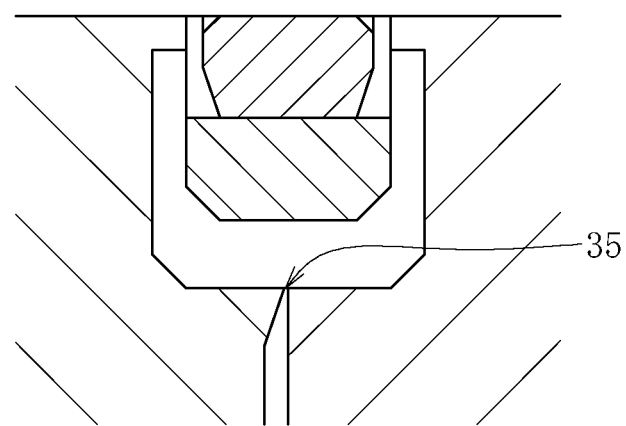

Fig. 45
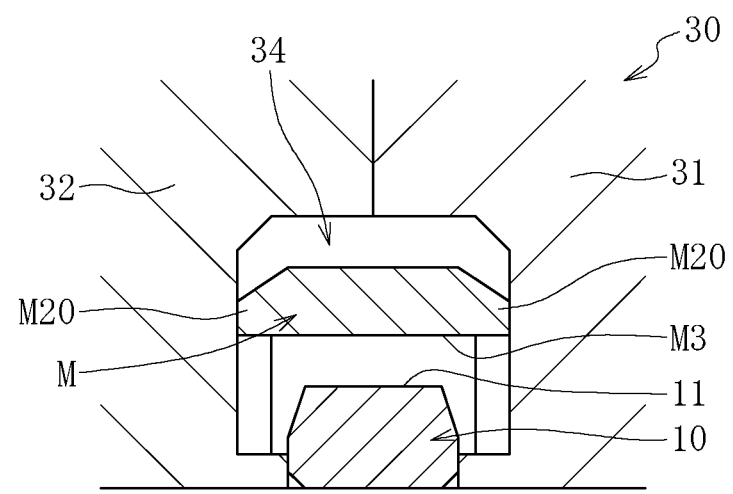
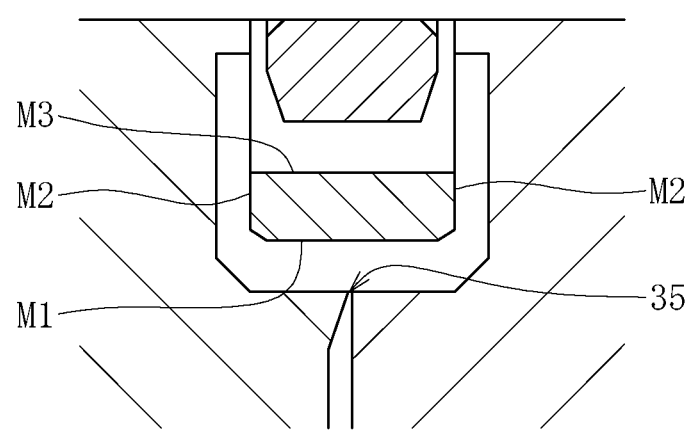

FLUID DYNAMIC BEARING DEVICE AND ASSEMBLY METHOD FOR SAME

TECHNICAL FIELD

The present invention relates to a fluid dynamic bearing device in which an inner member is supported in a freely rotatable manner with a dynamic pressure action of a lubricating oil, which is generated in bearing gaps between the inner member and an outer member.

BACKGROUND ART

A bearing is incorporated in motors to be mounted to electric devices such as an exhaust fan, and the bearing supports a rotary shaft in a freely rotatable manner. For use of this type, there has been generally used what is called a rolling bearing including: an outer race; an inner race; a plurality of rolling elements arranged between the inner and outer races; and a retainer for retaining the rolling elements (for example, Patent Literature 1).

Meanwhile, as a fluid dynamic bearing device, there has been provided a fluid dynamic bearing device including: an outer member formed of a cylindrical bearing ring and bearing plates fitted to both ends of the bearing ring; and an inner bearing plate member arranged on an inside of the outer member (Patent Literature 2).

CITATION LIST

Patent Literature

PTL 1: JP 2000-249142 A
PTL 2: JP 2008-275159 A

SUMMARY OF INVENTION

Technical Problems

By the way, in recent years, houses are becoming more and more airtight. Meanwhile, along with use of chemical-scattering building materials and inadequate ventilation resulting from prevalence of air conditioners, an increase in the number of people who develop what is called sick building syndrome is regarded as a problem. Thus, based on the present Building Standards Act, there is an obligation to install what is called a 24-hour ventilation system for actively and forcibly performing air supply and air exhaust in a house. A main part of this system is built by small exhaust fans installed in respective dwelling rooms, and hence cost reduction of the exhaust fans is an effective measure for reduction of cost for building the system. However, as described above, a roller bearing to be incorporated into exhaust fan motors is formed of a large number of components. Thus, reduction of cost therefor is limited, which is an obstacle to further price reduction of the motors, and by extension, of the exhaust fans.

Further, basically, the exhaust fans in the above-mentioned system are continuously operated, and hence are particularly demanded to be low-noise. However, the roller bearing inevitably involves what is called retainer noise generated by collision of a pocket of a retainer and rolling elements during operation, and friction noise generated when the rolling elements roll on raceway surfaces of inner and outer races. Thus, it is difficult to meet the demand for further quietness.

To address those problems, the inventors of the present invention have focused on fluid dynamic bearing devices. For example, the fluid dynamic bearing device described in Patent Literature 2 includes: an outer member (first bearing member) including a first bearing ring (12), and a pair of first bearing plates (16 and 20) projecting toward an inner diameter side from the first bearing ring (12); and an inner member (second bearing member) including a cylindrical second bearing ring (14) to be mounted to a rotary shaft, and a second bearing plate (18) fixed to an outer peripheral surface of the second bearing ring (14). When the inner member is rotated, a radial bearing gap is formed between an inner peripheral surface of the first bearing ring (12) and the second bearing plate (18), and thrust bearing gaps are formed between the pair of first bearing plates (16 and 20) and the second bearing plate (18). The pair of first bearing plates (16 and 20) and the second bearing plate (18) is engaged with each other in an axial direction. Thus, the inner member is prevented from dropping off from an inner periphery of the outer member. In this way, the fluid dynamic bearing device can be integrated, and hence is more easily assembled into an exhaust fan or the like.

However, in the above-mentioned fluid dynamic bearing device, the outer member includes a large number of components, and hence processing cost and assembly cost for those components are high. Thus, cost reduction is difficult to achieve, and in addition, it is difficult to process dynamic pressure generating grooves with high accuracy.

Further, in the above-mentioned fluid dynamic bearing device, the inner member is arranged in the axial direction between a pair of shoulder surfaces of the outer member. Thus, once the pair of shoulder surfaces is provided to the outer member, the inner member cannot be incorporated in the axial direction between the pair of shoulder surfaces. Therefore, as described above, it is inevitable to form the outer member with a plurality of components (first bearing ring (12) and first bearing plates (16 and 20)). When the fluid dynamic bearing device includes a large number of components as described above, the processing cost for those components and the assembly cost for unifying those components are increased, which contradicts a cost-reduction purpose of employing the fluid dynamic bearing device instead of the roller bearing.

Further, in the fluid dynamic bearing device, when the radial bearing gap and the thrust bearing gaps are not set with high accuracy, pressure of a lubricating oil is not sufficiently increased in the bearing gaps. As a result, the inner member and the outer member may slide in contact with each other, and noise may be generated. However, an attempt to set the bearing gaps with high accuracy so as to avoid such failures involves cumbersome steps, and hence assembly operability is deteriorated. As a result, manufacturing cost increases.

A first invention of the present application has been made to achieve an object to provide a fluid dynamic bearing device which is excellent in quietness and can be manufactured with high accuracy and at low cost, and suitably incorporated, in particular, into a motor for small residential exhaust fans, and to provide an assembly method for the fluid dynamic bearing device.

A second invention of the present application has been made to achieve an object to provide a fluid dynamic bearing device which is excellent in quietness, can be manufactured with high accuracy and at low cost, and facilitates setting of the thrust bearing gaps and assembly, and to provide an assembly method for the fluid dynamic bearing device.

A third invention of the present application has been made to achieve an object to provide a fluid dynamic bearing device which is excellent in quietness and can be manufactured at low cost, and suitably incorporated, in particular, into a motor for small residential exhaust fans.

Solution to Problems (First Invention of the Present Application)

After extensively studying the above-mentioned objects, the inventors of the present application have conceived an idea of forming an outer member having a radial bearing surface and thrust bearing surfaces through a pressing process on a plate member and an idea of making an inner member having a radial bearing surface and thrust bearing surfaces by using a sintered metal.

A first invention of the present application provides a fluid dynamic bearing device, comprising: an outer member having a radial bearing surface and thrust bearing surfaces respectively formed on both axial sides of the radial bearing surface; and an inner member arranged on an inner diameter side with respect to the outer member and having a radial bearing surface and thrust bearing surfaces respectively facing the radial bearing surface of the outer member and the thrust bearing surfaces of the outer member, the radial bearing surface of the outer member and the radial bearing surface of the inner member forming a radial bearing gap therebetween, one of the thrust bearing surfaces of the outer member and one of the thrust bearing surfaces of the inner member forming one thrust bearing gap therebetween, another of the thrust bearing surfaces of the outer member and another of the thrust bearing surfaces of the inner member forming another thrust bearing gap therebetween, the radial bearing gap and the thrust bearing gaps having a lubricating oil interposed therein, wherein the outer member comprises a member formed by a pressing process on a plate member, the radial bearing surface and at least the one of the thrust bearing surfaces of the outer member being formed by the pressing process, and wherein at least a part of the inner member, which forms the radial bearing surface and the thrust bearing surfaces of the inner member, is made of a sintered metal.

As described above, at least one member of the outer member is formed by the pressing process on a plate member, and the radial bearing surface and at least the one of the thrust bearing surfaces are formed by the pressing process. In addition, at least the part of the inner member, which forms the radial bearing surface and the thrust bearing surfaces, is made of a sintered metal. Thus, the fluid dynamic bearing device comprises a small number of components, can be manufactured with high accuracy and at low cost, and is excellent in quietness.

Dynamic pressure generating grooves are formed in the radial bearing surface of the inner member made of a sintered metal, or dynamic pressure generating grooves are formed in each of the radial bearing surface and the thrust bearing surfaces of the inner member. Thus, a rotary shaft can be supported with a dynamic pressure action of the lubricating oil in a non-contact manner, and hence excellent quietness can be achieved.

The inner member is made of a sintered metal, and hence plastic flow generated at the time of forming the dynamic pressure generating grooves in the radial bearing surface of the inner member through a rolling process can be absorbed by inner pores of the sintered metal. Thus, surface swelling caused by the plastic flow is suppressed, and hence the dynamic pressure generating grooves can be formed with high accuracy. Further, the dynamic pressure generating grooves in each of the thrust bearing surfaces of the outer member are formed by the pressing process, and hence the dynamic pressure generating grooves can be formed with high accuracy and at low cost.

The outer member comprises two members including a first outer member and a second outer member. The first outer member has a substantially L-shape in vertical cross-section, and comprises a cylindrical portion and a radial portion provided along one axial end of the cylindrical portion. The radial bearing surface is formed on an inner peripheral surface of the cylindrical portion, and the one of the thrust bearing surfaces is formed on an inside surface of the radial portion. The second outer member has a disk-like shape and an inside surface on which the another of the thrust bearing surfaces is formed. An outer peripheral surface of the second outer member having the disk-like shape is fitted to the inner peripheral surface of the cylindrical portion of the first outer member. With this structure, it is possible to provide a fluid dynamic bearing device which comprises a small number of components, can be manufactured with high accuracy and at low cost, and is excellent in quietness.

Alternatively, the outer member comprises two members including a first outer member and a second outer member. The two members each have a substantially L-shape in vertical cross-section, and each comprise a cylindrical portion and a radial portion provided along one end of the cylindrical portion. The one of the thrust bearing surfaces is formed on an inside surface of the radial portion of the first outer member. The radial bearing surface is formed on an inner peripheral surface of the cylindrical portion of the second outer member. The another of the thrust bearing surfaces is formed on an inside surface of the radial bearing surface of the second outer member. An outer peripheral surface of the cylindrical portion of the second outer member is fitted to an inner peripheral surface of the cylindrical portion of the first outer member. Thus, a fitting length between the first outer member and the second outer member can be secured, and hence accuracy and a coupling condition can be improved.

Even when being provided with herringbone-patterned dynamic pressure generating grooves for a uni-directional rotation, the first outer member and the second outer member respectively have surfaces different from each other in hue for identification of a rotational direction, which can prevent failures in assembly.

An end surface of the cylindrical portion of the first outer member is positioned to be lower than an outside surface of the radial portion of the second outer member. Thus, an adhesive is easily injected.

Any one of the inner peripheral surface of the cylindrical portion of the first outer member and the outer peripheral surface of the cylindrical portion of the second outer member comprises a projection portion. Thus, the first outer member and the second outer member can be press-fitted to each other without comprising accuracy. Further, in terms of securing sealability, this structure is suitable for continuous injection of an adhesive for bonding.

A copper-iron based material is used as a material for the sintered metal of the part of the inner member which forms the bearing surfaces, and a formulation ratio of the copper is set to range from 20% to 80%. When the formulation ratio of the copper is less than 20%, there arise problems with formability of the dynamic pressure generating grooves and lubricity therein. Meanwhile, when the formulation ratio of the copper exceeds 80%, it is difficult to secure abrasion resistance. Therefore, it is desired that the formulation ratio of the copper be set to range from 20% to 80%. Note that, when a sleeve portion to be fitted to the shaft is provided as a separate member and a sintered metal is used also as a material for the sleeve portion, this material is not limited to the above-mentioned copper-iron based material, and an iron based material may be employed. Further, in comprehensive consideration of abrasion resistance, combination of the sleeve portion and the shaft, ease of setting surface pore rates of necessary parts, and the like, materials of the same type or materials of different types can be combined and selected.

A surface pore rate of the radial bearing surface made of a sintered metal is set to range from 2% to 20%. When the surface pore rate is less than 2%, the lubricating oil does not sufficiently circulate. Meanwhile, when the surface pore rate exceeds 20%, pressure of the lubricating oil decreases. Therefore, it is desired that the surface pore rate be set to range from 2% to 20%.

In the case where the inner member made of a sintered metal comprises the projecting portion forming the radial bearing surface and the thrust bearing surfaces and the sleeve portion fitted to the shaft, when those two parts are formed of a single member, an advantage of formability of a sintered metal can be obtained. In addition, the number of components can be further reduced.

In the case where the inner member made of a sintered metal comprises the projecting portion forming the radial bearing surface and the thrust bearing surfaces and the sleeve portion fitted to the shaft, when those two parts are formed of separate members, formability of a sintered metal can be further enhanced.

After the lubricating oil is injected into an inside of the fluid dynamic bearing device, an amount of the lubricating oil is adjusted at a temperature exceeding a use temperature range. Thus, at the time of use, leakage of the lubricating oil to the outside by thermal expansion can be prevented.

An exhaust fan motor comprises: the fluid dynamic bearing device according to the present invention, which comprises fluid dynamic bearing devices arranged apart from each other in an axial direction; and a motor rotor arranged between the fluid dynamic bearing devices adjacent to each other. Thus, it is possible to provide a quiet exhaust fan motor to which a fluid dynamic bearing device of an integrated type can be easily assembled.

Another invention of the present application provides an assembly method for a fluid dynamic bearing device, the fluid dynamic bearing device comprising: an outer member having a radial bearing surface and thrust bearing surfaces respectively formed on both axial sides of the radial bearing surface; and an inner member arranged on an inner diameter side with respect to the outer member and having a radial bearing surface and thrust bearing surfaces respectively facing the radial bearing surface of the outer member and the thrust bearing surfaces of the outer member, the radial bearing surface of the outer member and the radial bearing surface of the inner member forming a radial bearing gap therebetween, one of the thrust bearing surfaces of the outer member and one of the thrust bearing surfaces of the inner member forming one thrust bearing gap therebetween, another of the thrust bearing surfaces of the outer member and another of the thrust bearing surfaces of the inner member forming another thrust bearing gap therebetween, the outer member comprising two members including a first outer member and a second outer member, the thrust bearing surfaces of the outer member being formed respectively on an inside surface of the first outer member and an inside surface of the second outer member, the assembly method comprising: bringing the one of the thrust bearing surfaces of the inner member into abutment against the thrust bearing surface of the first outer member, and then spacing the inner member apart from the first outer member by a total amount of the thrust bearing gaps; and pushing, while maintaining the spacing, the second outer member into the first outer member until the thrust bearing surface of the second outer member abuts against the another of the thrust bearing surfaces of the inner member. Such an assembly method for a fluid dynamic bearing device enables the thrust bearing gaps to be set easily and with high accuracy.

In an assembly method to be applied to a fluid dynamic bearing device in which the inner member comprises, as separate members: a projecting portion having the radial bearing surface and the thrust bearing surfaces; and a sleeve portion fitted to a rotary shaft, the bringing the one of the thrust bearing surfaces of the inner member into abutment against the thrust bearing surface of the first outer member comprises bringing the one of the thrust bearing surfaces of the projecting portion of the inner member into abutment against the thrust bearing surface of the first outer member, and then press-fitting the sleeve portion to the projecting portion. Such an assembly method for a fluid dynamic bearing device enables the press-fitting the sleeve portion to the projecting portion and setting the thrust bearing gaps to be performed simultaneously.

More specifically, the bringing the one of the thrust bearing surfaces of the projecting portion of the inner member into abutment against the thrust bearing surface of the first outer member comprises: setting the first outer member on a placing surface of a first jig having the placing surface and a bottom surface; inserting the projecting portion of the inner member into the first outer member so that the projecting portion of the inner member abuts against the thrust bearing surface of the first outer member; press-fitting, after the inserting, the sleeve portion to the projecting portion until an end surface of the sleeve portion abuts against the bottom surface of the first jig; setting, after the press-fitting, a set of the first outer member and the inner member on a placing surface of a second jig, the second jig having the placing surface and a bottom surface different from the placing surface and the bottom surface of the first jig; and bringing the end surface of the sleeve portion into abutment against the bottom surface of the second jig so that the inner member is spaced apart from the first outer member by the total amount of the thrust bearing gaps. According to this assembly method, the simple first jig and second jig are used, and hence the thrust bearing gaps can be set easily and with high accuracy.

In an assembly method to be applied to a fluid dynamic bearing device in which the inner member comprises an integral structure, the bringing the one of the thrust bearing surfaces of the inner member into abutment against the thrust bearing surface of the first outer member is performed by using a fixing jig and a moving jig, and comprises: setting the first outer member on the fixing jig; inserting the inner member into the first outer member so that the inner member abuts against the thrust bearing surface of the first outer member; and spacing upward, after the inserting, by using the moving jig, the inner member apart from the first outer member by the total amount of the thrust bearing gaps. According to this assembly method, by adjusting a moving distance of the moving jig, setting of the thrust bearing gaps can be adjusted.

When the an assembly method further comprises injecting an adhesive under a state in which the second outer member is pushed in the first outer member, the adhesive for performing fixation while securing sealability can be injected efficiently.

(Second Invention of the Present Application)

A second invention of the present application provides a fluid dynamic bearing device, comprising: an outer member having a radial bearing surface and one thrust bearing surface formed on one axial side of the radial bearing surface, and another thrust bearing surface formed on another axial side of the radial bearing surface; and an inner member arranged on a radially inner side with respect to the outer member and having a radial bearing surface, one thrust bearing surface, and another thrust bearing surface respectively facing the radial bearing surface of the outer member, the one thrust bearing surface of the outer member, and the another thrust bearing surface of the outer member, the radial bearing surface of the outer member and the radial bearing surface of the inner member forming a radial bearing gap therebetween, the one thrust bearing surface of the outer member and the one thrust bearing surface of the inner member forming one thrust bearing gap therebetween, the another thrust bearing surface of the outer member and the another thrust bearing surface of the inner member forming another thrust bearing gap therebetween, the radial bearing gap and the thrust bearing gaps having a lubricating oil interposed therein, wherein the outer member comprises an outside outer member and an inside outer member, the inside outer member being provided with the radial bearing surface and the one thrust bearing surface, the outside outer member being provided with the another thrust bearing surface, wherein at least a part of the inner member, which forms the radial bearing surface, the one thrust bearing surface, and the another thrust bearing surface, is made of a sintered metal, wherein an inner peripheral surface of the outside outer member and an outer peripheral surface of the inside outer member are assembled by being fitted to each other, and wherein at least one of the inner peripheral surface of the outside outer member and the outer peripheral surface of the inside outer member comprises a projection portion for temporary fixation.

As described above, the outer member comprises the outside outer member and the inside outer member, the inside outer member being provided with the radial bearing surface and the one thrust bearing surface, the outside outer member being provided with the another thrust bearing surface. In addition, at least the part of the inner member, which forms the radial bearing surface, the one thrust bearing surface, and the another thrust bearing surface, is made of a sintered metal. Thus, the fluid dynamic bearing device comprises a small number of components, can be manufactured with high accuracy and at low cost, and is excellent in quietness. Further, with regard to fitting assembly between the inner peripheral surface of the outside outer member and the outer peripheral surface of the inside outer member, at least one of the inner peripheral surface of the outside outer member and the outer peripheral surface of the inside outer member comprises the projection portion for temporary fixation. Thus, the thrust bearing gaps are easily set in the fluid dynamic bearing device, and the fluid dynamic bearing device itself is easily assembled. Further, the outside outer member and the inside outer member can be press-fitted to each other without compromising accuracy. Still further, in terms of securing sealability, this structure is suitable for continuous injection of an adhesive for bonding.

When dynamic pressure generating grooves are formed in each of the radial bearing surface of the inner member and the one thrust bearing surface and the another thrust bearing surface of the outer member, or when dynamic pressure generating grooves are formed in each of the radial bearing surface, the one thrust bearing surface, and the another thrust bearing surface of the inner member while the radial bearing surface, the one thrust bearing surface, and the another thrust bearing surface of the outer member are each formed of a smooth surface, the dynamic pressure generating grooves are formed with high accuracy by a rolling process or a pressing process. Thus, a rotary shaft is supported with a dynamic pressure action of the lubricating oil in a non-contact manner, and hence excellent quietness can be achieved.

Specifically, the outside outer member and the inside outer member each have a substantially L-shape in vertical cross-section, and each comprise a cylindrical portion and a radial portion provided along one end of the cylindrical portion, and an inner peripheral surface of the cylindrical portion of the outside outer member and an outer peripheral surface of the cylindrical portion of the inside outer member are fitted to each other. Further, at least one of the inner peripheral surface of the cylindrical portion of the outside outer member and the outer peripheral surface of the cylindrical portion of the inside outer member comprises the projection portion for temporary fixation. Thus, the outside outer member and the inside outer member each can be easily manufactured through a pressing process on a plate member. In addition, temporary fixation can be stably performed, and fixation can be firmly performed by bonding.

Further, the projection portion for temporary fixation is provided at an opening end of the inner peripheral surface of the cylindrical portion of the outside outer member or the outer peripheral surface of the cylindrical portion of the inside outer member. Thus, the projection portion can be easily processed, and deformation of the outside outer member and the inside outer member can be suppressed.

The projection portion for temporary fixation is formed into a shape of an annular circumferential projection, a linear protrusion extending in the axial direction, or a fracture surface formed by a pressing process. When the projection portion is provided partially in the circumferential direction, it is desired that the projection portion comprise projection portions provided at least at three points in the circumferential direction.

An indicator for identifying the rotational direction is provided on an outer surface of the fluid dynamic bearing device. Thus, failures in assembly in the rotational direction are prevented, and an assembly operation can be efficiently performed. In addition, a rotational direction of a product in a finished-product state can be easily identified, and hence an incorporating operation with respect to the fluid dynamic bearing device can be efficiently performed.

As preferred examples of the indicator for identifying the rotational direction, there may be employed an identification groove formed in an end surface of the inner member, and a mark obtained by varying outer diameter dimensions of both end portions of the inner member.

With regard to assembly, there is employed an assembly method comprising, in the following order: arranging the inner member on an inner periphery of the inside outer member; temporarily fixing the outside outer member and the inside outer member under a state in which the thrust bearing gaps are set by fitting the inner peripheral surface of the outside outer member and the outer peripheral surface of the inside outer member to each other and by press-fitting the projection portion provided to one of the inner peripheral surface of the outside outer member and the outer peripheral surface of the inside outer member to another of the inner peripheral surface of the outside outer member and the outer peripheral surface of the inside outer member; and injecting and curing an adhesive between the inner peripheral surface of the outside outer member and the outer peripheral surface of the inside outer member. With this assembly method, the thrust bearing gaps can be easily set in the fluid dynamic bearing device, and the fluid dynamic bearing device itself can be easily assembled. In addition, assembly operability can be enhanced.

An exhaust fan motor comprises: the fluid dynamic bearing device according to the present invention, which comprises a plurality of fluid dynamic bearing devices arranged apart from each other in the axial direction; and a motor rotor arranged between the fluid dynamic bearing devices adjacent to each other. Thus, it is possible to provide a quiet exhaust fan motor to which a fluid dynamic bearing device of an integrated type can be easily assembled.

(Third Invention of the Present Application)

A third invention of the present application provides a fluid dynamic bearing device, comprising: an inner member made of a metal; and an outer member arranged on an outer diameter side with respect to the inner member and having: a large-diameter inner peripheral surface facing an outer peripheral surface of the inner member in a radial direction; small-diameter inner peripheral surfaces respectively provided on both axial sides of the large-diameter inner peripheral surface; and a pair of shoulder surfaces formed between the large-diameter inner peripheral surface and the small-diameter inner peripheral surfaces and facing both axial end surfaces of the inner member in an axial direction; a radial bearing gap formed between an outer peripheral surface of the inner member and the large-diameter inner peripheral surfaces of the outer member in accordance with rotation of the inner member; and thrust bearing gaps formed respectively between both the axial end surfaces of the inner member and the pair of shoulder surfaces of the outer member, wherein the outer member comprises a resin molded product formed by injection molding with use of the inner member as an insert component.

As described above, when the outer member is formed by injection molding with use of the inner member as an insert component, the outer member can be molded together with the pair of shoulder surfaces. Simultaneously, the inner member can be assembled to the outer member between the pair of shoulder surfaces in the axial direction. Therefore, the number of components and assembly man-hours can be reduced.

When the outer member is formed by injection molding of a resin with use of the inner member as an insert component, immediately after the injection molding, the resin molded portion of the outer member remains adhering to the inner member. However, molding shrinkage of the resin molded portion of the outer member enables the resin molded portion to separate from the inner member. For example, when the pair of shoulder surfaces is separated from the inner member by molding shrinkage in the axial direction of the resin molded portion, the thrust bearing gaps can be formed. With this, without requiring an additional step of setting bearing gaps, the thrust bearing gaps can be set simply and with high accuracy.

Further, when the outer member is formed by injection molding under a state in which a core metal is provided in the outer member, in addition to the inner member, the core metal arranged on the outer diameter side with respect to the inner member is also used as the insert component. Thus, the radial bearing gap can be easily formed between the large-diameter inner peripheral surface of the outer member and the outer peripheral surface of the inner member.

Specifically, when, for example, the radial bearing gap is formed between an inner peripheral surface of the core metal and the outer peripheral surface of the inner member, by setting a gap (difference in diameter) between the inner peripheral surface of the core metal, which is supplied as an insert component into a molding die set, and the outer peripheral surface of the inner member to such an extent that an injected material (molten resin) cannot intrude (for example, 50 μm or less), it is possible to avoid this gap being closed by a resin. As a result, this gap can function as the radial bearing gap.

Meanwhile, when the radial bearing gap is formed between the resin molded portion of the outer member and the inner member, the resin intrudes between the inner peripheral surface of the core metal and the outer peripheral surface of the inner member, which are arranged in a cavity of the molding die set. Thus, under a state immediately after injection molding, the resin molded portion (large-diameter inner peripheral surface of the outer member) remains adhering to the outer peripheral surface of the inner member. After that, molding shrinkage of the resin occurs in the radial direction from the core metal as a reference, and the resin between the core metal and the inner member shrinks to the core metal side (outer diameter side). In this way, the resin molded portion separates from the outer peripheral surface of the inner member, with the result that the radial bearing gap is formed therebetween.

Further, as illustrated in FIG. 40, when an axial end surface M2 of a core metal M is arranged on an axially outer side (left side of FIG. 40) with respect to an end surface 13 of an inner member 10 (shoulder surface 23 of an outer member 20), molding shrinkage can be generated in a direction in which the shoulder surface 23 of the outer member 20 is moved axially outward with corresponding one of both the axial end surfaces M2 of the core metal M as a reference. In other words, the shrinkage occurs in a direction in which the resin concentrates on both axial end portions (dotted line portion) of the core metal M. Thus, the shoulder surface 23 of the outer member 20, which has remained adhering to the inner member 10, retracts in a direction in which the shoulder surface 23 separates from the inner member 10. In this way, the shoulder surface 23 can be reliably separated from the inner member 10.

When the core metal in the outer member is made of a sintered metal, dimensional accuracy of the core metal can be enhanced. In particular, when the core metal faces the radial bearing gap, the lubricating oil impregnated in inner pores of the core metal made of a sintered metal can be supplied into the radial bearing gap. Thus, lubricity can be enhanced.

In a case where the core metal is arranged as an insert component in the cavity of the molding die set for the outer member, when the molding die set is provided with projecting portions which respectively abut against both the axial end surfaces of the core metal, those projecting portions sandwich both the axial end surfaces of the core metal, and hence the core metal can be reliably positioned in the cavity. In this case, the resin molded portion of the outer member is provided with axial holes extending from the end surface of the outer member to the core metal.

When a radial dynamic pressure generating portion (for example, dynamic pressure generating grooves) is formed on the outer peripheral surface of the inner member, the dynamic pressure action can be actively generated in the lubricating oil in the radial bearing gap. Thus, the inner member can be more reliably supported in a non-contact manner by the dynamic pressure action in the lubricating oil. As a result, quietness during rotation of the bearing is enhanced.

When at least the outer peripheral surface of the inner member is made of a sintered metal excellent in formability, dimensional accuracy of the outer peripheral surface can be enhanced. Therefore, the radial bearing gap opposed to the outer peripheral surface of the inner member can be set with high accuracy. Further, the lubricating oil impregnated in the inner pores of the sintered metal can be supplied into the radial bearing gap, and hence lubricity in the radial bearing gap can be enhanced. In this case, when the radial dynamic pressure generating portion is formed by a rolling process on the outer peripheral surface of the inner member, plastic flow of the outer peripheral surface of the inner member, which is generated by the rolling process, can be absorbed by the inner pores of the sintered metal. Thus, swelling caused by the rolling process is suppressed, and hence the radial dynamic pressure generating portion can be formed with high accuracy.

As described above, when the outer member is formed by injection molding of a resin with use of the inner member as an insert component, the resin molded portion is separated from the inner member by utilizing molding shrinkage of the resin. Thus, it is preferred that a resin having a molding shrinkage rate of 1% or more, desirably, 1.5% or more, be used as a main component. For example, polyacetal (POM) can be used as such a resin.

The fluid dynamic bearing device as described above is excellent in quietness, manufactured at low cost, and comprises the outer member and the inner member unified with each other that enable easy handling. Thus, the fluid dynamic bearing device can be used suitably, for example, for exhaust fan motors.

Advantageous Effects of Invention

According to the fluid dynamic bearing device of the first invention of the present application, at least the one member of the outer member is formed by the pressing process on a plate member, and the radial bearing surface and at least the one of the thrust bearing surfaces are formed by the pressing process. In addition, the part of the inner member, which forms the radial bearing surface and the thrust bearing surfaces, is made of a sintered metal. Thus, the fluid dynamic bearing device comprises a small number of components, can be manufactured with high accuracy and at low cost, and is excellent in quietness. In particular, the fluid dynamic bearing device is suitable as a fluid dynamic bearing device for exhaust fan motors.

The inner member is made of a sintered metal, and hence plastic flow generated at the time of forming the dynamic pressure generating grooves in the radial bearing surface of the inner member through a rolling process can be absorbed by the inner pores of the sintered metal. Thus, surface swelling caused by the plastic flow is suppressed, and hence the dynamic pressure generating grooves can be formed with high accuracy. Further, the dynamic pressure generating grooves are formed with high accuracy in the radial bearing surface of the inner member made of a sintered metal, or the dynamic pressure generating grooves are formed with high accuracy in each of the radial bearing surface and the thrust bearing surfaces of the inner member. Thus, the rotary shaft can be supported with a dynamic pressure action of the lubricating oil in a non-contact manner, and hence excellent quietness can be achieved.

In the case where the inner member made of a sintered metal comprises the projecting portion forming the radial bearing surface and the thrust bearing surfaces and the sleeve portion fitted to the shaft, when those two parts are formed of a single member, an advantage of formability of a sintered metal can be obtained. In addition, the number of components can be further reduced.

According to the first invention of the present application, the assembly method for a fluid dynamic bearing device comprises: bringing the thrust bearing surface of the inner member into abutment against the thrust bearing surface of the first outer member, and then spacing the inner member apart from the first outer member by the total amount of the thrust bearing gaps; and pushing, while maintaining the spacing, the second outer member into the first outer member. Such an assembly method for a fluid dynamic bearing device enables the thrust bearing gaps to be set easily and with high accuracy. More specifically, according to this assembly method, the simple first jig and second jig are used, and hence the thrust bearing gaps can be set easily and with high accuracy. Further, according to an assembly method of another aspect, by adjusting a moving distance of the moving jig, setting of the thrust bearing gaps can be adjusted.

According to the fluid dynamic bearing device of the second invention of the present application, the outer member comprises the outside outer member and the inside outer member, the inside outer member being provided with the radial bearing surface and the one thrust bearing surface, the outside outer member being provided with the another thrust bearing surface. In addition, at least the part of the inner member, which forms the radial bearing surface, the one thrust bearing surface, and the another thrust bearing surface, is made of a sintered metal. Thus, the fluid dynamic bearing device comprises a small number of components, can be manufactured with high accuracy and at low cost, and is excellent in quietness. Further, the fluid dynamic bearing device comprises the projection portion for temporary fixation, and hence the thrust bearing gaps are easily set in the fluid dynamic bearing device, and the fluid dynamic bearing device itself is easily assembled. Still further, the outside outer member and the inside outer member can be press-fitted to each other without compromising accuracy, which is suitable for continuous injection of an adhesive for bonding. Yet further, the fluid dynamic bearing device comprises the indicator for identifying the rotational direction. Thus, the fluid dynamic bearing device can be efficiently assembled or assembled into an apparatus to be used. In particular, the fluid dynamic bearing device is suitable as a fluid dynamic bearing device for exhaust fan motors.

When the dynamic pressure generating grooves are formed in each of the radial bearing surface of the inner member and the thrust bearing surfaces of the outer member, or when the dynamic pressure generating grooves are formed in each of the radial bearing surface and the thrust bearing surfaces of the inner member while the radial bearing surface, the one thrust bearing surface, and the another thrust bearing surface of the outer member are each formed of a smooth surface, the dynamic pressure generating grooves are formed with high accuracy by a rolling process or a pressing process. Thus, the rotary shaft is supported by a dynamic pressure action of the lubricating oil in a non-contact manner, and hence excellent quietness can be achieved.

Further, the assembly method comprises: accommodating the inner member within the outside outer member and the inside outer member; fitting the outside outer member and the inside outer member to each other; temporarily fixing the outside outer member and the inside outer member to each other with the projection portion under the state in which the thrust bearing gaps are set; and then injecting and curing the adhesive. Thus, the thrust bearing gaps can be easily set in the fluid dynamic bearing device, and the fluid dynamic bearing device itself can be easily assembled. In addition, assembly operability can be enhanced.

According to the fluid dynamic bearing device of the third invention of the present application, simultaneously with molding of the outer member, the outer member and the inner member can be assembled to each other, and hence the number of components and manufacturing man-hours can be reduced. As a result, cost reduction can be achieved. Further, the bearing gaps are set with high accuracy by utilizing molding shrinkage of a resin, and hence quietness during rotation of the bearing can be enhanced.

BRIEF DESCRIPTION OF DRAWINGS

[FIG. 20a] A front view of dynamic pressure generating grooves formed in a side surface on a left side of an inner member of FIG. 19.

[FIG. 20b] A side view of dynamic pressure generating grooves formed in an outer peripheral surface of the inner member of FIG. 19.

[FIG. 20c] A front view of dynamic pressure generating grooves formed in a side surface on a right side of the inner member of FIG. 19.

[FIG. 27a] A vertical sectional view of an outside outer member.

[FIG. 27b] A vertical sectional view of the outside outer member according to a modification.

[FIG. 27c] A vertical sectional view of the outside outer member according to another modification.

[FIG. 39] A sectional view of a die set for molding the outer member.

[FIG. 45] A sectional view of a die set for molding an outer member of the fluid dynamic bearing device of FIG. 42.

DESCRIPTION OF EMBODIMENTS (Embodiments of a First Invention of the Present Application)

In the following, description is made of embodiments of a first invention of the present application with reference to FIGS. 1 to 17.

Figure 1:
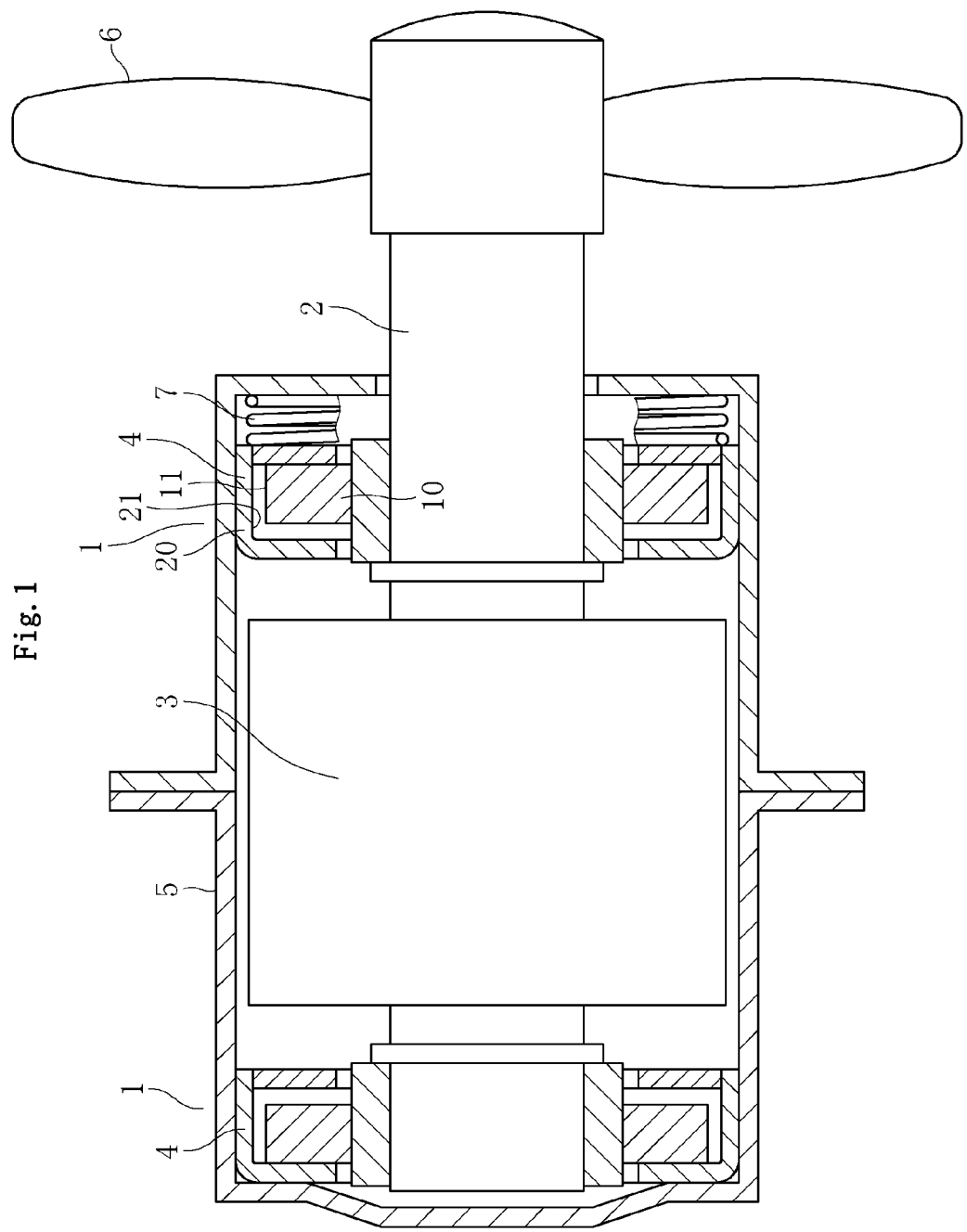
[FIG. 1] A vertical sectional view of a bearing unit for an exhaust fan motor (when the motor is stopped).

FIG. 1 is an axial sectional view of a bearing unit 1 incorporating a fluid dynamic bearing device according to a first embodiment of the first invention of the present application. The bearing unit 1 is used, for example, by being incorporated into a motor for a small exhaust fan for a 24-hour ventilation system to be installed in a dwelling room of a house (more strictly speaking, inner-rotor motor for an exhaust fan). The bearing unit 1 comprises a pair of fluid dynamic bearing devices 4 and 4 arranged at both axial end positions of a motor rotor 3 between a rotary shaft 2 and a housing 5 so that a rotator comprising the rotary shaft 2, a motor rotor 3 fixed to an outer peripheral surface of the rotary shaft 2, and a fan 6 provided at an end portion of the rotary shaft 2 is supported in a freely rotatable manner. Between one fluid dynamic bearing device 4 (right side in FIG. 1) and the housing 5, a spring 7 is arranged in a compressed state. Note that, FIG. 1 illustrates a state in which the motor (rotary shaft 2) is stopped. Further, stators are not shown.

Figure 2:
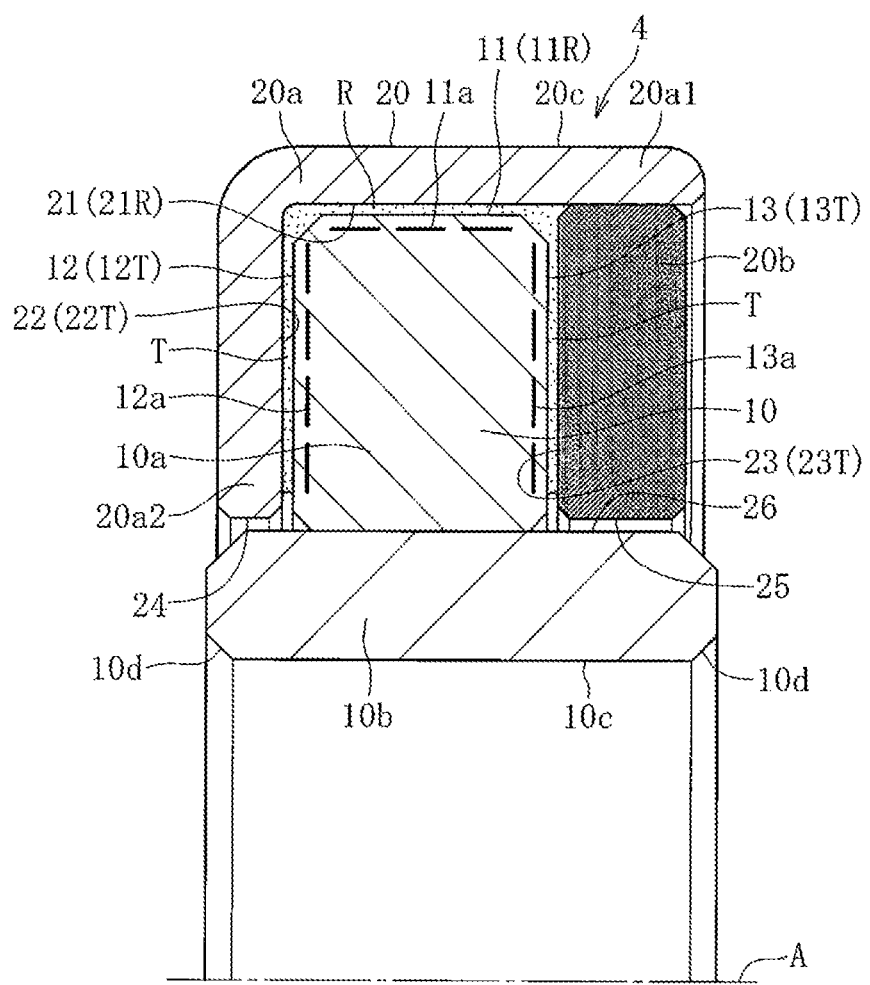
[FIG. 2] A vertical sectional view of a fluid dynamic bearing device according to a first embodiment of a first invention of the present application.

As illustrated in FIG. 2, the fluid dynamic bearing devices 4 each comprise an inner member 10 and an outer member 20 for supporting the inner member 10 in a freely rotatable manner. FIG. 2 illustrates an upper half of the fluid dynamic bearing device 4 with respect to an axial line A. The same applies to embodiments, hereinbelow. The inner member 10 is fixed to the rotary shaft 2, and the outer member 20 is fitted to an inner peripheral surface of the housing 5, specifically, mounted to be slidable in an axial direction (refer to FIG. 1). A lubricating oil is interposed between surfaces of the inner member 10 and the outer member 20, which face each other in the axial direction and a radial direction (radial bearing gap R and thrust bearing gaps T) (refer to FIG. 3). Note that, the fluid dynamic bearing devices 4 and 4 in FIG. 1 have the same structure.

As illustrated in FIG. 2, the inner member 10 comprises a projecting portion 10a and a sleeve portion 10b, which are each made of a sintered metal in this embodiment. The projecting portion 10a has an outer peripheral surface 11 and both side surfaces 12 and 13. The outer peripheral surface 11 forms a radial bearing surface 11R, and both the side surfaces 12 and 13 respectively form thrust bearing surfaces 12T and 13T. The outer peripheral surface 11 is formed into a shape of a cylindrical surface, and is held in contact with the lubricating oil filling the radial bearing gap R (refer to FIG. 3). Dynamic pressure generating grooves 11a are formed in the outer peripheral surface 11 of the projecting portion 10a. In detail, as illustrated in FIG. 4(b), the projecting portion 10a has a herringbone pattern in which the dynamic pressure generating grooves 11a formed all over the outer peripheral surface 11 and each bent into a V-shape and hill portions 11b (indicated by cross-hatching in FIG. 4(b)) defining the dynamic pressure generating grooves 11a are arranged alternately with each other in a circumferential direction. The dynamic pressure generating grooves 11a are formed, for example, by a rolling process. In this embodiment, the projecting portion 10a of the inner member 10 is made of a sintered metal, and hence plastic flow of the outer peripheral surface 11 of the projecting portion 10a, which is generated by compression along with the rolling process, can be absorbed by inner pores of the sintered metal. Thus, swelling of a surface of the projecting portion 10a, which is caused by the plastic flow, is suppressed, and hence the dynamic pressure generating grooves 11a and the hill portions 11b can be formed with high accuracy.

Figure 3:
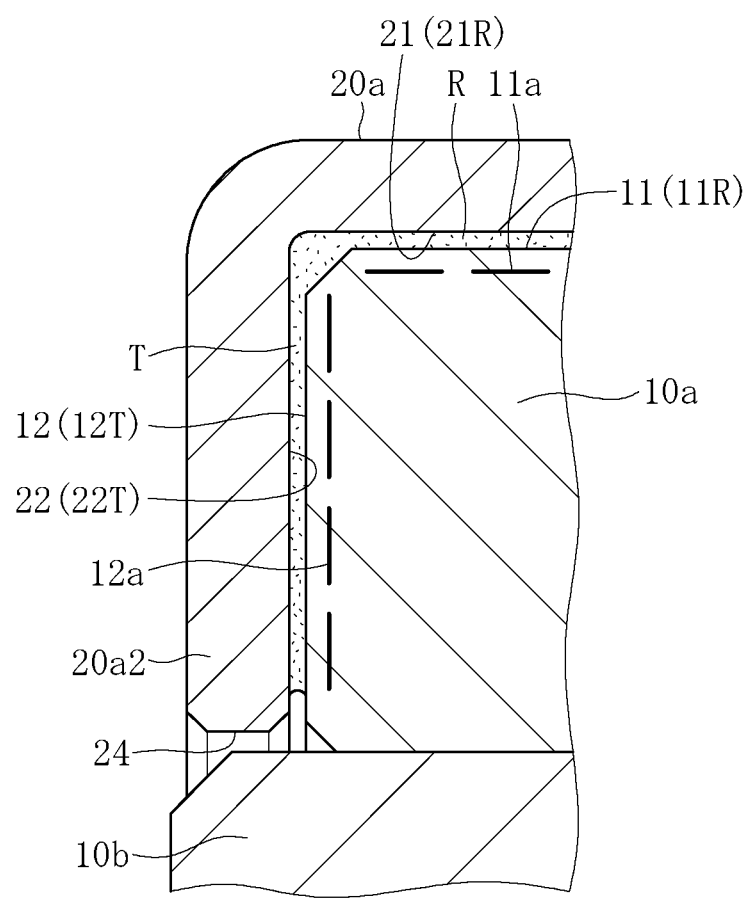
[FIG. 3] An enlarged vertical sectional view of a main part in FIG. 2.
Figure 4A:
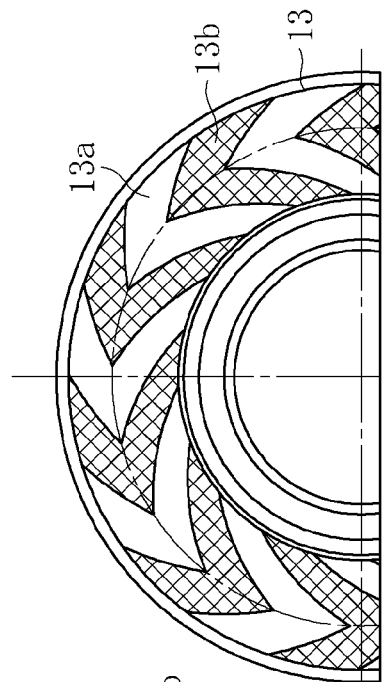
[FIG. 4a] A front view of dynamic pressure generating grooves formed in a side surface on a left side of an inner member of FIG. 2.
Figure 4B:
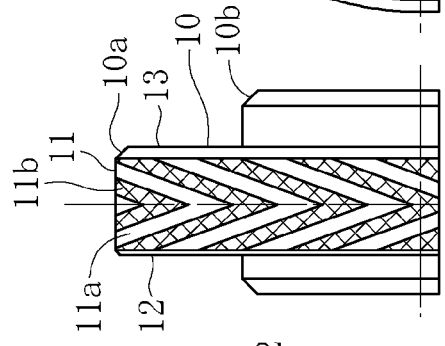
[FIG. 4b] A side view of dynamic pressure generating grooves formed in an outer peripheral surface of the inner member of FIG. 2.
Figure 4C:
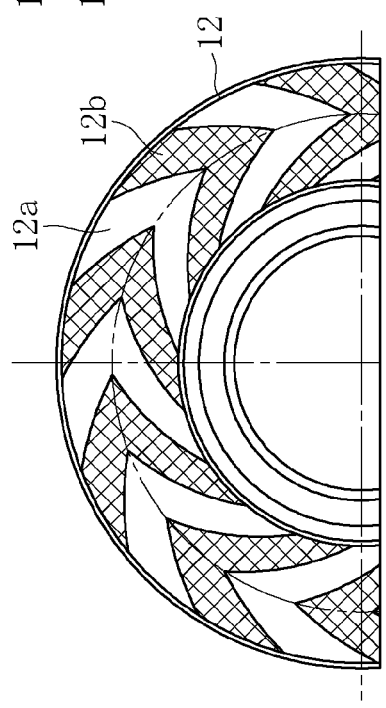
[FIG. 4c] A front view of dynamic pressure generating grooves formed in a side surface on a right side of the inner member of FIG. 2.

Both the side surfaces 12 and 13 of the projecting portion 10a of the inner member 10 are each formed of a radial flat surface orthogonal to the axial line A, and are held in contact with the lubricating oil filling the thrust bearing gaps T (refer to FIG. 3). Dynamic pressure generating grooves 12a and 13a are formed respectively in both the side surfaces 12 and 13 of the projecting portion 10a. Specifically, refer to FIGS. 4(a) and 4(c). FIG. 4(a) illustrates the side surface 12 on a left side of the projecting portion 10a, and FIG. 4(c) illustrates the side surface 13 on a right side of the projecting portion 10a. As illustrated in FIGS. 4(a) and 4(c), the projecting portion 10a has a herringbone pattern in which the dynamic pressure generating grooves 12a and 13a respectively formed all over both the side surfaces 12 and 13 and each bent into a V-shape and hill portions 12b and 13b (indicated by cross-hatching in FIGS. 4(a) and 4(c)) respectively defining the dynamic pressure generating grooves 12a and 13a are arranged alternately with each other in the circumferential direction. The projecting portion 10a of the inner member 10 is made of a sintered metal, and hence the dynamic pressure generating grooves 12a and 13a of both the side surfaces 12 and 13 can be formed by a pressing process with high accuracy. Further, simultaneously with sizing of the projecting portion 10a, the dynamic pressure generating grooves 12a and 13a can be formed by molding.

The sleeve portion 10b fixed to the rotary shaft 2 is also made of a sintered metal. As illustrated in FIG. 2, the sleeve portion 10b is formed to be longer than a width between both the side surfaces 12 and 13 of the projecting portion 10a. When the sleeve portion 10b is fixed by fitting to the projecting portion 10a, the sleeve portion 10b projects in an axial direction with respect to both the side surfaces 12 and 13. At both axial end portions of an inner peripheral surface 10c of the sleeve portion 10b, which has a shape of a cylindrical surface, there are provided chamfered portions 10d. The inner member 10 is fixed to the rotary shaft 2, for example, by press-fitting (lightly press-fitting) the inner peripheral surface 10c to an outer peripheral surface of the rotary shaft 2, or by interposing an adhesive between the inner peripheral surface 10c and the outer peripheral surface of the rotary shaft 2.

A copper-iron based material is used as a material for a sintered metal of the projecting portion 10a as a part forming a bearing surface of the inner member 10, and a formulation ratio of copper is set to range from 20% to 80%. When the formulation ratio of the copper is less than 20%, there arise problems with formability of the dynamic pressure generating grooves and lubricity therein. Meanwhile, when the formulation ratio of the copper exceeds 80%, it is difficult to secure abrasion resistance. Further, on the outer peripheral surface 11 of the projecting portion 10a of the inner member 10, at least at apart which forms the radial bearing surface, a surface pore rate of the sintered metal is set to range from 2% to 20%. When the surface pore rate is less than 2%, the lubricating oil does not sufficiently circulate. Meanwhile, when the surface pore rate exceeds 20%, pressure of the lubricating oil decreases. Further, a density of the copper-iron based sintered material is set to range from 6 g/cm$^3$ to 8 g/cm$^3$ so that communication properties of the lubricating oil and plastic working properties are maintained. The material for the sintered metal of the sleeve portion 10b to be fitted to the rotary shaft 2 is not limited to the above-mentioned copper-iron based material, and an iron based material may be employed. Further, in comprehensive consideration of the abrasion resistance, combination of the sleeve portion and the shaft, ease of setting surface pore rates of necessary parts, and the like, materials of the same type or materials of different types can be combined and selected.

As illustrated in FIG. 2, the outer member 20 is formed of two members including a first outer member 20a and a second outer member 20b. The first outer member 20a comprises a cylindrical portion 20a1 and a radial portion 20a2 formed along one end of the cylindrical portion 20a1, and is formed into a substantially L-shape in cross-section through a pressing process on a plate member. Specifically, a stainless steel plate, a cold rolling steel plate, or the like is used as the plate member, and a plate thickness thereof is set to range approximately from 0.1 mm to 1 mm. The second outer member 20b has a disk-like shape, which is obtained by punching out a plate member through a pressing process. An inner peripheral surface 21 of the cylindrical portion 20a1 of the first outer member 20a forms a radial bearing surface 21R, and an inside surface 22 of the radial portion 20a2 of the first outer member 20a forms a thrust bearing surface 22T. An inside surface 23 of the second outer member 20b forms a thrust bearing surface 23T. Those inner peripheral surface 21, inside surface 22, and inside surface 23 are each formed of a flat and smooth surface. The inner peripheral surface 21, the inside surface 22, and the inside surface 23 are arranged to respectively face the outer peripheral surface 11 and both the side surfaces 12 and 13 of the projecting portion 10a of the inner member 10 so that the radial bearing gap R and the thrust bearing gap T are formed.

A small-diameter inner peripheral surface 24 at an inner-diameter-side end portion of the radial portion 20a2 of the first outer member 20a and a small-diameter inner peripheral surface 25 at an inner-diameter-side end portion of the second outer member 20b face an outer peripheral surface 26 of the sleeve portion 10b of the inner member 10 across a predetermined gap. When an oil repellent agent is applied to the small-diameter inner peripheral surfaces 24 and 25, leakage of the lubricating oil is more effectively prevented.

In this embodiment, the dynamic pressure generating grooves 11a, 12a, and 13a are each formed in a herringbone pattern, and are provided for a uni-directional rotation. For identification of the rotational direction, the first outer member 20a and the second outer member 20b have surfaces different from each other in hue, which can prevent failures in assembly. In order to form the surfaces different from each other in hue, for example, materials different from each other in hue are used, or surface treatment is performed.

The fluid dynamic bearing device 4 in this embodiment is assembled by fitting the second outer member 20b to the inner peripheral surface 21 of the first outer member 20a after the inner member 10 is inserted into an inside of the first outer member 20a (detailed description of an assembly method is made below). Dimensions of the fluid dynamic bearing device 4 are not particularly limited. In this case, the fluid dynamic bearing device 4 is applicable to an alternative miniature bearing approximately having an inner diameter φ of 3 mm, an outer diameter φ of 8 mm, and a width of 4 mm, or to still alternative miniature bearings having various other dimensions.

In the small exhaust fan motor illustrated in FIG. 1, an outer peripheral surface 20c of the outer member 20 is fitted to the inner peripheral surface of the housing 5, specifically, is mounted to be slidable in the axial direction. Alternatively, the outer peripheral surface 20c may be fixed to an inner peripheral surface of a static-side member by appropriate means such as press-fitting and bonding.

The lubricating oil is filled into an interior space of the fluid dynamic bearing device 4 structured as described above, including the inner pores of the inner member 10 made of a sintered metal. As illustrated in FIG. 3 on an enlarged scale, the lubricating oil fills the entire radial bearing gap R and the thrust bearing gaps T up to vicinities of inner diameter ends thereof. A capillary force of the thrust bearing gaps T causes the lubricating oil to be drawn into an outer diameter side (radial bearing gap R side). An oil level of the lubricating oil is maintained in each of the thrust bearing gaps T.

As illustrated in FIG. 1, in the bearing unit 1 incorporating the above-mentioned fluid dynamic bearing devices 4, the spring 7 urges the outer member 20 of the fluid dynamic bearing device 4 on the right side of FIG. 1 into a left direction of FIG. 1. Thus, in a static state of the rotary shaft 2 (state of FIG. 1), the outer member 20 urged by the spring 7 is held in abutment against the inner member 10, and hence the inner member 10 and the rotary shaft 2 are urged to the left direction of FIG. 1. With this, the inner member 10 of the left fluid dynamic bearing device 4 of FIG. 1 is urged to the left direction of FIG. 1, with the result of being held in abutment against and engaged with the outer member. In other words, the housing 5 and the spring 7 apply a preload in a direction in which the pair of fluid dynamic bearing devices 4 and 4 comes close to each other.

Figure 5:
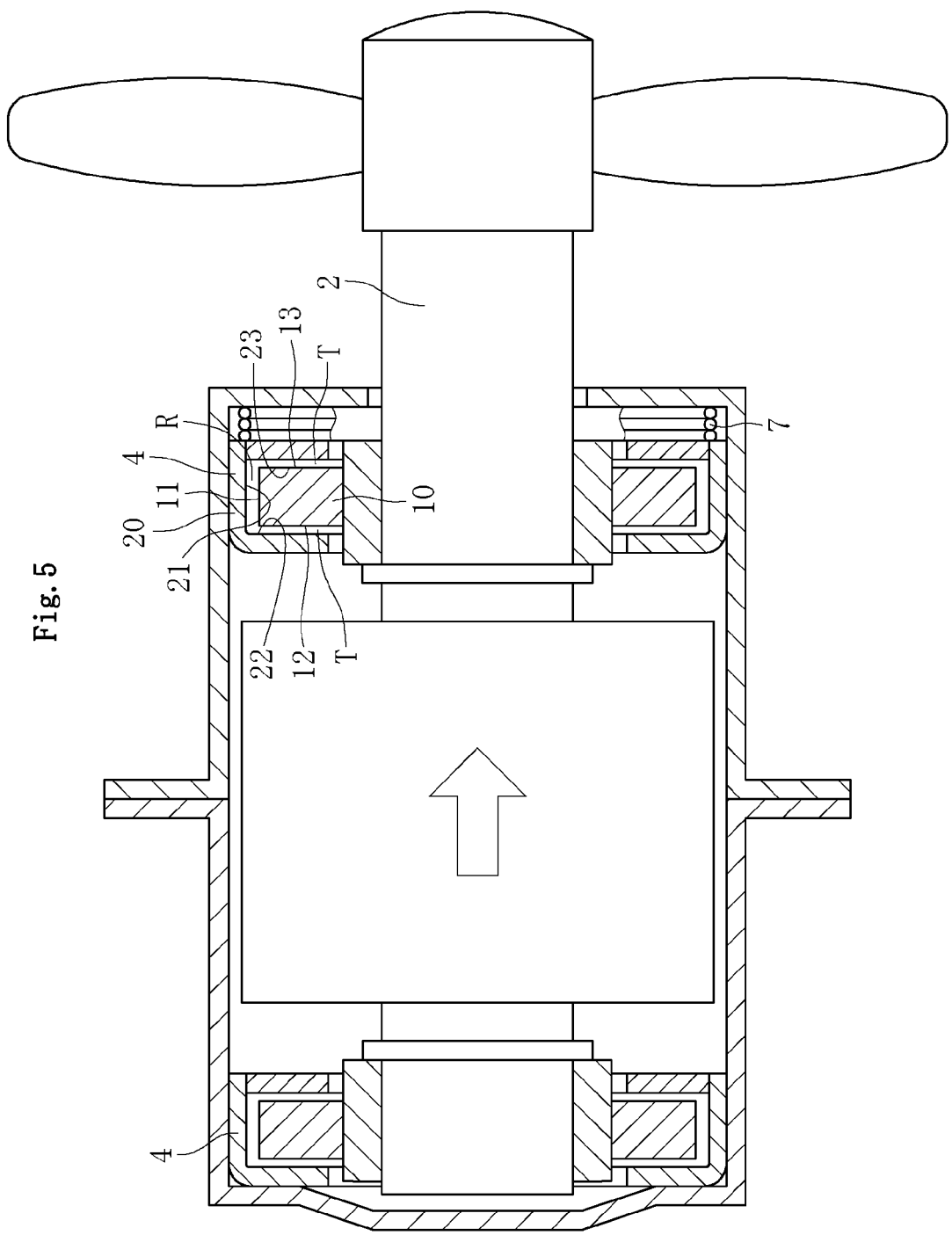
[FIG. 5] A vertical sectional view of the bearing unit for the exhaust fan motor (when the motor is rotated).

As illustrated in FIG. 5, when the rotary shaft 2 is rotated, in each of the fluid dynamic bearing devices 4, an oil film is formed in the radial bearing gap R between the outer peripheral surface 11 of the inner member 10 and the inner peripheral surface 21 of the outer member 20. Then, in accordance with the rotation of the rotary shaft 2, pressure of the oil film in the radial bearing gap R is increased by the dynamic pressure generating grooves 11a. Such a dynamic pressure action of the oil film causes the rotary shaft 2 and the inner member 10 to be supported in a non-contact manner in a radial direction with respect to the outer member 20 mounted to the static-side member.

Simultaneously, in each of the fluid dynamic bearing devices 4, oil films are formed respectively in the thrust bearing gaps T between both the side surfaces 12 and 13 of the inner member 10 and the inside surfaces 22 and 23 of the outer member 20 respectively facing both the side surfaces 12 and 13. In accordance with the rotation of the rotary shaft 2, pressure of the oil films in the thrust bearing gaps T is increased by the dynamic pressure generating grooves 12a and 13a. In this way, the rotary shaft 2 and the inner member 10 are supported in a non-contact manner in both thrust directions with respect to the outer member 20 mounted to the static-side member (refer to FIG. 5). Note that, the radial bearing gap R and the thrust bearing gaps T in the illustration are exaggerated in size.

When the dynamic pressure action in the lubricating oil in the thrust bearing gaps T is caused by the rotation of the rotary shaft 2, the rotary shaft 2 bears a load to the right side in FIG. 5 (refer to a hollow arrow in FIG. 5). At this time, the outer member 20 of the right fluid dynamic bearing device 4 of FIG. 5 is slid to the right side of FIG. 5 to compress the spring 7. With this, the thrust bearing gaps T are secured in each of both the fluid dynamic bearing devices 4 and 4. In this way, when the outer member 20 is fitted to the housing 5 in a manner that the outer member 20 is axially movable with respect to the housing 5, the thrust bearing gaps T can be set with high accuracy. With this, the inner member 10 is reliably supported in a non-contact manner with respect to the outer member 20. As a result, noise generation that may be caused by contact sliding is more reliably prevented.

Further, in this bearing unit 1, the spring 7 applies an axial preload to both the fluid dynamic bearing devices 4 and 4. Thus, even under a state in which the outer member 20 is fitted to the housing 5 across a gap, a situation in which the outer member 20 is rotated in accordance with the rotation of the rotary shaft 2 is prevented. Meanwhile, when an elastic force of the spring 7 is excessively large, the inner member 10 and the outer member 20 may come into sliding contact with each other. Thus, the elastic force of the spring 7 is set within such a range that the outer member 20 is prevented from being rotated and the outer member 20 and the inner member 10 are prevented from coming into sliding contact with each other. For example, it is desired that the elastic force of the spring 7 be set approximately to range from 20% to 80% of a load capacity of the dynamic pressure action generated in the thrust bearing gaps T.

In the fluid dynamic bearing device 4 structured as described above, the inner member 10 is provided in the axial direction between both the inside surfaces 22 and 23 of the outer member 20. Thus, when both the inside surfaces 22 and 23 of the outer member 20 and both the side surfaces 12 and 13 of the inner member 10 are respectively engaged with each other in the axial direction, the inner member 10 is prevented from dropping off from an inner periphery of the outer member 20. With this, the inner member 10 and the outer member 20 are prevented from being separated from each other, and hence the fluid dynamic bearing device 4 can be integrally treated. As a result, the fluid dynamic bearing device 4 is more easily mounted to the rotary shaft 2 and the housing 5.

Further, in accordance with the rotation of the rotary shaft 2, a centrifugal force acts on the lubricating oil in the thrust bearing gaps T. Thus, the lubricating oil is pushed into an outer diameter side (radial bearing gap R side). With this centrifugal force and the capillary force which is generated by the thrust bearing gaps T, leakage of the lubricating oil to the outside is prevented. Thus, it is unnecessary to provide a special sealing mechanism to the fluid dynamic bearing device 4. As a matter of course, such a sealing mechanism may be provided to the fluid dynamic bearing device 4. For example, a sealed space having a wedge-like shape in cross-section may be provided by forming any one of the small-diameter inner peripheral surfaces 24 and 25 of the outer member 20, and the outer peripheral surface 26 of the sleeve portion 10b of the inner member 10, which are illustrated in FIG. 2, into a shape of a tapered surface.

Figure 6:
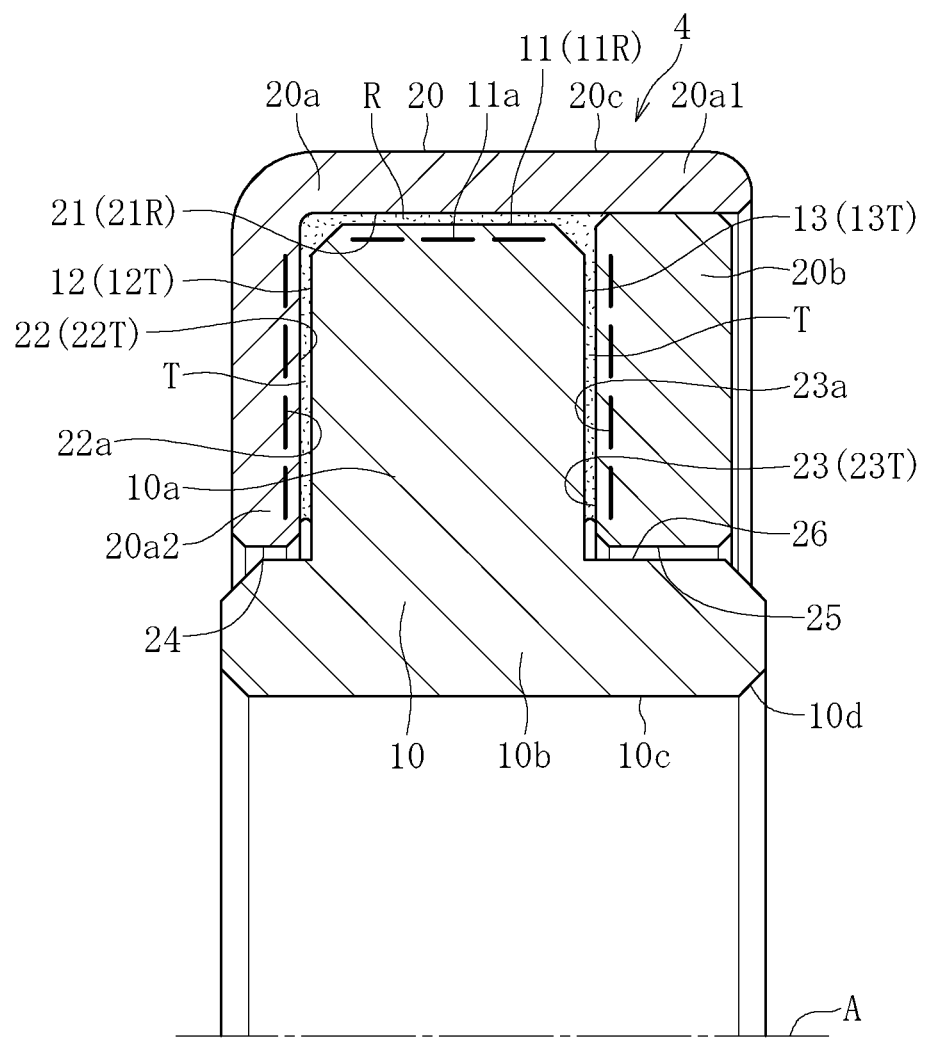
[FIG. 6] A vertical sectional view of a fluid dynamic bearing device according to a modification of the first embodiment of the first invention of the present application.

Next, description is made of a modification of the first embodiment of the first invention of the present application with reference to FIG. 6. Parts having the same functions as those in the above-mentioned first embodiment are denoted by the same reference symbols, and redundant description thereof is omitted.

In this modification, dynamic pressure generating grooves 22a and 23a in both the thrust directions are formed respectively in the inside surface 22 of the radial portion 20a2 of the first outer member 20a and the inside surface 23 of the second outer member 20b. Both the side surfaces 12 and 13 of the projecting portion 10a of the inner member 10 are each formed of an even and smooth surface. The dynamic pressure generating grooves 22a and 23a in both the thrust directions are formed, for example, by a pressing process when the first outer member 20a and the second outer member 20b are formed of a plate member by a pressing process. Thus, the dynamic pressure generating grooves 22a and 23a also can be formed with high accuracy. Shapes of the dynamic pressure generating grooves 22a and 23a are the same as those illustrated in FIGS. 4(a) and 4(c). Further, the inner member 10 is formed of an integral piece of the projecting portion 10a and the sleeve portion 10b, and is made of a sintered metal. Other structural details are the same as those in the first embodiment.

Figure 7:
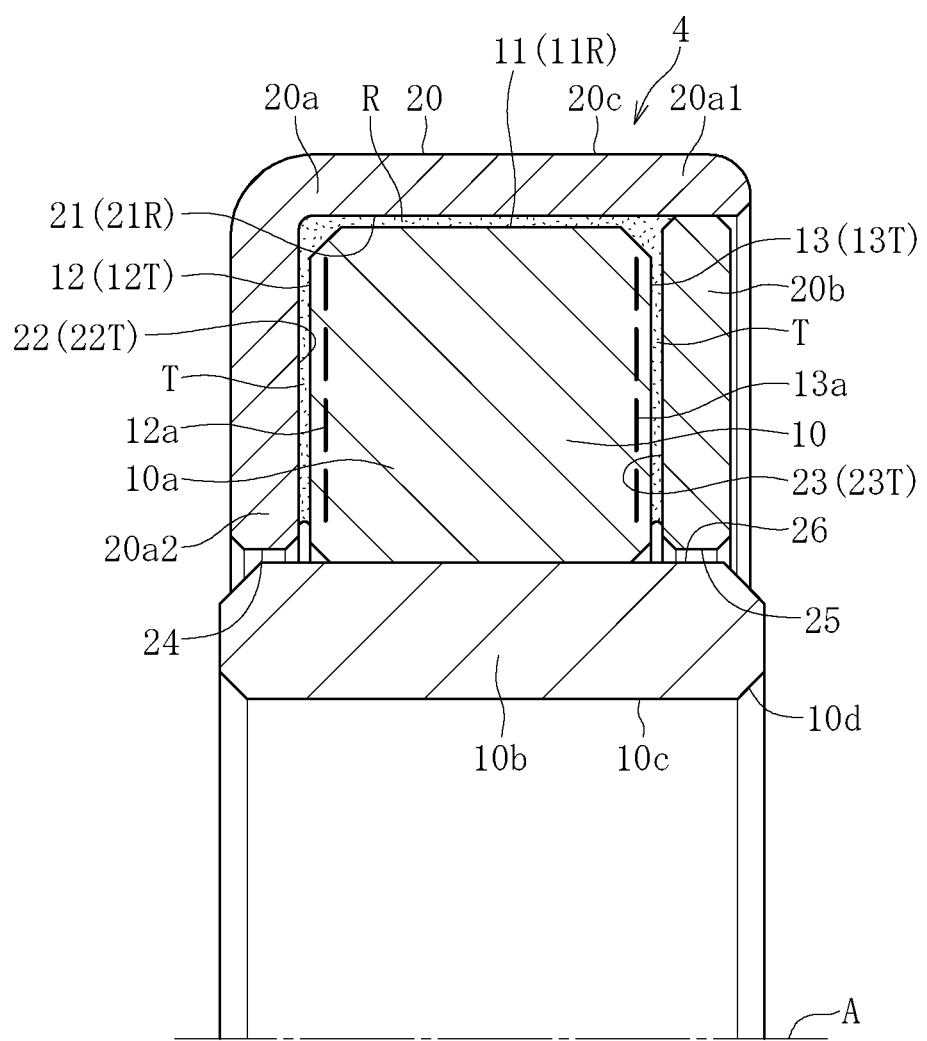
[FIG. 7] A vertical sectional view illustrating another modification of the first embodiment of the first invention of the present application.

Next, description is made of a second modification of the first embodiment of the first invention of the present application with reference to FIG. 7. The outer peripheral surface 11 of the projecting portion 10a of the inner member 10 has no dynamic pressure generating grooves formed thereon, that is, is formed of an even and smooth cylindrical surface. The inner peripheral surface 21 of the cylindrical portion 20a1 of the first outer member 20a is also formed of an even and smooth cylindrical surface, and forms the radial bearing gap R between the inner peripheral surface 21 and the opposed outer peripheral surface 11 of the projecting portion 10a of the inner member 10. A cylindrical bearing in which such a radial bearing gap R is formed is obtained. In this case, when the dynamic pressure generating grooves 12a and 13a respectively provided to both the side surfaces 12 and 13 of the projecting portion 10a of the inner member 10 are each formed in a pump-out type herringbone pattern, the lubricating oil interposed in the thrust bearing gaps is pushed into the radial bearing gap R. In accordance therewith, pressure of the oil film on the radial bearing surface is increased, with the result that a force for supporting the inner member 10 in a non-contact manner is increased. Further, the plate thickness of the second outer member 20b is set to be smaller than that in the first embodiment. With this, an axial length of a radial bearing portion can be increased. In addition, synergistically with the above-mentioned pump-out type herringbone pattern of the dynamic pressure generating grooves 12a and 13a, the load capacity can be secured also in the cylindrical bearing. Other structural details are the same as those in the first embodiment.

Figure 8:
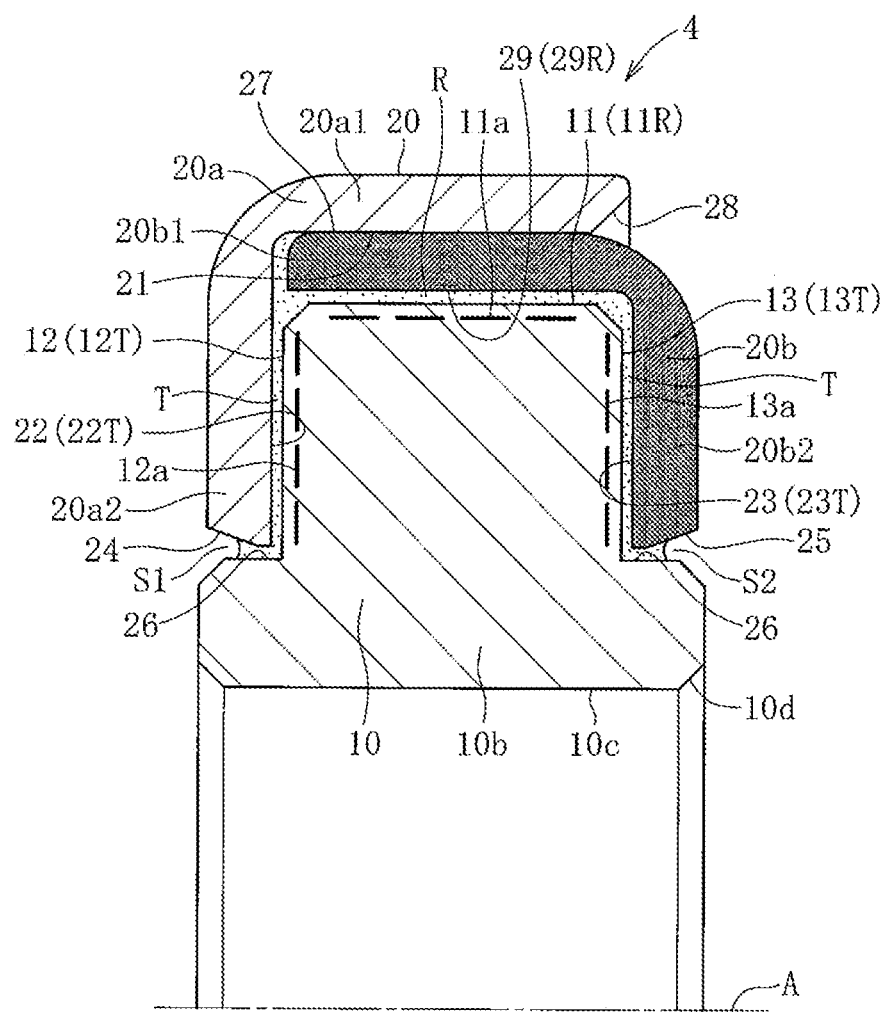
[FIG. 8] A vertical sectional view of a fluid dynamic bearing device according to a second embodiment of the first invention of the present application.

Next, description is made of a second embodiment of the first invention of the present application with reference to FIG. 8. In this embodiment, the first outer member 20a and the second outer member 20b of the outer member 20 are each formed into a substantially L-shape in vertical cross-section. Specifically, the first outer member 20a comprises the cylindrical portion 20a1 and the radial portion 20a2 formed along the one end of the cylindrical portion 20a1. Further, the second outer member 20b comprises a cylindrical portion 20b1 and a radial portion 20b2 formed along one end of the cylindrical portion 20b1. The first outer member 20a and the second outer member 20b are fitted to each other at the inner peripheral surface 21 of the cylindrical portion 20a1 and an outer peripheral surface 27 of the cylindrical portion 20b1, and fixed to each other with an adhesive interposed therebetween. An end surface of the cylindrical portion 20a1 of the first outer member 20a is positioned to be lower than an outside surface of the radial portion 20b2 of the second outer member 20b (retracted to left side of FIG. 8), and is provided with a chamfered portion 28, which facilitates injection of an adhesive. The first outer member 20a and the second outer member 20b are each formed into a substantially L-shape in cross-section through a pressing process on a plate member. In this embodiment, an inner peripheral surface 29 of the cylindrical portion 20b1 of the second outer member 20b forms a radial bearing surface 29R. The inside surface 22 of the radial portion 20a2 of the first outer member 20a and the inside surface 23 of the radial portion 20b2 of the second outer member 20b respectively form the thrust bearing surface 22T and 23T. The inner peripheral surface 29 and the inside surfaces 22 and 23 are each formed of an even and smooth surface, and the dynamic pressure generating grooves 12a and 13a are formed respectively in both the side surfaces 12 and 13 of the projecting portion 10a of the inner member 10. The small-diameter inner peripheral surface 24 at the inner-diameter-side end portion of the radial portion 20a2 of the first outer member 20a and the small-diameter inner peripheral surface 25 at the inner-diameter-side end portion of the second outer member 20b are each formed into a shape of a tapered surface increasing in diameter toward an outside. Sealed spaces S1 and S2 are formed between the small-diameter inner peripheral surfaces 24 and 25 and the outer peripheral surface 26 of the sleeve portion 10b of the inner member 10. With this, leakage of the lubricating oil to the outside is more effectively prevented. In this structure, a fitting length between the inner peripheral surface 21 of the cylindrical portion 20a1 and the outer peripheral surface 27 of the cylindrical portion 20b1 is large, and hence stable assembly and coupling by fixation can be achieved. Other structural details are the same as those in the first embodiment.

Also in this embodiment, the dynamic pressure generating grooves 11a, 12a and 13a are each formed in a herringbone pattern, and are provided for a uni-directional rotation. For identification of the rotational direction, the first outer member 20a and the second outer member 20b have surfaces different from each other in hue, which can prevent failures in assembly. In order to form the surfaces different from each other in hue, for example, materials different from each other in hue are used, or surface treatment is performed.

Figure 9:
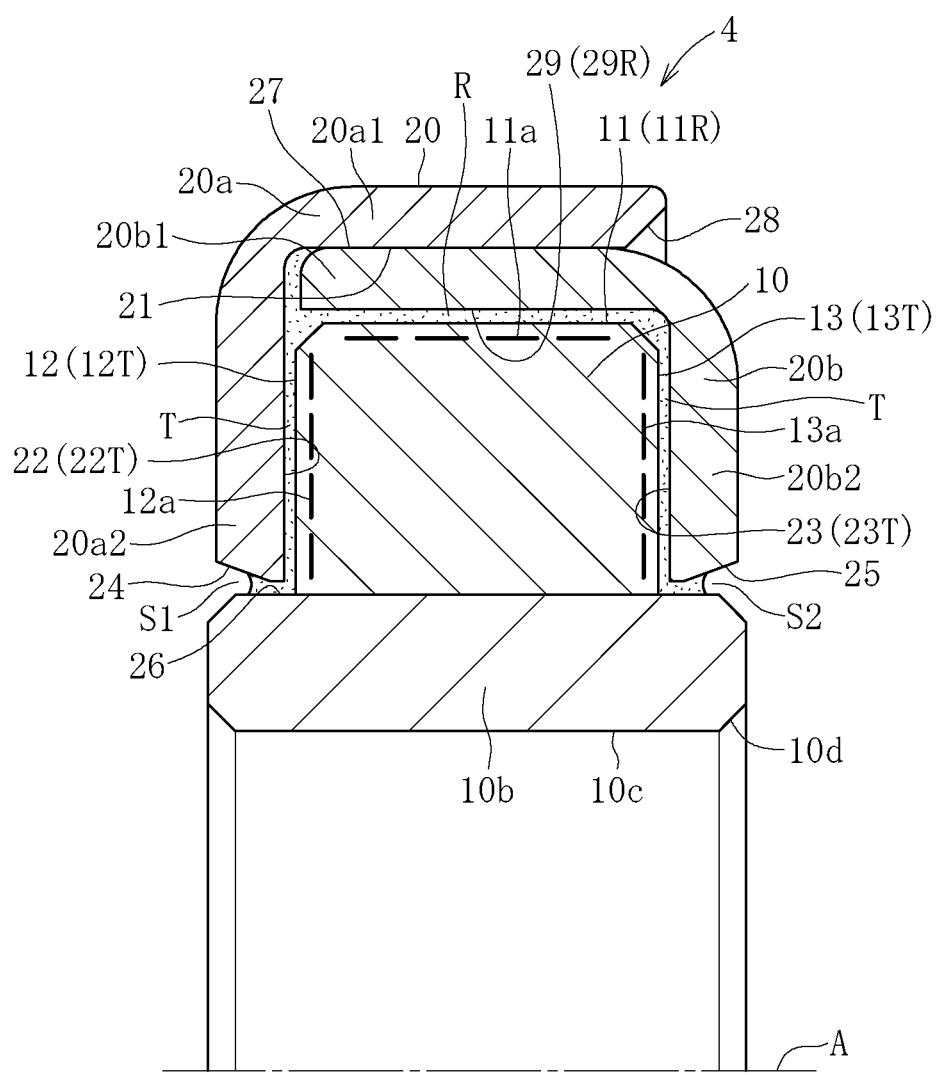
[FIG. 9] A vertical sectional view of a fluid dynamic bearing device according to a modification of the second embodiment of the first invention of the present application.

Next, description is made of a modification of the second embodiment of the first invention of the present application with reference to FIG. 9. In this modification, unlike the second embodiment, the projecting portion 10a and the sleeve portion 10b of the inner member 10 are separated from each other and are each made of a sintered metal. Other structural details are the same as those in the second embodiment.

Figure 10:
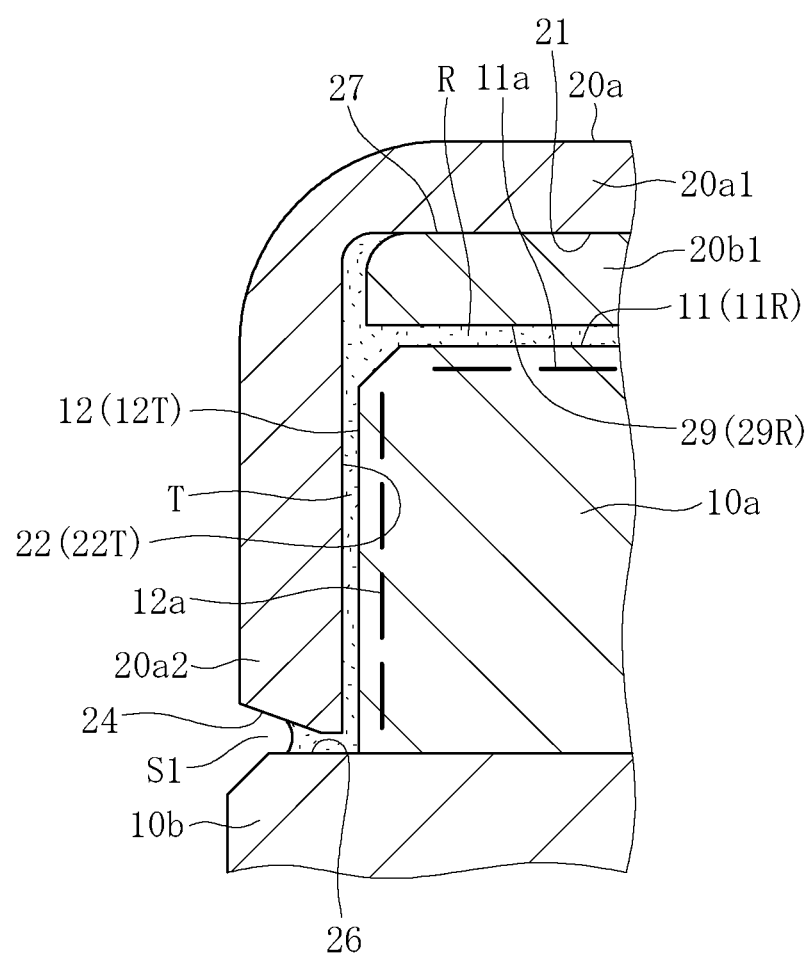
[FIG. 10] An enlarged vertical sectional view of a main part in FIG. 8.

In the second embodiment, the lubricating oil is filled into the interior space of the fluid dynamic bearing device 4, including the inner pores of the inner member 10 made of a sintered metal. As illustrated in FIG. 10 on an enlarged scale, the lubricating oil fills not only the entire radial bearing gap R and the thrust bearing gaps T but also up to a midway of each of the sealed spaces S1 and S2 each having a wedge-like shape in cross-section between the small-diameter inner peripheral surfaces 24 and 25 of the outer member 20, each formed into a shape of a tapered surface, and the outer peripheral surface 26 of the sleeve portion 10b of the inner member 10. An oil level of the lubricating oil is maintained in the sealed spaces S1 and S2. As a result, leakage of the lubricating oil to the outside is more effectively prevented.

Figure 11A:
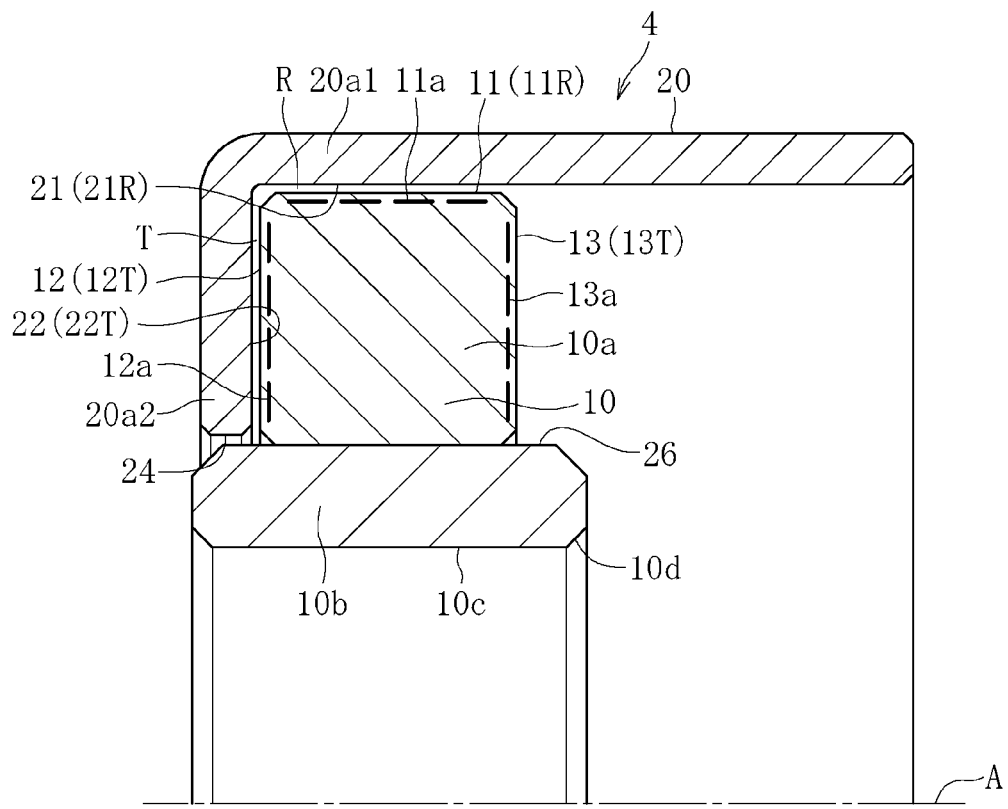
[FIG. 11a] A vertical sectional view of a fluid dynamic bearing device according to a third embodiment of the first invention of the present application.
Figure 11B:
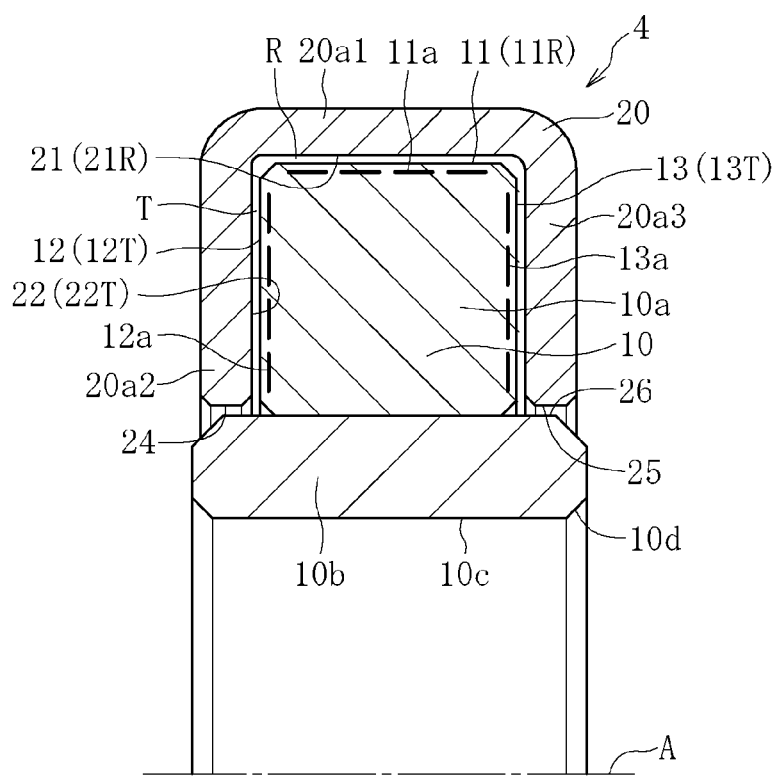
[FIG. 11b] Another vertical sectional view of the fluid dynamic bearing device according to the third embodiment of the first invention of the present application.

Next, description is made of a third embodiment of the first invention of the present application with reference to FIG. 11. In this embodiment, the outer member 20 is formed integrally by a pressing process on a single plate member. As illustrated in FIG. 11(b), the outer member 20 comprises the cylindrical portion 20a1 and the radial portions 20a2 and 20a3 respectively formed at both ends of the cylindrical portion 20a1, and is formed into a substantially C-shape in vertical cross-section.

The pressing process comprises the following steps. First, as illustrated in FIG. 11(a), the outer member 20 is subjected to the pressing process so as to be formed into a substantially L-shape in cross-section and comprise the cylindrical portion 20a1 and the radial portion 20a2 formed at one end of the cylindrical portion 20a1. Then, the inner member 10 is set in an inside of the outer member 20. After that, another end portion of the cylindrical portion 20a1 is bent at a right angle by a pressing process while securing a predetermined length of the cylindrical portion 20a1. In this way, the outer member 20 is formed into a substantially C-shape. In this embodiment, the outer member 20 is formed of a single member, and hence the number of components is further decreased. In addition, it is no longer necessary to perform an assembly operation after the outer member 20 is completed. A structure of the inner member 10 is the same as that in the modification of the second embodiment, which is illustrated in FIG. 9.

Next, description is made of assembly methods for the fluid dynamic bearing device according to the present invention. First, description is made of an assembly method according to the first embodiment of the first invention of the present application with reference to FIG. 12.

The assembly method according to this embodiment is applied to a structure in which the projecting portion 10a and the sleeve portion 10b of the inner member 10 are separated from each other. The fluid dynamic bearing device according to the first embodiment of the first invention (FIG. 2), the fluid dynamic bearing device according to the modification of the first embodiment of the first invention (FIG. 7), and the fluid dynamic bearing device according to the modification of the second embodiment of the first invention (FIG. 9) each have such a structure in which the projecting portion 10a and the sleeve portion 10b of the inner member 10 are separated from each other. In the following description, the assembly of fluid dynamic bearing device according to the first embodiment (FIG. 2) is described as an example. However, the assembly method according to this embodiment is equivalently applicable to the fluid dynamic bearing devices in the other forms described above.

Figure 12A:
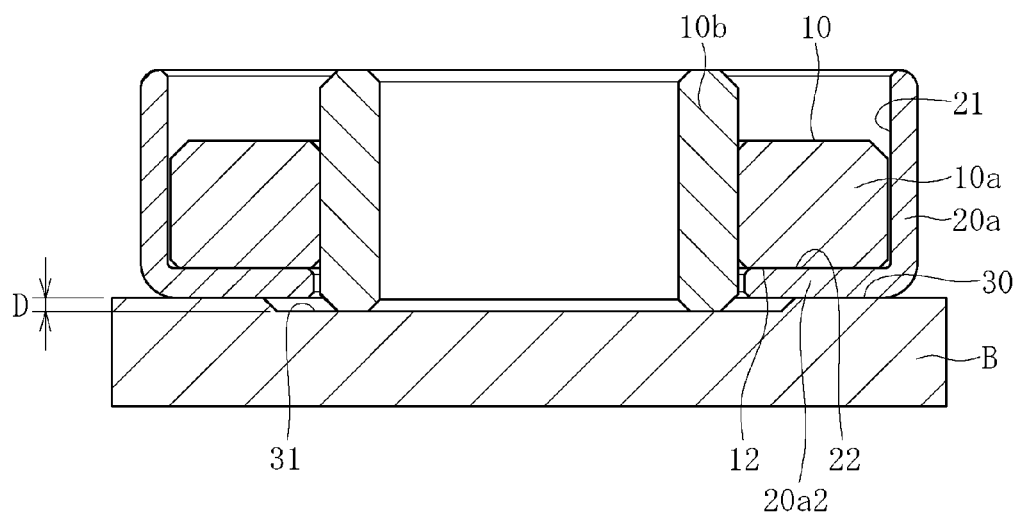
[FIG. 12a] A vertical sectional view illustrating an assembly method for the fluid dynamic bearing device according to the first embodiment of the first invention of the present application.

A jig B illustrated in FIG. 12(a) is a first jig, which has an upper surface to serve as a placing surface 30 and a bottom portion 31 recessed with respect to the placing surface 30 by a dimension D. The first outer member 20a is set on the placing surface 30 of the first jig B in a manner that the radial portion 20a2 of the first outer member 20a is directed downward and an outside surface of the radial portion 20a2 is held in abutment against the placing surface 30. The projecting portion 10a of the inner member 10 is inserted into the first outer member 20a so that the side surface 12 thereof is brought into abutment against the inside surface 22 of the first outer member 20a. In this state, the projecting portion 10a and the sleeve portion 10b of the inner member 10 have not yet been fitted to each other. Next, the sleeve portion 10b is fitted to an inner peripheral surface of the projecting portion 10a, and is press-fitted until a lower end surface of the sleeve portion 10b abuts against the bottom portion 31 of the first jig B. FIG. 12(a) illustrates such a press-fitting completion state.

Figure 12B:
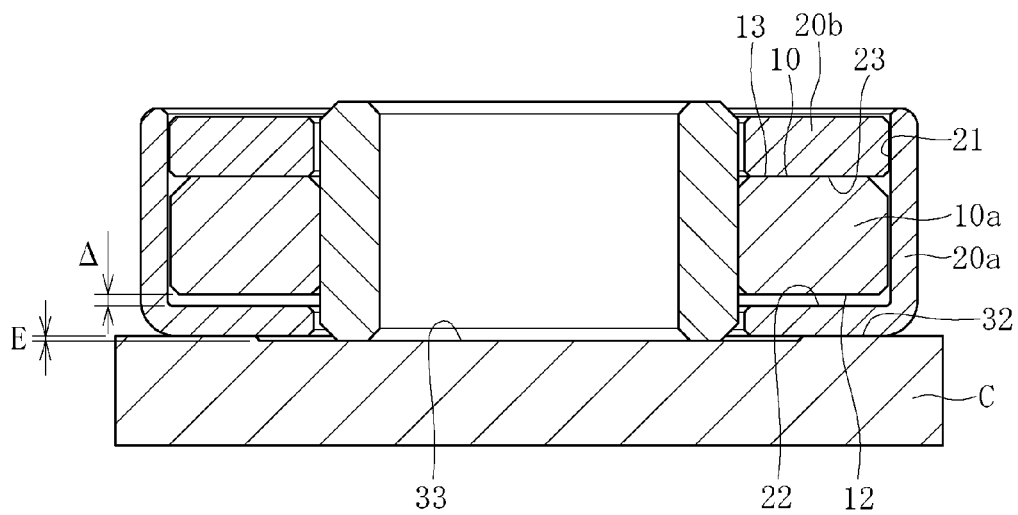
[FIG. 12b] Another vertical sectional view illustrating the assembly method for the fluid dynamic bearing device according to the first embodiment of the first invention of the present application.

After that, the above-mentioned set of the first outer member 20a and the inner member 10 is moved to a second jig C. As illustrated in FIG. 12(b), the second jig C has an upper surface to serve as a placing surface 32 and a bottom surface 33 recessed with respect to the placing surface 32 by a dimension E. The above-mentioned set of the first outer member 20a and the inner member 10 (while the second outer member 20b is not fitted to the inner member 10) is put on the placing surface 32 and the bottom surface 33 of the second jig C. The dimension E of the second jig C is set to be smaller than the dimension D of the first jig B. Thus, the inner member 10 is spaced apart from the first outer member 20a by a dimensional difference Δ (Δ=D−E). The dimensional difference Δ corresponds to a total amount of the thrust bearing gaps T between both the side surfaces 12 and 13 of the inner member 10 and the inside surfaces 22 and 23 of the outer member 20, which respectively face both the side surfaces 12 and 13. After that, the second outer member 20b is fitted to the inner peripheral surface 21 of the first outer member 20a, and is pushed in until the inside surface 23 thereof abuts against the side surface 13 of the projecting portion 10a of the inner member 10. Then, fixation is performed by injecting an adhesive into a fitting part of the first outer member 20a and the second outer member 20b.

According to the above-mentioned assembly method, the simple first jig B and second jig C are used, and hence the thrust bearing gaps can be set easily and with high accuracy. Further, a step of press-fitting the sleeve portion 10b to the projecting portion 10a of the inner member 10 can be simultaneously performed.

Next, description is made of an assembly method for the fluid dynamic bearing device according to the second embodiment of the first invention of the present application.

The assembly method according to this embodiment is applied to a structure in which the projecting portion 10a and the sleeve portion 10b of the inner member 10 are integrated with each other. The fluid dynamic bearing device according to the modification of the first embodiment of the first invention of the present application (FIG. 6) and the fluid dynamic bearing device according to the second embodiment of the first invention of the present application (FIG. 8) each have such a structure in which the projecting portion 10a and the sleeve portion 10b of the inner member 10 are integrated with each other. In the following description, the assembly of the fluid dynamic bearing device according to the second embodiment (FIG. 8) is described as an example. However, the assembly method according to this embodiment is equivalently applicable to the fluid dynamic bearing devices in the other forms described above.

Figure 13:
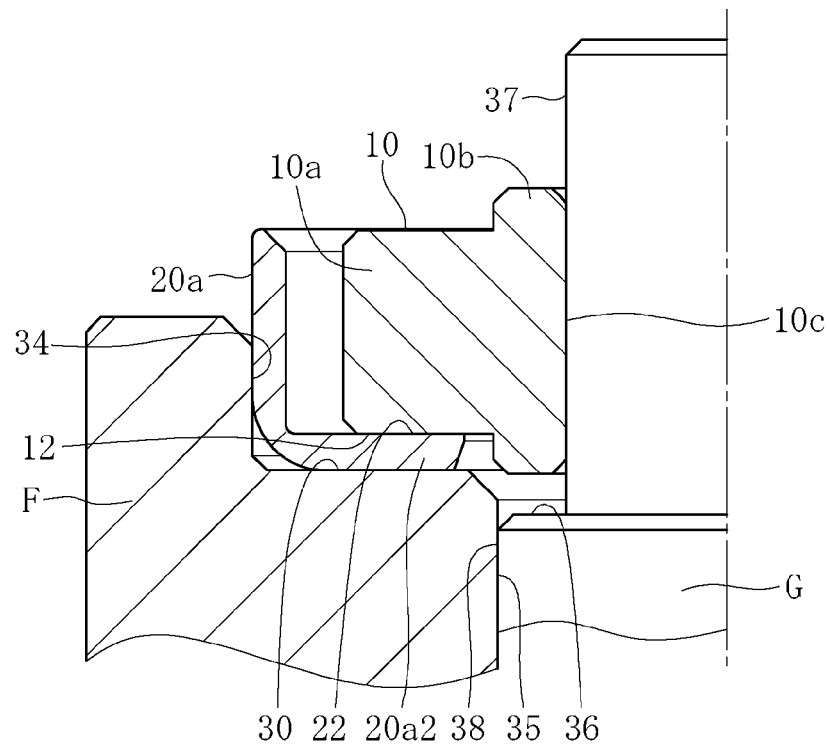
[FIG. 13] A vertical sectional view illustrating an assembly method for the fluid dynamic bearing device according to the second embodiment of the first invention of the present application.

As illustrated in FIG. 13, a jig used in this assembly method is formed of a fixing jig F and a moving jig G which is arranged on an inner periphery of the fixing jig F and movable in a vertical direction. The fixing jig F has the placing surface 30, a guide surface 34, and an inner peripheral surface 35 fitted to the moving jig G in a freely slidable manner. The moving jig G has a shoulder surface 36, a guide surface 37, and an outer peripheral surface 38 fitted to the fixing jig F in a freely slidable manner. In the state illustrated in FIG. 13, the moving jig G is retracted downward. First, the radial portion 20a2 of the first outer member 20a is directed downward and inserted along the guide surface 34 of the fixing jig F so that the outside surface of the radial portion 20a2 is held in abutment against the placing surface 30. In this way, the first outer member 20a is set. Then, after the inner peripheral surface 10c of the sleeve portion 10b of the inner member 10 is fitted to the guide surface 37 of the moving jig G, the inner member 10 is inserted into the first outer member 20a so that the side surface 12 thereof is brought into abutment against the inside surface 22 of the first outer member 20a. In this state, an appropriate load is applied downward to the inner member 10.

Figure 14:
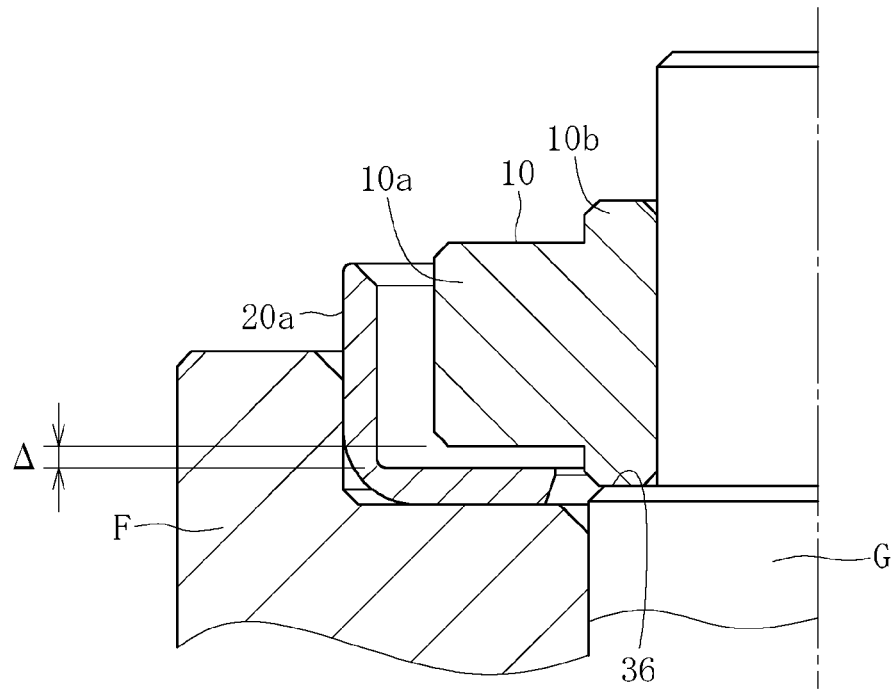
[FIG. 14] A vertical sectional view illustrating the assembly method for the fluid dynamic bearing device according to the second embodiment of the first invention of the present application.

After that, as illustrated in FIG. 14, the moving jig G is raised so that the shoulder surface 36 of the moving jig G is brought into abutment against the lower end surface of the sleeve portion 10b of the inner member 10 that has been inserted in the first outer member 20a. From this position, which is to serve as a reference position, the moving jig G is further raised so that the inner member 10 is spaced apart from the first outer member 20a. Then, the moving jig G is stopped at a position at which the total amount Δ of the thrust bearing gaps T on both the sides is secured. At this position, a static state is maintained.

Figure 15:
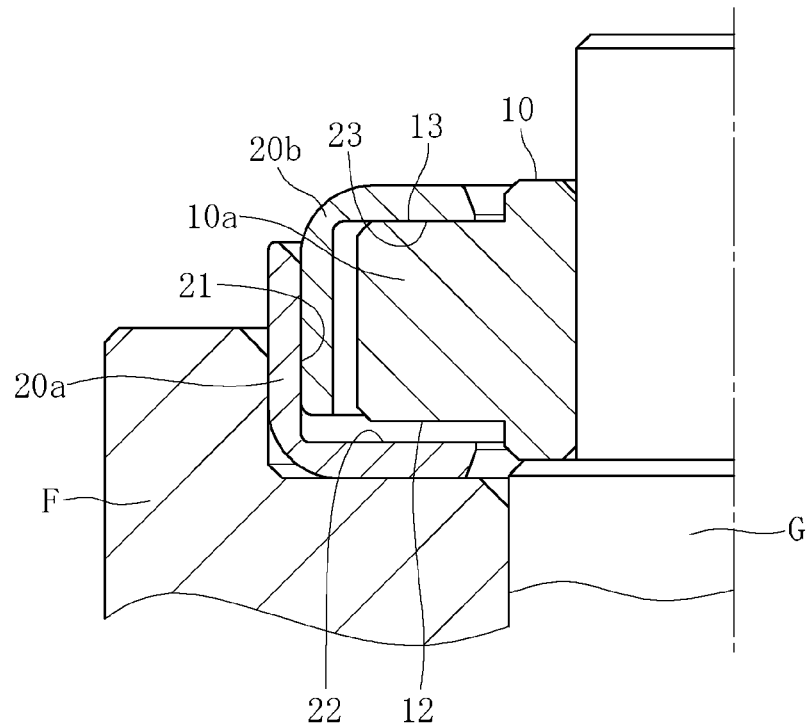
[FIG. 15] A vertical sectional view illustrating the assembly method for the fluid dynamic bearing device according to the second embodiment of the first invention of the present application.
Figure 16:
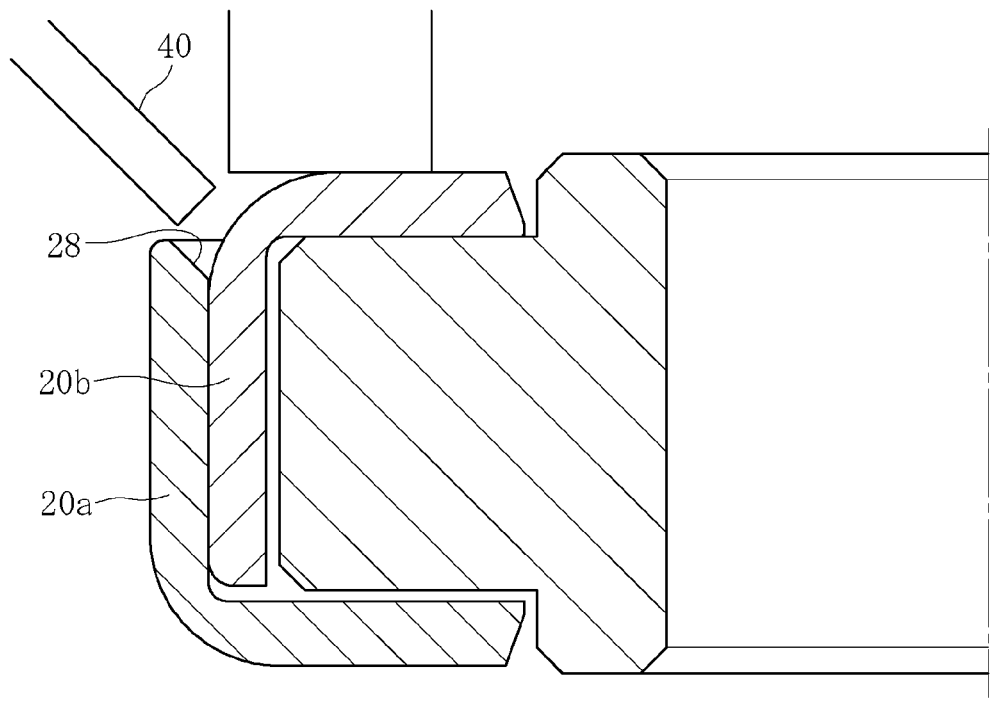
[FIG. 16] A horizontal sectional view illustrating a state in which an adhesive is injected into a fitting portion of the inner member and an outer member of the fluid dynamic bearing device according to the second embodiment of the first invention of the present application.

Next, as illustrated in FIG. 15, the second outer member 20b is fitted to the inner peripheral surface 21 of the first outer member 20a, and is pushed in until the inside surface 23 thereof abuts against the side surface 13 of the projecting portion 10a of the inner member 10. In this way, a gap by an amount equal to the total amount Δ of the thrust bearing gaps T on both the sides can be set between the inside surface 22 of the second outer member 20b and the side surface 12 of the projecting portion 10a of the inner member 10.

In the above-mentioned assembly method, by using the fixing jig F and the moving jig G, the thrust bearing gaps can be set with high accuracy. In addition, by adjusting a moving distance of the moving jig G between the reference position and the stop position, setting of the thrust bearing gaps T can be adjusted.

After the setting of the thrust bearing gaps T as described above is completed, as illustrated in FIG. 16, an adhesive is injected from a nozzle 40 into the fitting part of the first outer member 20a and the second outer member 20b. The end surface of the cylindrical portion 20a1 of the first outer member 20a is positioned to be lower than an outside surface of the radial portion 20b2 of the second outer member 20b, and is provided with the chamfered portion 28, which facilitates injection of the adhesive. After that, the adhesive is cured through baking. When the adhesive is anaerobic, it is unnecessary to perform baking.

Figure 17A:
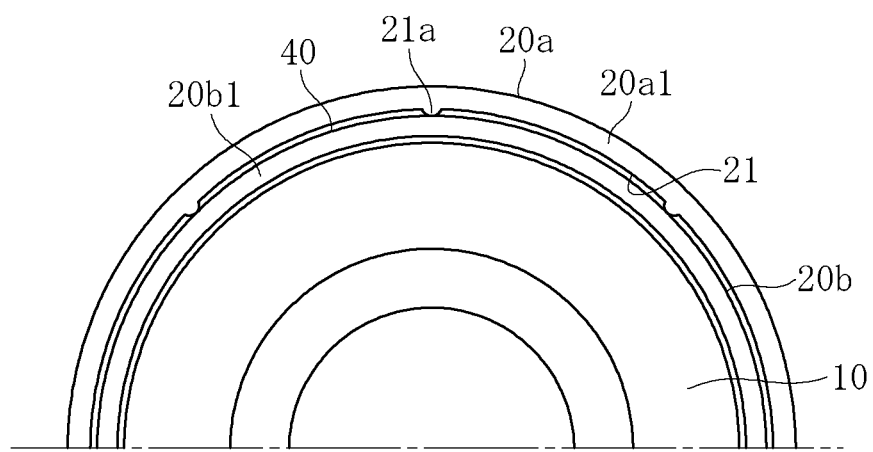
[FIG. 17a] A horizontal sectional view of the fitting portion of the inner member and the outer member of the fluid dynamic bearing device according to the second embodiment of the first invention of the present application.
Figure 17B:
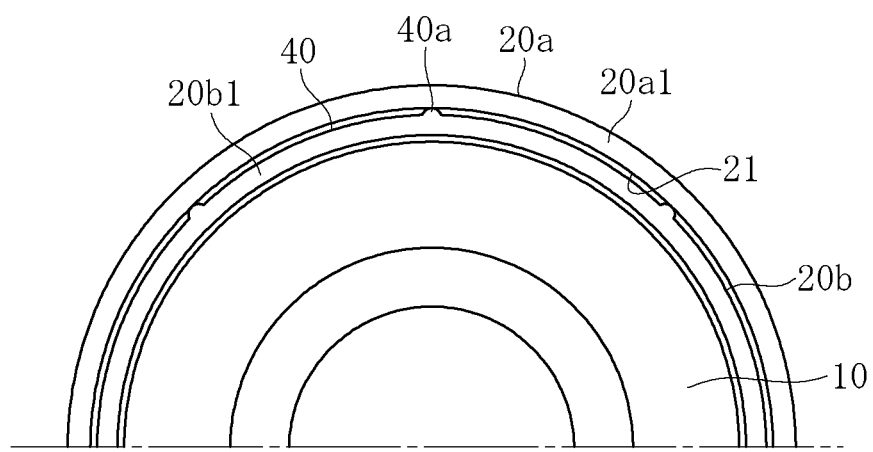
[FIG. 17b] A horizontal sectional view of a fitting portion of the inner member and the outer member of the fluid dynamic bearing device according to a modification of the second embodiment of the first invention of the present application.

FIG. 17 are each a horizontal sectional view of a structure in which the first outer member 20a and the second outer member 20b are fitted to and temporarily fixed to each other. As illustrated in FIG. 17(a), a plurality of protruding portions 21a are provided on the inner peripheral surface 21 of the cylindrical portion 20a1 of the first outer member 20a. Those protruding portions 21a are press-fitted to an outer peripheral surface 40 of the cylindrical portion 20b1 of the second outer member 20b. With this, press-fitting can be performed without deterioration of accuracies of the first outer member 20a and the second outer member 20b. In this state, for the purpose of securing sealability, an epoxy or anaerobic adhesive is continuously injected. In this way, bonding is performed. FIG. 17(b) illustrates a plurality of protruding portions 40a which are provided on the outer peripheral surface 40 of the cylindrical portion 20b1 of the second outer member 20b in contrast to those illustrated in FIG. 17(a). Sizes and the numbers of the protruding portions 21a and 40a can be appropriately set as long as the protruding portions 21a and 40a can be press-fitted without deteriorating the accuracies of the first outer member 20a and the second outer member 20b.

The lubricating oil is injected into a space between the inner member 10 and the outer member 20 assembled to each other as described above, including the inner pores of the inner member 10 made of a sintered metal. After that, heating is performed up to a set temperature higher than a maximum expected temperature (upper limit) in a use environment of the fluid dynamic bearing device 4. Then, apart of the lubricating oil, which has overflowed from inner-diameter-side end portions of the thrust bearing gaps T due to thermal expansion at this time, is wiped off. After that, by cooling down to a normal temperature, the lubricating oil shrinks. As a result, the oil level is retracted to a bearing interior side (outer diameter side), and is maintained in vicinities of the inner-diameter-side end portions of the thrust bearing gaps T or within the sealed spaces S1 and S2. With this, the lubricating oil does not overflow due to thermal expansion within an expected temperature range. In this way, the fluid dynamic bearing device 4 is completed.

In the above-mentioned embodiment, the dynamic pressure generating grooves 11a, 12a, 13a, 22a, and 23a are each formed in a herringbone pattern. Instead, there may be employed appropriate dynamic pressure generating grooves formed in a spiral pattern, a stepped pattern, a circular-arc pattern, or the like.

(Embodiments of a Second Invention of the Present Application)

Next, description is made of embodiments of a second invention of the present application with reference to FIGS. 18 to 33.

Figure 18:
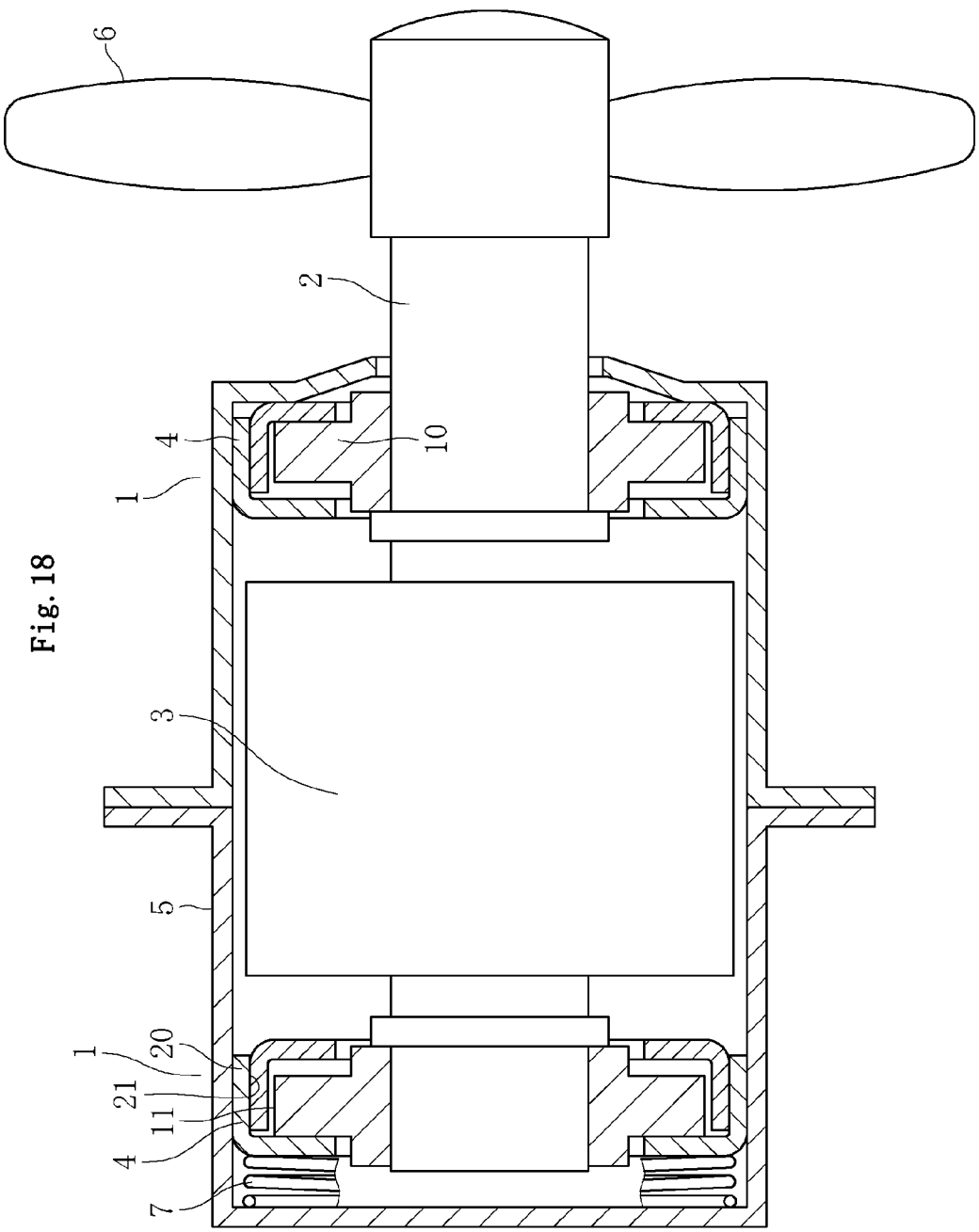
[FIG. 18] A vertical sectional view of a bearing unit for an exhaust fan motor (when the motor is stopped).

FIG. 18 is an axial sectional view of a bearing unit 1 incorporating a fluid dynamic bearing device according to a first embodiment of the second invention of the present application. The bearing unit 1 is used, for example, by being incorporated into a motor for a small exhaust fan for a 24-hour ventilation system to be installed in a dwelling room of a house (more strictly speaking, inner-rotor motor for an exhaust fan). The bearing unit 1 comprises a pair of fluid dynamic bearing devices 4 and 4 arranged at both axial end positions of a motor rotor 3 between a rotary shaft 2 and a housing 5 so that a rotator comprising the rotary shaft 2, a motor rotor 3 fixed to an outer peripheral surface of the rotary shaft 2, and a fan 6 provided at an end portion of the rotary shaft 2 is supported in a freely rotatable manner. Between one fluid dynamic bearing device 4 (left side in FIG. 18) and the housing 5, a spring 7 is arranged in a compressed state. Note that, FIG. 18 illustrates a state in which the motor (rotary shaft 2) is stopped. Further, stators are not shown.

Figure 19:
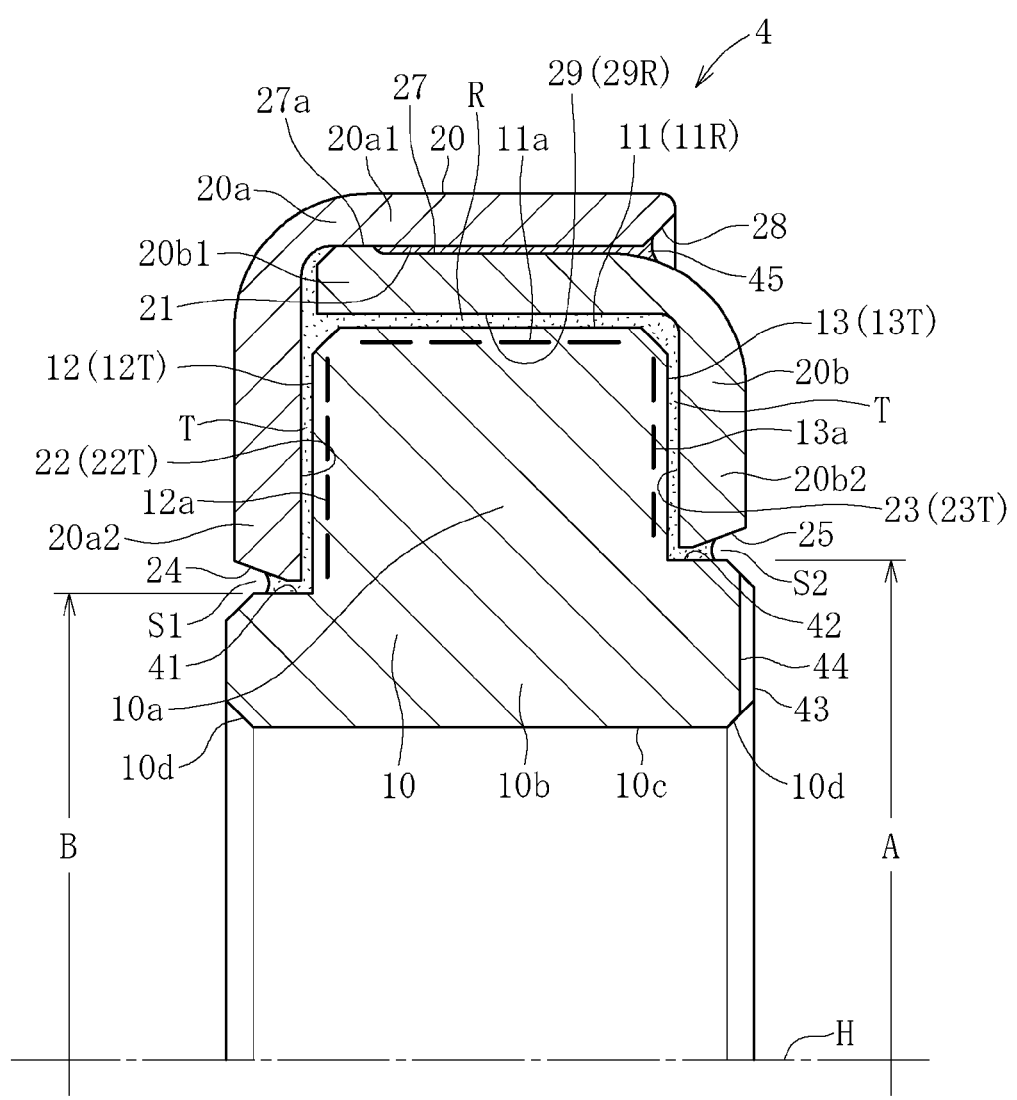
[FIG. 19] A vertical sectional view of a fluid dynamic bearing device according to a first embodiment of a second invention of the present application.

As illustrated in FIG. 19, the fluid dynamic bearing devices 4 each comprise an inner member 10 and an outer member 20 for supporting the inner member 10 in a freely rotatable manner. FIG. 19 illustrates an upper half of the fluid dynamic bearing device 4 with respect to an axial line H. The same applies to embodiments, hereinbelow. The inner member 10 is fixed to the rotary shaft 2, and the outer member 20 is fitted to an inner peripheral surface of the housing 5, specifically, mounted to be slidable in an axial direction (refer to FIG. 18). A lubricating oil is interposed between surfaces of the inner member 10 and the outer member 20, which face each other in the axial direction and a radial direction (radial bearing gap R and thrust bearing gaps T) (refer to FIG. 19). Note that, the fluid dynamic bearing devices 4 and 4 in FIG. 18 have the same structure.

As illustrated in FIG. 19, the inner member 10 comprises a projecting portion 10a and a sleeve portion 10b, which are each made of a sintered metal. The projecting portion 10a has an outer peripheral surface 11 and both side surfaces 12 and 13. The outer peripheral surface 11 forms a radial bearing surface 11R, and both the side surfaces 12 and 13 respectively form thrust bearing surfaces 12T and 13T. The outer peripheral surface 11 is formed into a shape of a cylindrical surface, and is held in contact with the lubricating oil filling the radial bearing gap R. Dynamic pressure generating grooves 11a are formed in the outer peripheral surface 11 of the projecting portion 10a. In detail, as illustrated in FIG. 20(b), the projecting portion 10a has a herringbone pattern in which the dynamic pressure generating grooves 11a formed all over the outer peripheral surface 11 and each bent into a V-shape and hill portions 11b (indicated by cross-hatching in FIG. 20(b)) defining the dynamic pressure generating grooves 11a are arranged alternately with each other in a circumferential direction. The dynamic pressure generating grooves 11a are formed, for example, by a rolling process. In this embodiment, the projecting portion 10a of the inner member 10 is made of a sintered metal, and hence plastic flow of the outer peripheral surface 11 of the projecting portion 10a, which is generated by compression along with the rolling process, can be absorbed by inner pores of the sintered metal. Thus, swelling of a surface of the projecting portion 10a, which is caused by the plastic flow, is suppressed, and hence the dynamic pressure generating grooves 11a and the hill portions 11b can be formed with high accuracy.

Both the side surfaces 12 and 13 of the projecting portion 10a of the inner member 10 are each formed of a radial flat surface orthogonal to the axial line H, and are held in contact with the lubricating oil filling the thrust bearing gaps T. Dynamic pressure generating grooves 12a and 13a are formed respectively in both the side surfaces 12 and 13 of the projecting portion 10a. Specifically, refer to FIGS. 20(a) and 20(c). FIG. 20(a) illustrates the side surface 12 on a left side of the projecting portion 10a, and FIG. 20(c) illustrates the side surface 13 on a right side of the projecting portion 10a. As illustrated in FIGS. 20(a) and 20(c), the projecting portion 10a has a herringbone pattern in which the dynamic pressure generating grooves 12a and 13a respectively formed all over both the side surfaces 12 and 13 and each bent into a V-shape and hill portions 12b and 13b (indicated by cross-hatching in FIGS. 20(a) and 20(c)) respectively defining the dynamic pressure generating grooves 12a and 13a are arranged alternately with each other in the circumferential direction. The projecting portion 10a of the inner member 10 is made of a sintered metal, and hence the dynamic pressure generating grooves 12a and 13a of both the side surfaces 12 and 13 can be formed by a pressing process with high accuracy. Further, simultaneously with sizing of the projecting portion 10a, the dynamic pressure generating grooves 12a and 13a can be formed by molding.

As illustrated in FIG. 19, the sleeve portion 10b is formed to be longer than a width between both the side surfaces 12 and 13 of the projecting portion 10a, and projects in the axial direction with respect to both the side surfaces 12 and 13. At both axial end portions of an inner peripheral surface 10c of the sleeve portion 10b, which has a shape of a cylindrical surface, there are provided chamfered portions 10d. The inner member 10 is fixed to the rotary shaft 2, for example, by press-fitting (lightly press-fitting) the inner peripheral surface 10c to the outer peripheral surface of the rotary shaft 2, or by interposing an adhesive between the inner peripheral surface 10c and the outer peripheral surface of the rotary shaft 2.

In this embodiment, the dynamic pressure generating grooves 11a, 12a, and 13a are each formed in a herringbone pattern, and are provided for a uni-directional rotation. For identification of the rotational direction, indicators are provided as follows. An outer diameter dimension A of an outer peripheral surface 42 of a right end portion of the sleeve portion 10b is set to be larger than an outer diameter dimension B of an outer peripheral surface 41 of a projecting left end portion of the sleeve portion 10b. In order that a rotational direction of the inner member 10 can be identified as a rightward direction (clockwise direction) based on a relationship of these outer diameter dimensions A and B, it suffices that the outer diameter dimension A is arranged on the right side as illustrated in FIG. 19. Further, a right end surface 43 of the sleeve portion 10b is provided with identification grooves 44. In order that the rotational direction of the inner member 10 can be identified as a rightward direction (clockwise direction), it suffices that this end portion of the sleeve portion 10b, which is provided with the identification grooves 44, is arranged on the right side as illustrated in FIG. 19. In this embodiment, the identification indicators of those two types, that is, the outer diameter dimensions A and B and the identification grooves 44 are provided to the sleeve portion 10b, but only one of those two types may be provided. Further, in the above description, when the identification indicator is arranged on the right side, the rotational direction is set to the rightward direction. Reversely, the rotational direction may be set to the leftward direction (counterclockwise direction).

Figure 23:
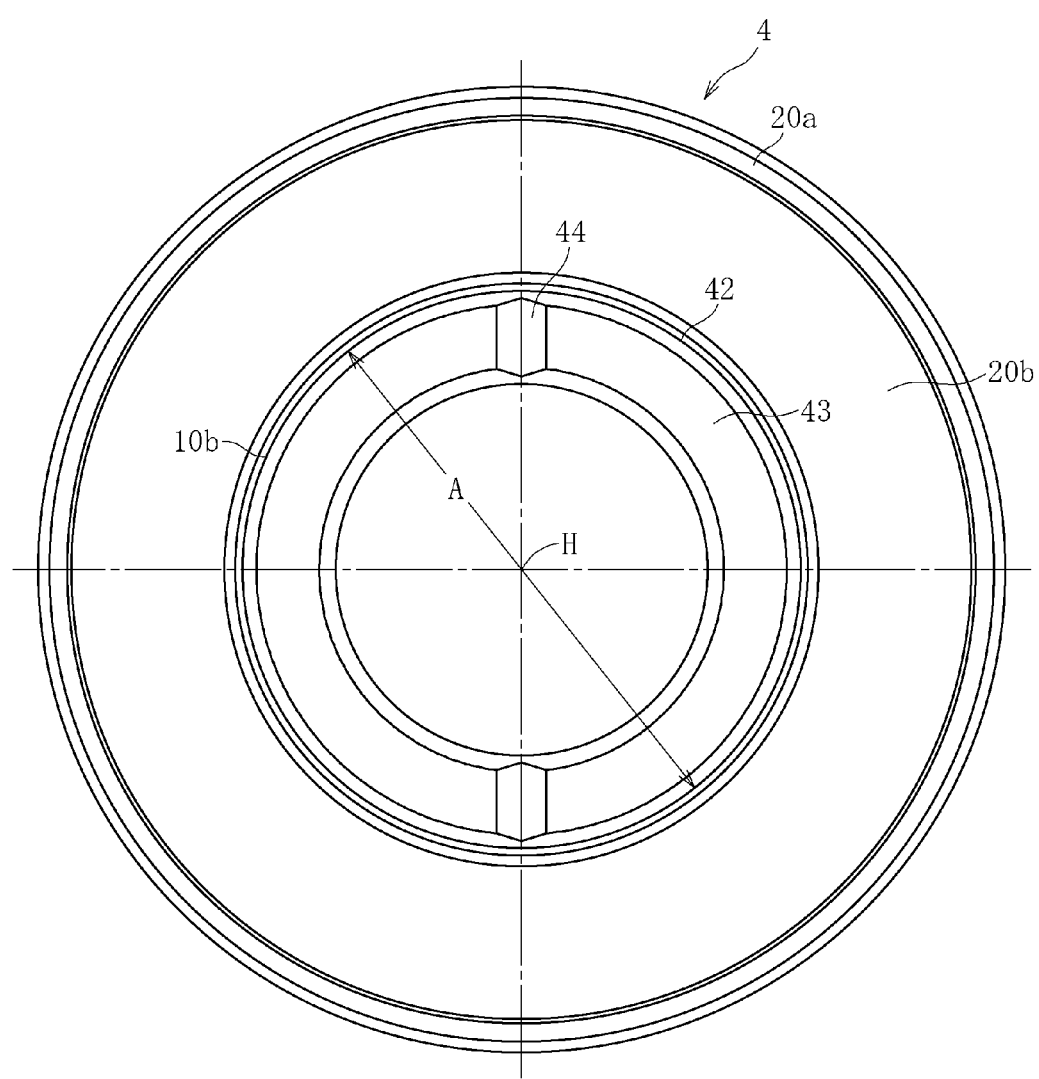
[FIG. 23] A front view of indicators for identifying a rotational direction.

FIG. 23 illustrates the identification grooves 44 in detail. FIG. 23 is a right side view of the fluid dynamic bearing device 4, illustrating the entire side surface comprising a lower half with respect to the axial line H of the fluid dynamic bearing device 4. An inside outer member 20b is fitted to an outside outer member 20a, and a fitting portion thereof is fixed by bonding. The end surface 43 of the sleeve portion 10b of the inner member 10 is provided with the identification grooves 44. The identification grooves 44 are formed at two points on a diameter, and those identifications groove 44 are formed by a powder molding step or a sizing step for the inner member 10 made of a sintered metal. Thus, the identification grooves are formed in a manufacturing step for the inner member 10, and hence an increase in cost is prevented. A shape of each of the identification grooves 44 is not limited to the above-mentioned one. For example, identification grooves each having an arrow shape directly indicating the rotational direction may be provided. Further, the dimension A of the outer peripheral surface 42 of the end portion of the sleeve portion 10b of the inner member 10 is set to be larger. The outer peripheral surface 42 of the end portion is also formed by a powder molding step or a sizing step. The indicators for identifying the rotational direction are not limited to the above-mentioned ones. For example, an indicator indicating the rotational direction may be provided on an outer surface of the outer member 20, or the outside outer member 20a and the inside outer member 20b may be formed to have surfaces different from each other in hue. In order to form the surfaces different from each other in hue, materials different from each other in hue are used, or surface treatment is performed.

A copper-iron based material is used as a material for a sintered metal of the projecting portion 10a as the part forming the bearing surface of the inner member 10, and a formulation ratio of copper is set to range from 20% to 80%. When the formulation ratio of the copper is less than 20%, there arise problems with formability of the dynamic pressure generating grooves and lubricity therein. Meanwhile, when the formulation ratio of the copper exceeds 80%, it is difficult to secure abrasion resistance. It is desired to use the copper-iron based material in terms of lubricity, but an iron based material may also be used. Note that, whether the copper-iron based material is used or the iron based material is used, it is necessary to set the surface pore rate to range from 2% to 20%. When the surface pore rate is less than 2%, the lubricating oil does not sufficiently circulate. Meanwhile, when the surface pore rate exceeds 20%, pressure of the lubricating oil decreases. Further, the density of the copper-iron based sintered material is set to range from 6 g/cm$^3$ to 8 g/cm$^3$ so that communication properties of the lubricating oil and plastic working properties are maintained.

As illustrated in FIG. 19, both the outside outer member 20a and the inside outer member 20b of the outer member 20 are formed into a substantially L-shape in vertical cross-section. Specifically, the outside outer member 20a comprises a cylindrical portion 20a1 and a radial portion 20a2 formed along one end of the cylindrical portion 20a1. Further, the inside outer member 20b comprises a cylindrical portion 20b1 and a radial portion 20b2 formed along one end of the cylindrical portion 20b1. At an opening end portion (left end portion in FIG. 19) of an outer peripheral surface 27 of the cylindrical portion 20b1 of the inside outer member 20b, there is provided a projection portion 27a. This projection portion 27a is press-fitted along an inner peripheral surface 21 of the cylindrical portion 20a1 of the outside outer member 20a. Then, under a state in which the thrust bearing gaps are set, the outside outer member 20a and the inside outer member 20b are temporarily fixed to each other by the projection portion 27a, and are fixed to each other by an adhesive 45 interposed therebetween. The projection portion 27a has been partially press-fitted to the inner peripheral surface 21 of the cylindrical portion 20a1 of the outside outer member 20a, and hence accuracies of the outside outer member 20a and the inside outer member 20b are not compromised.

The end surface of the cylindrical portion 20a1 of the outside outer member 20a is positioned to be lower than the outside surface of the radial portion 20b2 of the inside outer member 20b, and is provided with a chamfered portion 28, which facilitates injection of the adhesive 45. The outside outer member 20a and the inside outer member 20b are each formed into a substantially L-shape through a pressing process on a plate member. Specifically, a stainless steel plate, a cold rolling steel plate, or the like is used as the plate member, and a plate thickness thereof is set to range approximately from 0.1 mm to 1 mm. In this embodiment, an inner peripheral surface 29 of a cylindrical portion 20b1 of the inside outer member 20b forms a radial bearing surface 29R. An inside surface 22 of the radial portion 20a2 of the outside outer member 20a and an inside surface 23 of the radial portion 20b2 of the inside outer member 20b respectively form thrust bearing surface 22T and 23T. The inner peripheral surface 29 and the inside surfaces 22 and 23 are each formed of an even and smooth surface, and the dynamic pressure generating grooves 11a, 12a, and 13a are formed respectively in the outer peripheral surface 11 and both the side surfaces 12 and 13 of the projecting portion 10a of the inner member 10. A small-diameter inner peripheral surface 24 at the inner-diameter-side end portion of the radial portion 20a2 of the outside outer member 20a and a small-diameter inner peripheral surface 25 at the inner-diameter-side end portion of the inside outer member 20b are each formed into a shape of a tapered surface increasing in diameter toward the outside. Sealed spaces 51 and S2 are formed between the small-diameter inner peripheral surfaces 24 and 25 and the end-portion outer peripheral surfaces 41 and 42 of the sleeve portion 10b of the inner member 10. With this, leakage of the lubricating oil to the outside is more effectively prevented. In this structure, the fitting length between the inner peripheral surface 21 of the cylindrical portion 20a1 and the outer peripheral surface 27 of the cylindrical portion 20b1 is large, and hence stable assembly and fixation by bonding can be achieved.

Figure 21A:
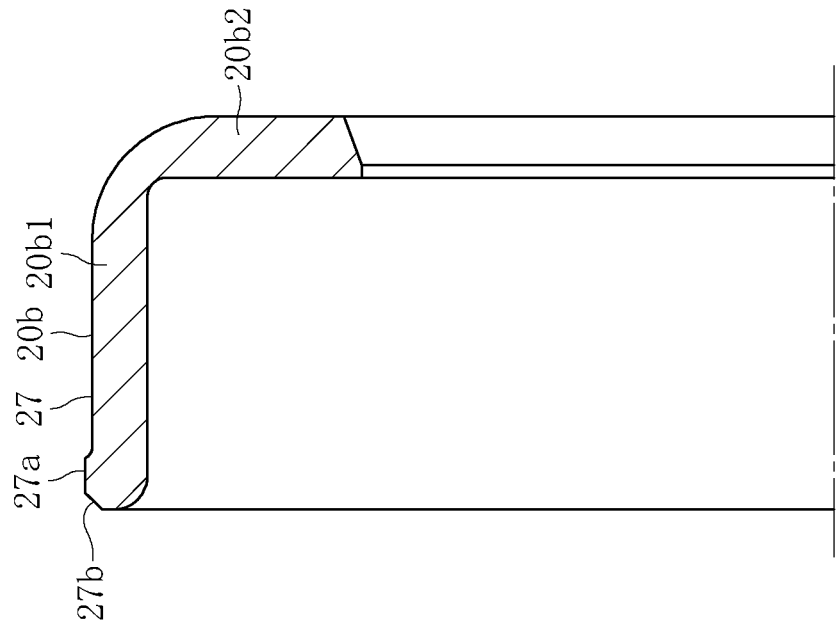
[FIG. 21a] A vertical sectional view of an inside outer member.
Figure 21B:
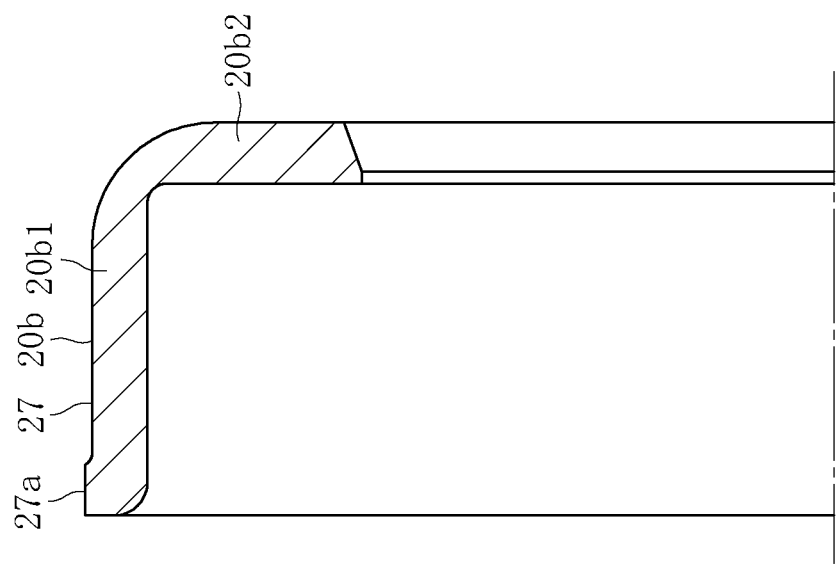
[FIG. 21b] A vertical sectional view of the inside outer member according to a modification.

Next, description is made of a form of the projection portion 27a with reference to FIG. 21. The projection portion 27a illustrated in FIG. 21 is provided as an annular circumferential projection along the opening end portion of the outer peripheral surface 27 of the cylindrical portion 20b1 of the inside outer member 20b. The projection portion 27a illustrated in FIG. 21(a) is formed of a fracture surface at the time of a pressing process on the inside outer member 20b. The chamfered portion 28 (refer to FIG. 19) is provided along the end surface of the cylindrical portion 20a1 of the outside outer member 20a, and hence the projection portion 27a can be press-fitted even when the projection portion 27a is formed of a fracture surface. In this case, it is unnecessary to perform an additional process for the projection portion 27a. The projection portion 27a illustrated in FIG. 21(b) is provided with a chamfered portion 27b which is provided at a leading end portion on the press-fitting side of the projection portion 27a illustrated in FIG. 21(a). The chamfered portion 27b thus provided facilitates press-fitting. When the outer peripheral surface 27 of the cylindrical portion 20b1 of the inside outer member 20b is inserted along the inner peripheral surface 21 of the cylindrical portion 20a1 of the outside outer member 20a, the projection portion 27a is partially press-fitted. Thus, the outside outer member 20a and the inside outer member 20b can be temporarily fixed to each other without compromised accuracy.

Figure 22B:
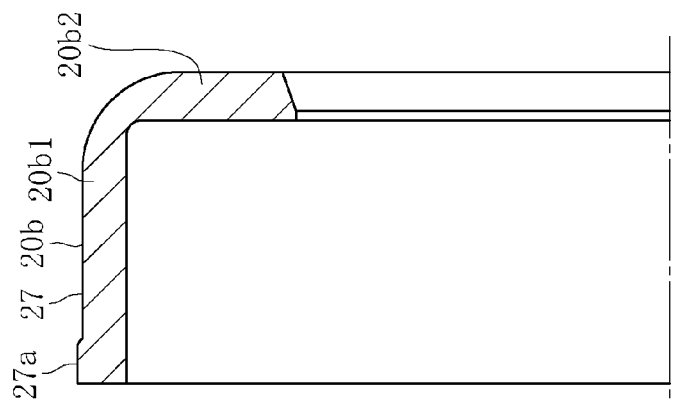
[FIG. 22b] A vertical sectional view of the inside outer member according to the another modification.
Figure 22A:
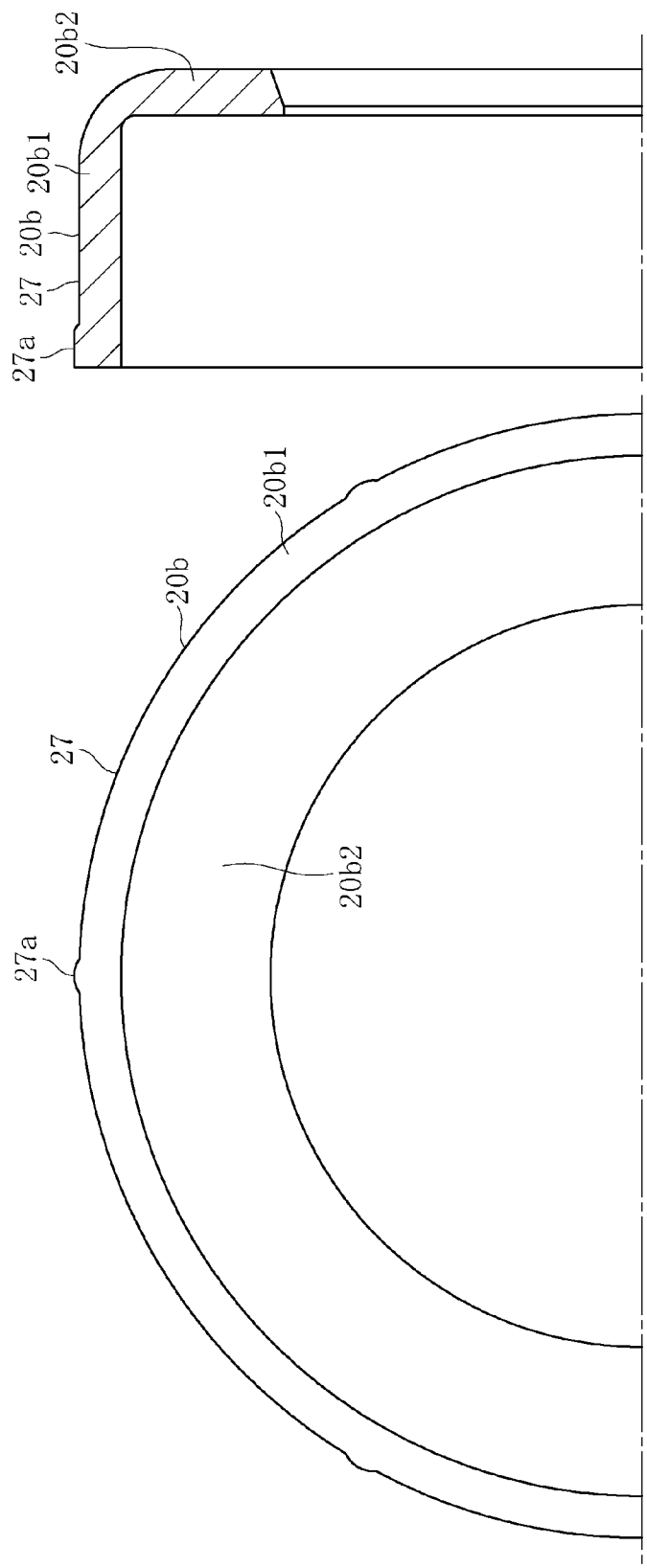
[FIG. 22a] A front view of the inside outer member according to another modification.

FIG. 22 illustrate a modification of this embodiment. FIG. 22(a) is a side view of the inside outer member 20b, and FIG. 22(b) is a vertical sectional view thereof. In this modification, the projection portion 27a comprises projection portions 27a provided at six points in the circumferential direction on the outer peripheral surface 27 of the cylindrical portion 20b1 of the inside outer member 20b. In this case, press-fitting parts of the projection portions 27a are much smaller, and hence the accuracies of the outside outer member 20a and the inside outer member 20b are further maintained. Sizes and the numbers of the projection portions 27a can be appropriately set as long as the projection portions 27a can be press-fitted without deteriorating the accuracies of the outside outer member 20a and the inside outer member 20b.

The lubricating oil is filled into an interior space of the fluid dynamic bearing device 4 structured as described above, including the inner pores of the inner member 10 made of a sintered metal. As illustrated in FIG. 19, the lubricating oil fills the radial bearing gap R, the thrust bearing gaps T, and the sealed spaces S1 and S2. A capillary force of the thrust bearing gaps T causes the lubricating oil to be drawn into an outer diameter side (radial bearing gap R side). An oil level of the lubricating oil is maintained in each of the sealed spaces S1 and S2. Note that, the capillary force of the thrust bearing gaps T causes the lubricating oil to be drawn into the outer diameter side (radial bearing gap R side), and hence the fluid dynamic bearing device 4 may be designed without being provided with the sealed spaces S1 and S2.

As illustrated in FIG. 18, in the bearing unit 1 incorporating the above-mentioned fluid dynamic bearing devices 4, the spring 7 urges the outer member 20 of the fluid dynamic bearing device 4 on the left side of FIG. 18 into a right direction of FIG. 18. Thus, in a static state of the rotary shaft 2 (state of FIG. 18), the outer member 20 urged by the spring 7 is held in abutment against the inner member 10, and hence the inner member 10 and the rotary shaft 2 are urged to the right direction of FIG. 18. With this, the inner member 10 of the right fluid dynamic bearing device 4 of FIG. 18 is urged to the right direction of FIG. 18, with the result of being held in abutment against and engaged with the outer member. In other words, the housing 5 and the spring 7 apply a preload in a direction in which the pair of fluid dynamic bearing devices 4 and 4 comes close to each other.

Figure 24:
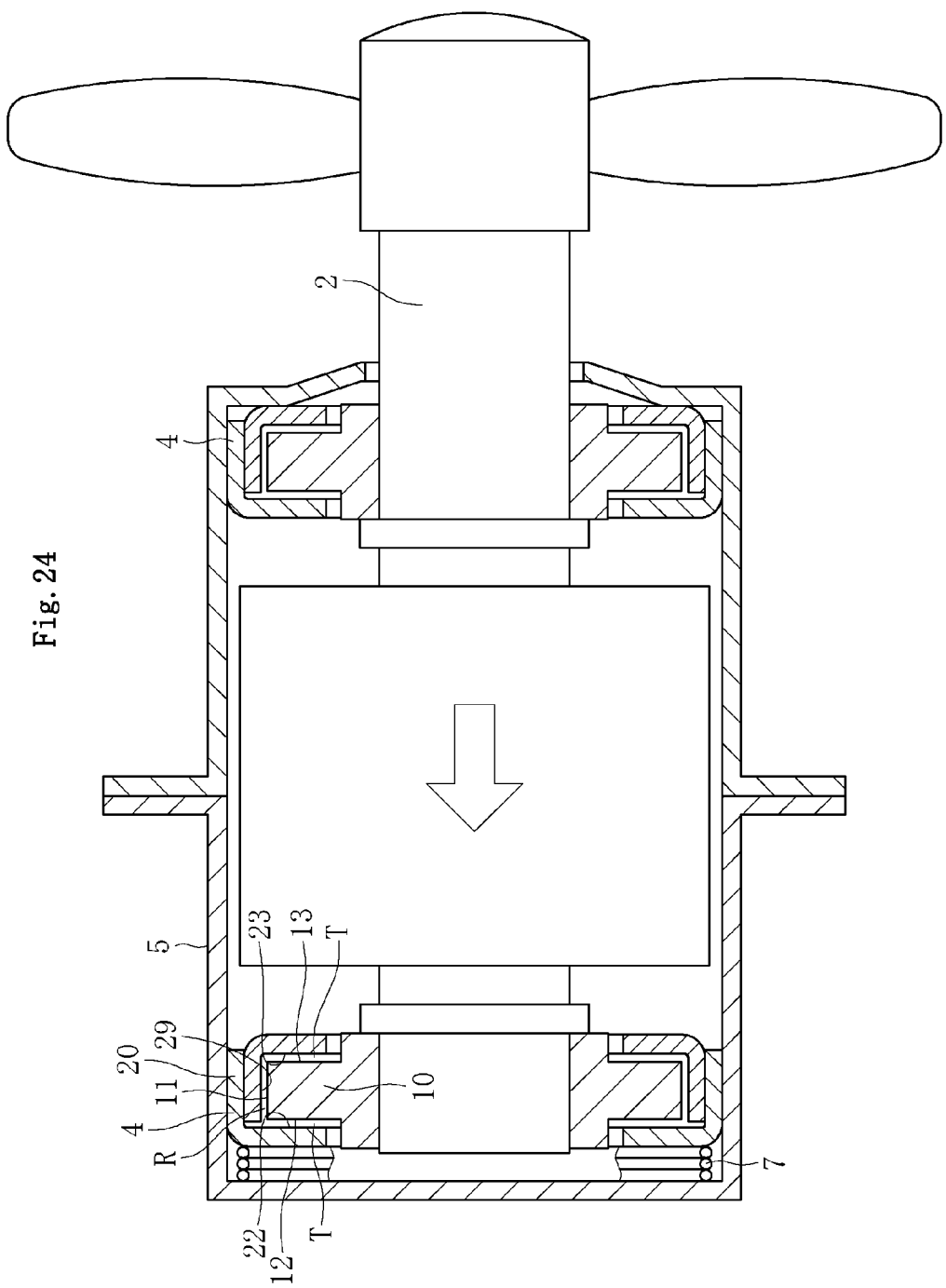
[FIG. 24] A vertical sectional view of a bearing unit for an exhaust fan motor (when the motor is rotated).

As illustrated in FIG. 24, when the rotary shaft 2 is rotated, in each of the fluid dynamic bearing devices 4, an oil film is formed in the radial bearing gap R between the outer peripheral surface 11 of the inner member 10 and the inner peripheral surface 29 of the outer member 20. Then, in accordance with the rotation of the rotary shaft 2, pressure of the oil film in the radial bearing gap R is increased by the dynamic pressure generating grooves 11a. Such a dynamic pressure action of the oil film causes the rotary shaft 2 and the inner member 10 to be supported in a non-contact manner in a radial direction with respect to the outer member 20 mounted to the static-side member.

Simultaneously, in each of the fluid dynamic bearing devices 4, an oil films are formed respectively in the thrust bearing gaps T between both the side surfaces 12 and 13 of the inner member 10 and the inside surfaces 22 and 23 of the outer member 20 respectively facing both the side surfaces 12 and 13. In accordance with the rotation of the rotary shaft 2, pressure of the oil films in the thrust bearing gaps T is increased by the dynamic pressure generating grooves 12a and 13a. In this way, the rotary shaft 2 and the inner member 10 are supported in a non-contact manner in both thrust directions with respect to the outer member 20 mounted to the static-side member. Note that, the radial bearing gap R and the thrust bearing gaps T in the illustration are exaggerated in size.

When the dynamic pressure action in the lubricating oil in the thrust bearing gaps T is caused by the rotation of the rotary shaft 2, the rotary shaft 2 bears a load to the left side in FIG. 24 (refer to a hollow arrow in FIG. 24). At this time, the outer member 20 of the left the fluid dynamic bearing device 4 of FIG. 24 is slid to the left side of FIG. 24 to compress the spring 7. With this, the thrust bearing gaps T are secured in each of both the fluid dynamic bearing devices 4 and 4. In this way, when the outer member 20 is fitted to the housing 5 in a manner that the outer member 20 is axially movable with respect to the housing 5, the thrust bearing gaps T can be set with high accuracy. With this, the inner member 10 is reliably supported in a non-contact manner with respect to the outer member 20. As a result, noise generation that may be caused by contact sliding is more reliably prevented.

Further, in this bearing unit 1, the spring 7 applies an axial preload to both the fluid dynamic bearing devices 4 and 4. Thus, even under a state in which the outer member 20 is fitted to the housing 5 across a gap, a situation in which the outer member 20 is rotated in accordance with the rotation of the rotary shaft 2 is prevented. Meanwhile, when an elastic force of the spring 7 is excessively large, the inner member 10 and the outer member 20 may come into sliding contact with each other. Thus, the elastic force of the spring 7 is set within such a range that the outer member 20 is prevented from being rotated and the outer member 20 and the inner member 10 are prevented from coming into sliding contact with each other. For example, it is desired that the elastic force of the spring 7 be set approximately to range from 20% to 80% of a load capacity of the dynamic pressure action generated in the thrust bearing gaps T.

In the fluid dynamic bearing device 4 structured as described above, the inner member 10 is provided in the axial direction between both the inside surfaces 22 and 23 of the outer member 20. Thus, when both the inside surfaces 22 and 23 of the outer member 20 and both the side surfaces 12 and 13 of the inner member 10 are respectively engaged with each other in the axial direction, the inner member 10 is prevented from dropping off from an inner periphery of the outer member 20. With this, the inner member 10 and the outer member 20 are prevented from being separated from each other, and hence the fluid dynamic bearing device 4 can be integrally treated. As a result, the fluid dynamic bearing device 4 is more easily mounted to the rotary shaft 2 and the housing 5.

Further, in accordance with the rotation of the rotary shaft 2, a centrifugal force acts on the lubricating oil in the thrust bearing gaps T. Thus, the lubricating oil is pushed into an outer diameter side (radial bearing gap R side). With this centrifugal force and the capillary force which is generated by the thrust bearing gaps T, leakage of the lubricating oil to the outside is prevented. Thus, it is unnecessary to provide a special sealing mechanism to the fluid dynamic bearing device 4.

Figure 25:
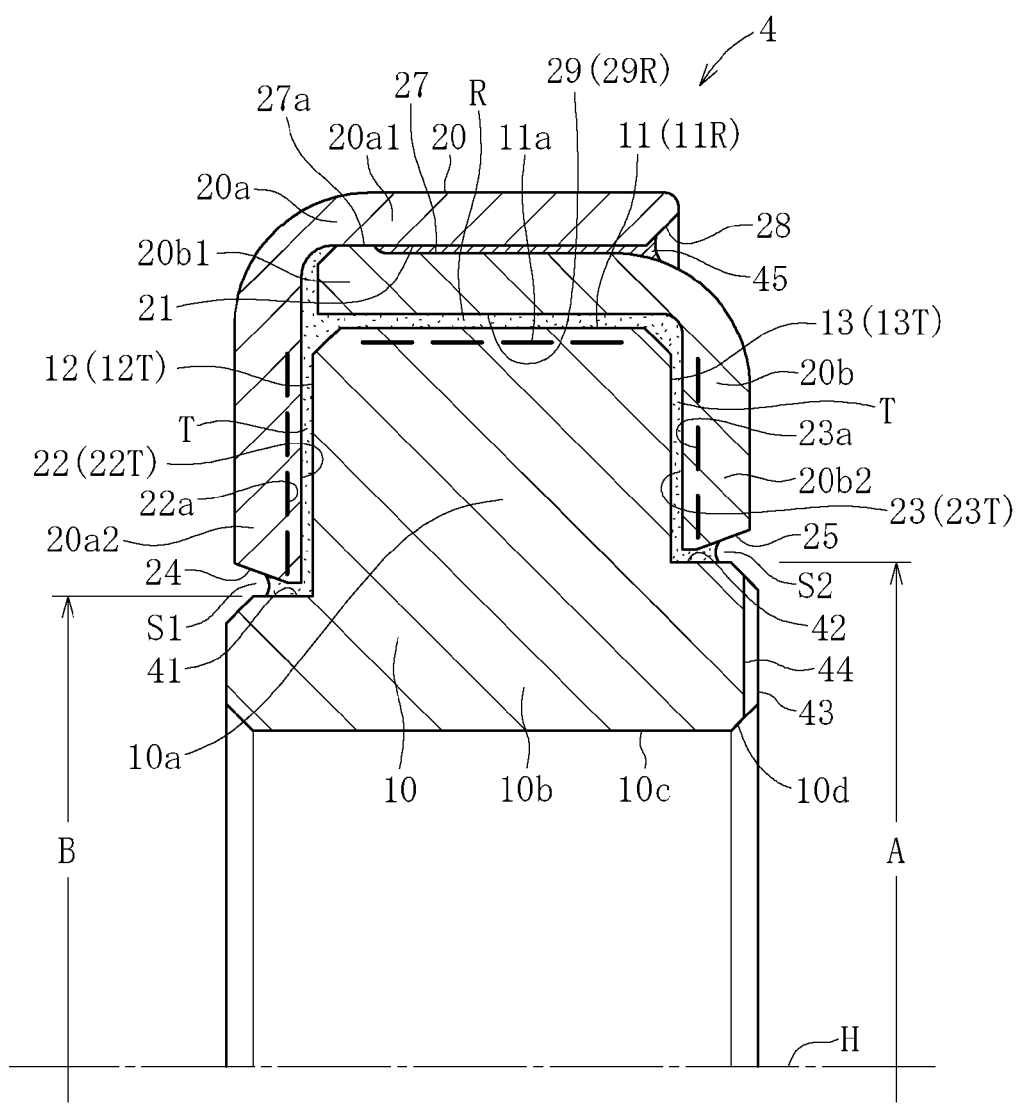
[FIG. 25] A vertical sectional view of a fluid dynamic bearing device according to a second embodiment of the second invention of the present application.

Next, description is made of a second embodiment of the second invention of the present application with reference to FIG. 25. Parts having the same functions as those in the above-mentioned first embodiment are denoted by the same reference symbols, and redundant description thereof is omitted. This embodiment is different from the first embodiment in the following structure. That is, in the second embodiment, dynamic pressure generating grooves 22a and 23a in both the thrust directions are formed respectively in the inside surface 22 of the radial portion 20a2 of the outside outer member 20a and the inside surface 23 of the inside outer member 20b. Both the side surfaces 12 and 13 of the projecting portion 10a of the inner member 10 are each formed of an even and smooth surface.

The dynamic pressure generating grooves 22a and 23a in both the thrust directions are formed, for example, by a pressing process when the outside outer member 20a and the inside outer member 20b are formed of a plate member by a pressing. Thus, the dynamic pressure generating grooves 22a and 23a also can be formed with high accuracy. Shapes of the dynamic pressure generating grooves 22a and 23a are the same as those illustrated in FIGS. 20(a) and 20(c). The inner member 10 is made of a sintered metal. The projection portion 27a and indicators for identification of the rotational direction are the same as those in the first embodiment.

Figure 26:
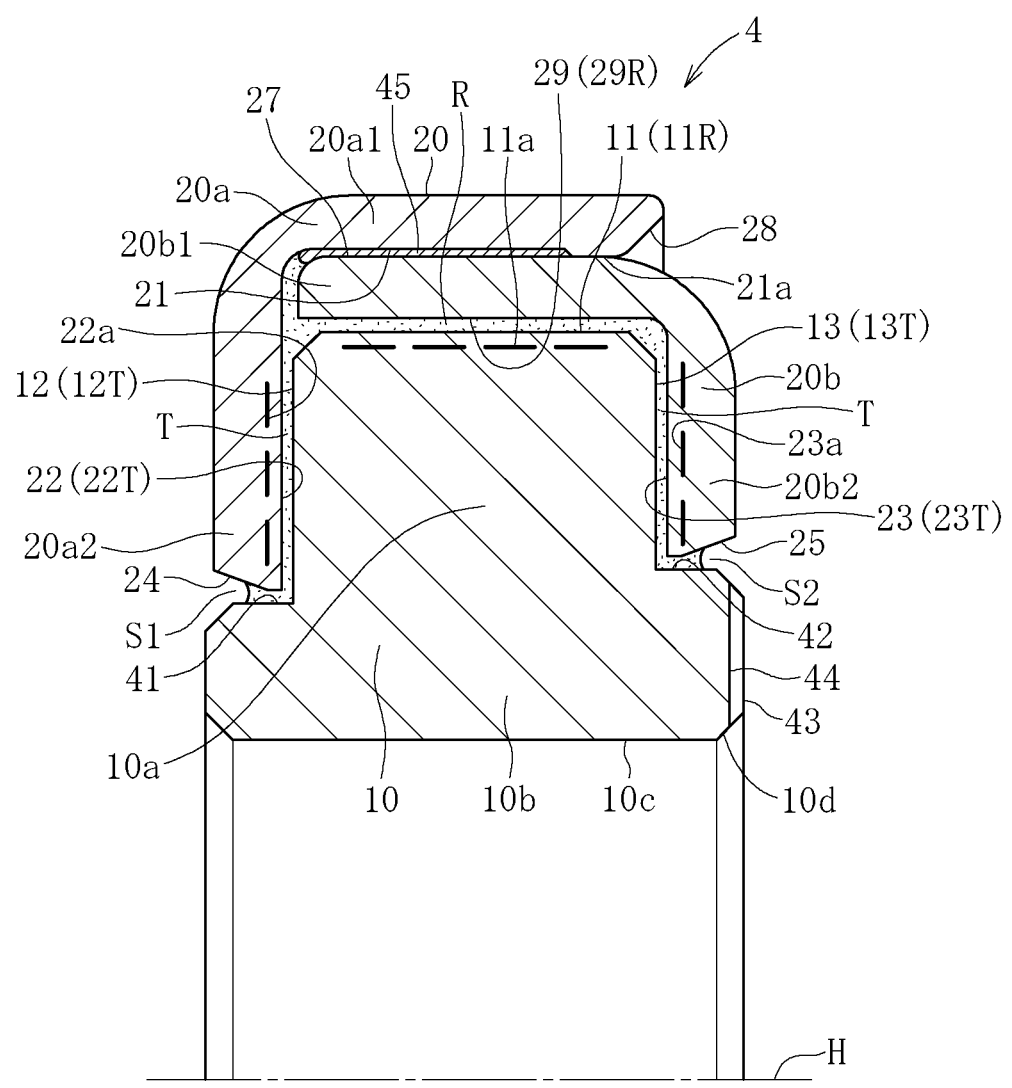
[FIG. 26] A vertical sectional view of a fluid dynamic bearing device according to a third embodiment of the second invention of the present application.

Next, description is made of a third embodiment of the second invention of the present application with reference to FIGS. 26 and 27. Parts having the same functions as those in the above-mentioned second embodiment are denoted by the same reference symbols, and redundant description thereof is omitted. This embodiment is different from the second embodiment in structure of the projection portion.

A projection portion 21a in this embodiment is provided at an opening end portion of the inner peripheral surface 21 of the cylindrical portion 20a1 of the outside outer member 20a. FIG. 27 illustrate a form of the projection portion 21a. The projection portion 21a illustrated in FIG. 27(a) is formed as an annular circumferential projection along the opening end portion of the inner peripheral surface 21 of the cylindrical portion 20a1 of the outside outer member 20a. This projection portion 21a is continuous with the chamfered portion 28. The projection portion 21a illustrated in FIG. 27(b) comprises projection portions 21a provided at eight points in the circumferential direction at the opening end portion of the inner peripheral surface 21 of the cylindrical portion 20a1 of the outside outer member 20a. The projection portion 21a illustrated in FIG. 27(c) is formed as a projection extending in the axial direction from the opening end portion to a deep side along the inner peripheral surface 21 of the cylindrical portion 20a1 of the outside outer member 20a. In any of those forms, when the outer peripheral surface 27 of the cylindrical portion 20b1 of the inside outer member 20b is inserted along the inner peripheral surface 21 of the cylindrical portion 20a1 of the outside outer member 20a, the projection portion 21a is partially press-fitted. Thus, the outside outer member 20a and the inside outer member 20b can be temporarily fixed to each other without compromising accuracy. Sizes and the numbers of the projection portions 21a can be appropriately set as long as the projection portions 21a can be press-fitted without deteriorating the accuracies of the outside outer member 20a and the inside outer member 20b. When the projection portions 21a are provided at some parts in the circumferential direction, it suffices that the projection portions 21a are provided at at least three points.

Next, description is made of an assembly method for the fluid dynamic bearing device of the present invention with reference to FIGS. 28 to 31. In this assembly method, the fluid dynamic bearing device according to the third embodiment is illustrated. However, this assembly method is equivalently applicable to the first embodiment and the second embodiment.

Figure 28:
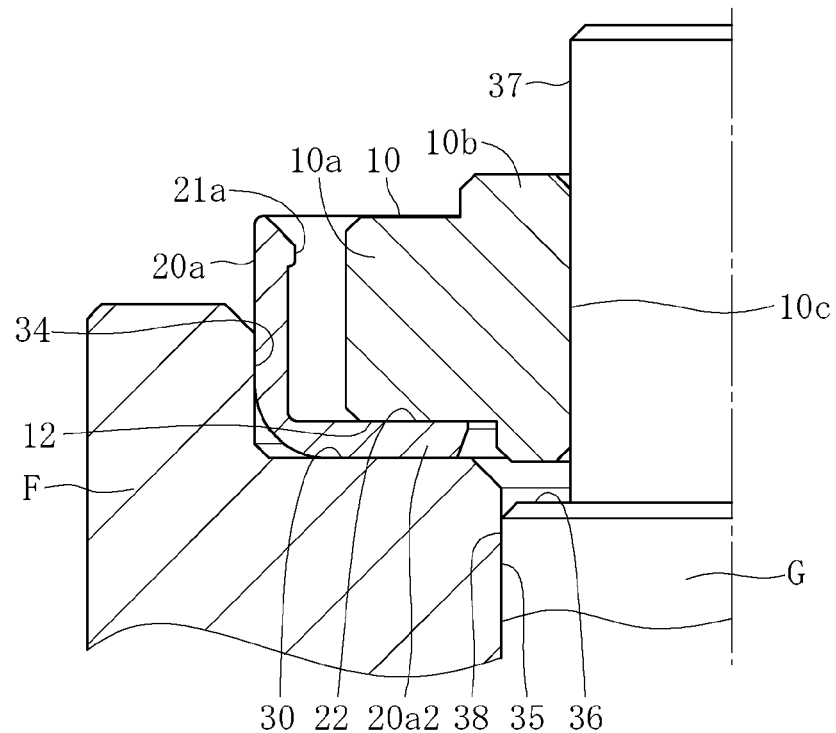
[FIG. 28] A vertical sectional view illustrating an assembly method.

As illustrated in FIG. 28, a jig used in this assembly method is formed of a fixing jig F and a moving jig G which is arranged inside of the fixing jig F and movable in a vertical direction. The fixing jig F has a placing surface 30, a guide surface 34, and an inner peripheral surface 35 fitted to the moving jig G in a freely slidable manner. The moving jig G has a shoulder surface 36, a guide surface 37, and an outer peripheral surface 38 fitted to the fixing jig F in a freely slidable manner. In the state illustrated in FIG. 28, the moving jig G is retracted downward. First, the radial portion 20a2 of the outside outer member 20a is directed downward and inserted along the guide surface 34 of the fixing jig F so that the outside surface of the radial portion 20a2 is held in abutment against the placing surface 30. In this way, the outside outer member 20a is set. Then, after the inner peripheral surface 10c of the sleeve portion 10b of the inner member 10 is fitted to the guide surface 37 of the moving jig G, the inner member 10 is inserted into the outside outer member 20a so that the side surface 12 thereof is brought into abutment against the inside surface 22 of the outside outer member 20a. In this state, an appropriate load is applied downward to the inner member 10.

Figure 29:
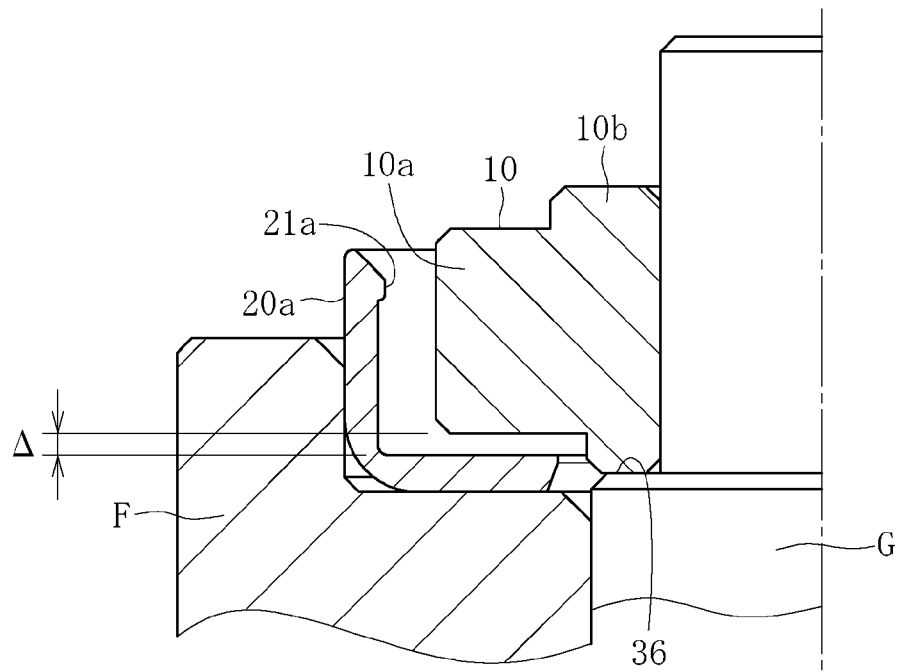
[FIG. 29] Another vertical sectional view illustrating the assembly method.

After that, as illustrated in FIG. 29, the moving jig G is raised so that the shoulder surface 36 of the moving jig G is brought into abutment against the lower end surface of the sleeve portion 10b of the inner member 10 that has been inserted in the outside outer member 20a. From this position, which is to serve as a reference position, the moving jig G is further raised so that the inner member 10 is spaced apart from the outside outer member 20a. Then, the moving jig G is stopped at a position at which the total amount Δ of the thrust bearing gaps T on both the sides is secured. At this position, a static state is maintained.

Figure 30:
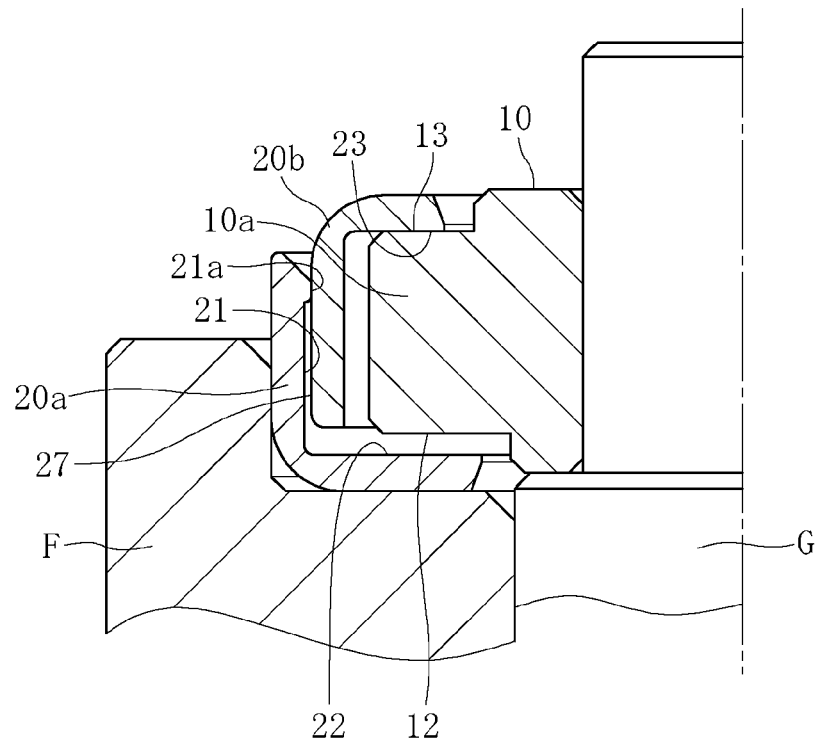
[FIG. 30] Still another vertical sectional view illustrating the assembly method.
Figure 31:
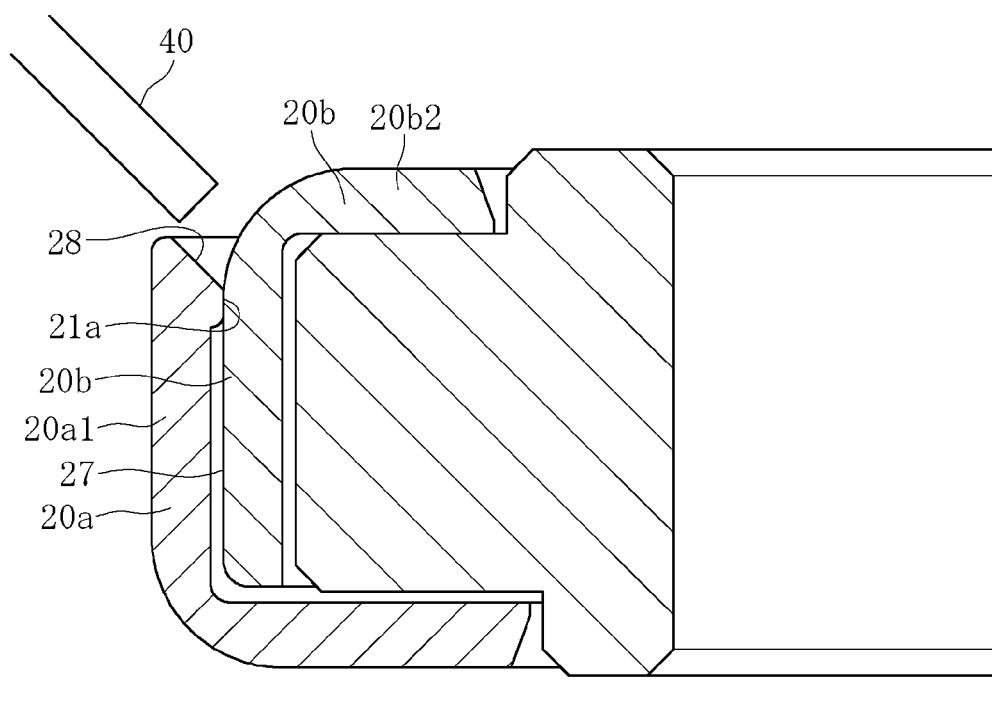
[FIG. 31] A horizontal sectional view illustrating a state in which an adhesive is injected into a fitting portion of the outer members.

Next, as illustrated in FIG. 30, the inside outer member 20b is fitted to the inner peripheral surface 21 of the outside outer member 20a, and is pushed in until the inside surface 23 thereof abuts against the side surface 13 of the projecting portion 10a of the inner member 10. In this way, a gap by an amount equal to the total amount Δ of the thrust bearing gaps T on both the sides can be set between the inside surface 22 of the outside outer member 20a and the side surface 12 of the projecting portion 10a of the inner member 10. In this state, the projection portion 21a is press-fitted to the outer peripheral surface 27 of the inside outer member 20b, and hence the outside outer member 20a and the inside outer member 20b are temporarily fixed to each other.

In the above-mentioned assembly method, by using the fixing jig F and the moving jig G, the thrust bearing gaps T can be set with high accuracy. In addition, by adjusting a moving distance of the moving jig G between the reference position and the stop position, setting of the thrust bearing gaps T can be adjusted.

Under a state in which the thrust bearing gaps T are set and the outside outer member 20a and the inside outer member 20b are temporarily fixed to each other as described above, as illustrated in FIG. 31, an adhesive is injected from a nozzle 40 into the fitting part of the outside outer member 20a and the inside outer member 20b. The end surface of the cylindrical portion 20a1 of the outside outer member 20a is positioned to be lower than an outside surface of the radial portion 20b2 of the inside outer member 20b, and is provided with the chamfered portion 28, which facilitates injection of the adhesive. After that, the adhesive is cured through baking. When the adhesive is anaerobic, it is unnecessary to perform baking. Further, the outside outer member 20a and the inside outer member 20b are temporarily fixed to each other, and hence it is unnecessary to use a special jig for maintaining the thrust bearing gaps T thus set. As a result, operability is enhanced.

Figure 32:
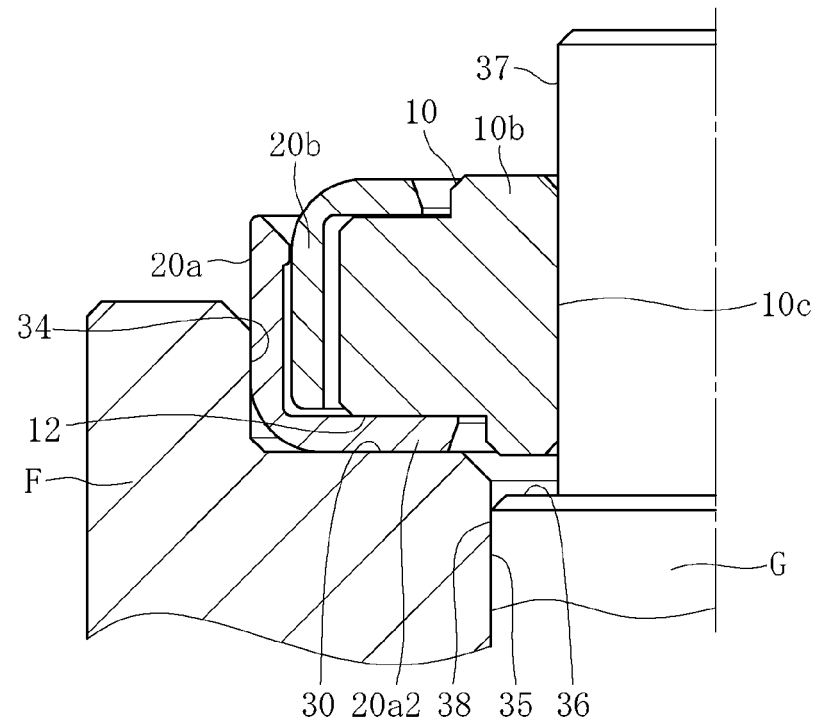
[FIG. 32] A vertical sectional view illustrating an assembly method according to a modification.
Figure 33:
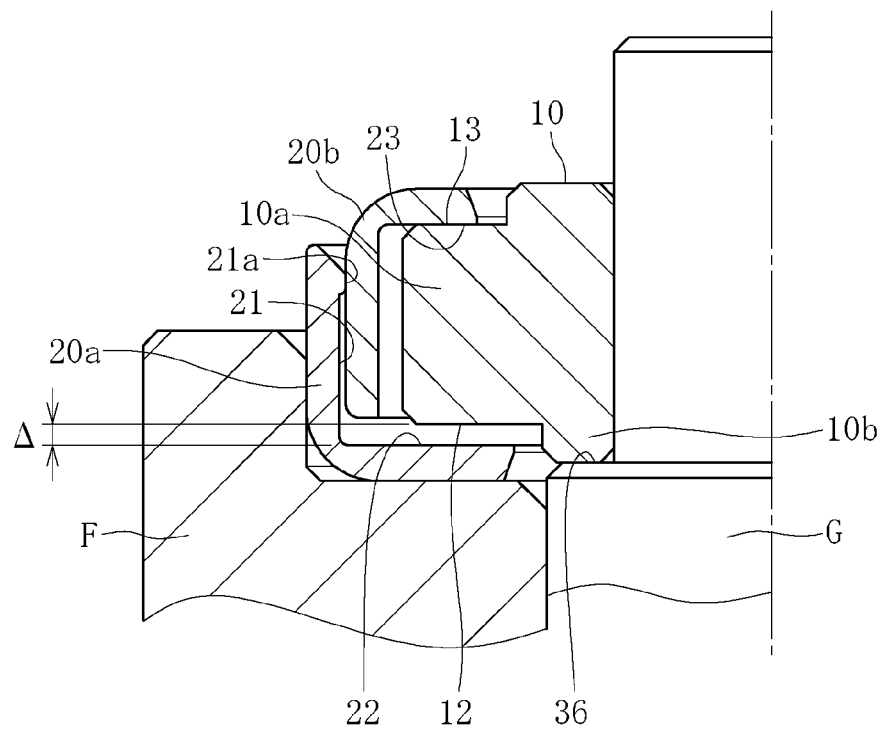
[FIG. 33] Another vertical sectional view illustrating the assembly method according to the modification.

Next, description is made of a modification of the assembly method with reference to FIGS. 32 and 33. In this assembly method, first, on the outside of the gap setting apparatus formed of the fixing jig F and the moving jig G, the inner member 10 is accommodated in the outside outer member 20a and the inside outer member 20b. Then, until the thrust bearing gaps T are closed, the inside outer member 20b is pushed relatively into the outside outer member 20a. In this state, a set of the outside outer member 20a, the inside outer member 20b, and the inner member 10 is placed with respect to the fixing jig F and the moving jig G as illustrated in FIG. 32. That is, after the inner peripheral surface 10c of the sleeve portion 10b of the inner member 10 is fitted to the guide surface 37 of the moving jig G, the set of the outside outer member 20a, the inside outer member 20b, and the inner member 10 is inserted downward to be set in abutment against the placing surface 30 while the outside surface of the radial portion 20a2 of the outside outer member 20a is held in abutment against the guide surface 34 of the fixing jig F. At this time, the moving jig G is retracted downward, and in this state, an appropriate load is applied downward to the outer member 20a.

After that, as illustrated in FIG. 33, the moving jig G is raised so that the shoulder surface 36 of the moving jig G is brought into abutment against the lower end surface of the sleeve portion 10b of the inner member 10 under a state in which the thrust bearing gaps T between the outside outer member 20a and the inside outer member 20b are closed. From this position, which is to serve as a reference position, the moving jig G is further raised so that the inner member 10 is moved upward. In this way, the inside outer member 20b is spaced apart from the outside outer member 20a, which has been press-fitted through intermediation of the projection portion 21a. Then, the moving jig G is stopped at a position at which a gap by an amount equal to the total amount Δ of the thrust bearing gaps T on both the sides is secured between the inside surface 22 of the outside outer member 20a and the projecting portion 10a of the inner member 10. In this way, gap setting is completed. A bonding step for the outside outer member 20a and the inside outer member 20b after the gap setting is the same as that illustrated in FIG. 31.

In this assembly method, on the outside of the gap setting apparatus formed of the fixing jig F and the moving jig G, the outside outer member 20a, the inside outer member 20b, and the inner member 10 can be set and temporarily fixed to each other. In the gap setting apparatus formed of the fixing jig F and the moving jig G, only the gap setting is performed, and hence operability is excellent.

The lubricating oil is injected into a space between the inner member 10 and the outer member 20 assembled to each other as described above, including the inner pores of the inner member 10 made of a sintered metal. After that, heating is performed up to a set temperature higher than a maximum expected temperature (upper limit) in a use environment of the fluid dynamic bearing device 4. Then, a part of the lubricating oil, which has overflowed from inner-diameter-side end portions of the thrust bearing gaps T due to thermal expansion at this time, is wiped off. After that, by cooling down to a normal temperature, the lubricating oil shrinks. As a result, the oil level is retracted to a bearing interior side (outer diameter side), and is maintained within the sealed spaces S1 and S2. With this, the lubricating oil does not overflow due to thermal expansion within an expected temperature range. In this way, the fluid dynamic bearing device 4 is completed.

In the above-mentioned embodiment, the dynamic pressure generating grooves 11a, 12a, 13a, 22a, and 23a are each formed in a herringbone pattern. Instead, there may be employed appropriate dynamic pressure generating grooves formed in a spiral pattern, a stepped pattern, a circular-arc pattern, or the like.

(Embodiments of a Third Invention of the Present Application)

Next, description is made of embodiments of a third invention of the present application with reference to FIGS. 34 to 46.

Figure 34:
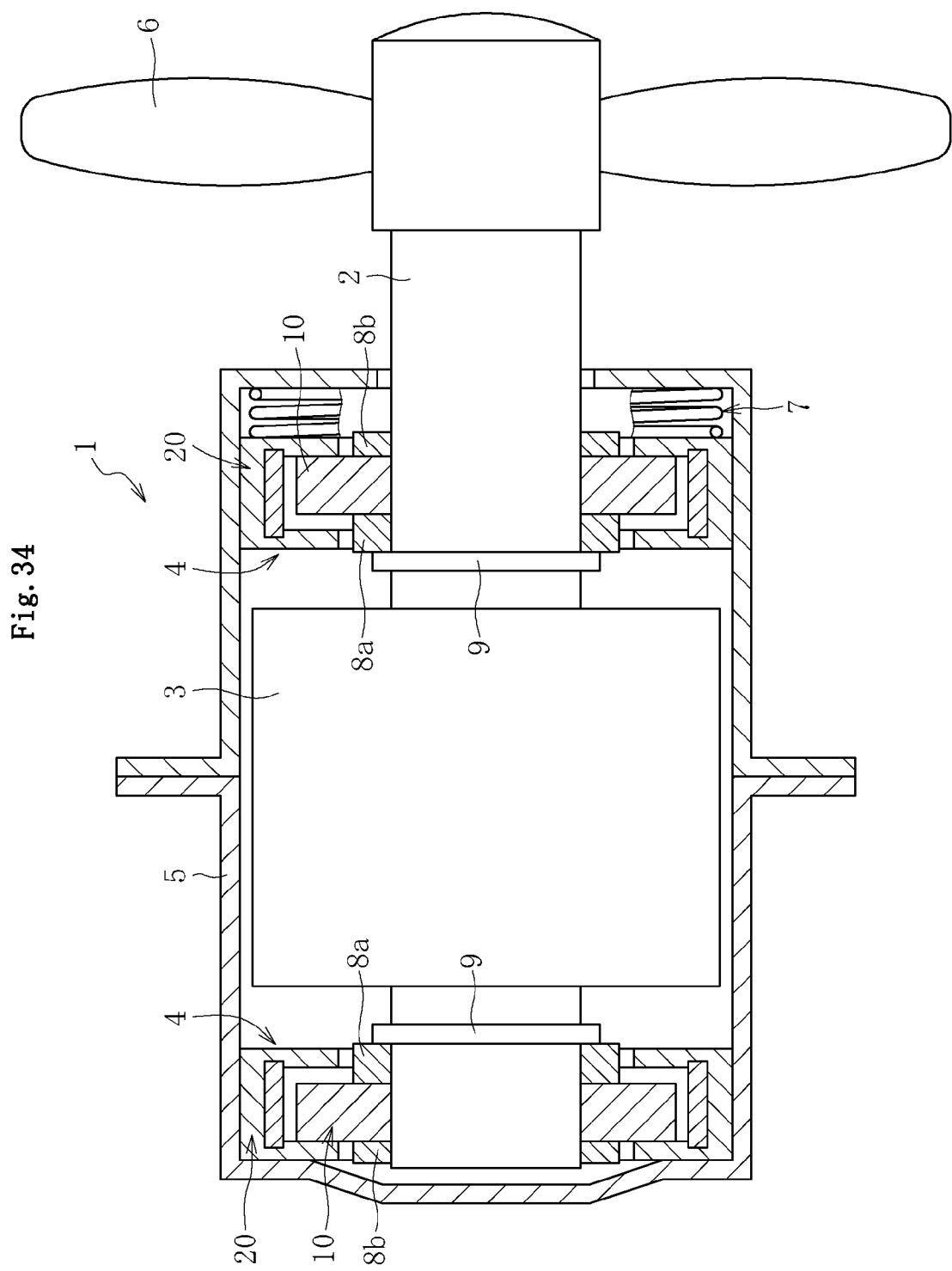
[FIG. 34] A sectional view of the bearing unit (when the motor is stopped).

FIG. 34 is an axial sectional view of a bearing unit 1 incorporating a fluid dynamic bearing device according to an embodiment of the third invention of the present application. The bearing unit 1 is used, for example, by being incorporated into a motor for a small exhaust fan for a 24-hour ventilation system to be installed in a dwelling room of a house (more strictly speaking, inner-rotor motor for an exhaust fan). The bearing unit 1 comprises a rotary shaft 2, a motor rotor 3 fixed to an outer peripheral surface of the rotary shaft 2, a pair of fluid dynamic bearing devices 4 and 4 arranged at both axial sides of the motor rotor 3, a housing 5 for accommodating the motor rotor 3 and the fluid dynamic bearing devices 4 and 4, and a fan 6 provided at the end portion of the rotary shaft 2 projecting from the housing 5. Between one fluid dynamic bearing device 4 (right side in FIG. 34) and the housing 5, a spring 7 is arranged in a compressed state. Note that, FIG. 34 illustrates a state in which the motor (rotary shaft 2) is stopped.

Figure 35:
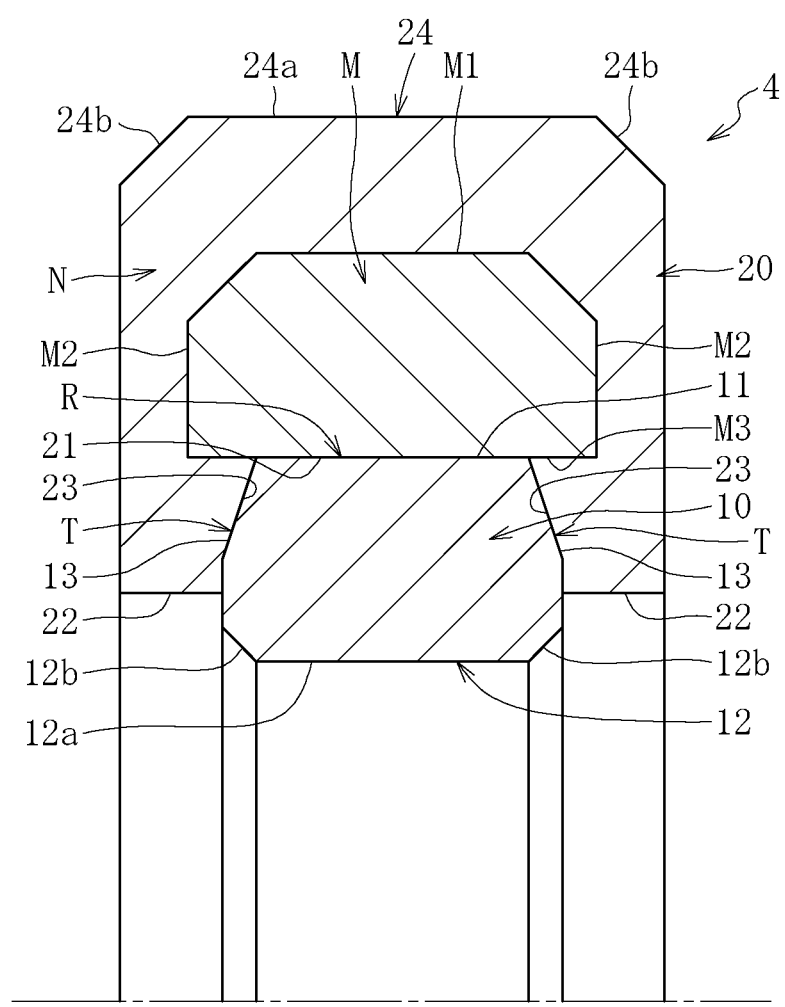
[FIG. 35] A sectional view of a fluid dynamic bearing device according to a third invention of the present application.

As illustrated in FIG. 35, the fluid dynamic bearing devices 4 each comprise an inner member 10 and an outer member 20 for supporting the inner member 10 in a freely rotatable manner. The inner member 10 is fixed to the rotary shaft 2. In this embodiment, as illustrated in FIG. 34, the inner member 10 is press-fitted to the outer peripheral surface of the rotary shaft 2. The inner member 10 is sandwiched by positioning members 8a and 8b from both the axial sides, and the positioning member 8a on the axial inner side (motor rotor 3 side) is held in abutment against a stopper ring 9. In this way, the positioning members 8a and 8b and the stopper ring 9 set an axial position of the inner member 10 with respect to the rotary shaft 2, in particular, an axial interval between the inner members 10 and 10. The outer member 20 is fitted to the inner peripheral surface of the housing 5, specifically, mounted in a slidable state in the axial direction (refer to FIG. 34). A lubricating oil is interposed between surfaces of the inner member 10 and the outer member 20, which face each other in the axial direction and a radial direction (radial bearing gap R and thrust bearing gaps T) (refer to FIG. 36). Note that, the fluid dynamic bearing devices 4 and 4 in FIG. 34 have the same structure.

Figure 36:
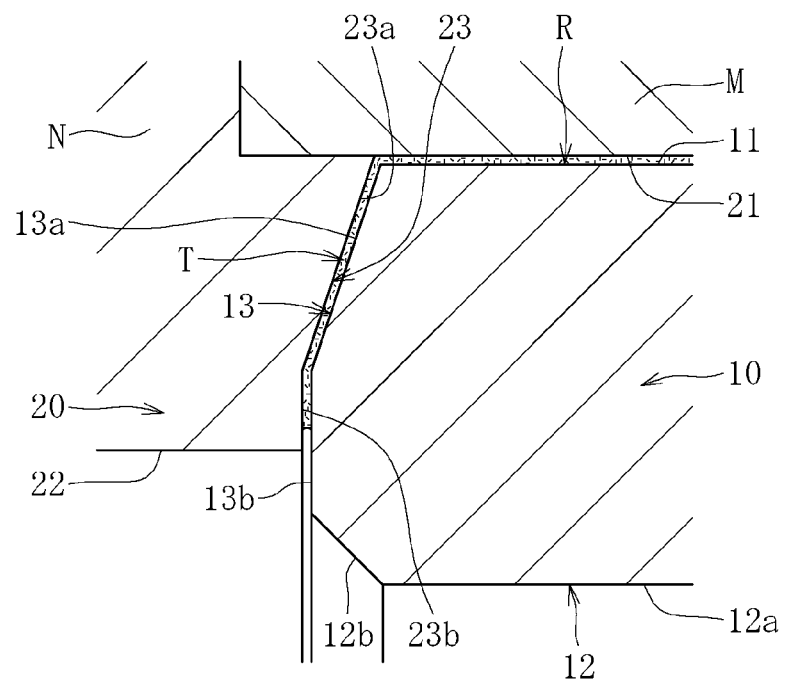
[FIG. 36] An enlarged sectional view of FIG. 35.
Figure 37:
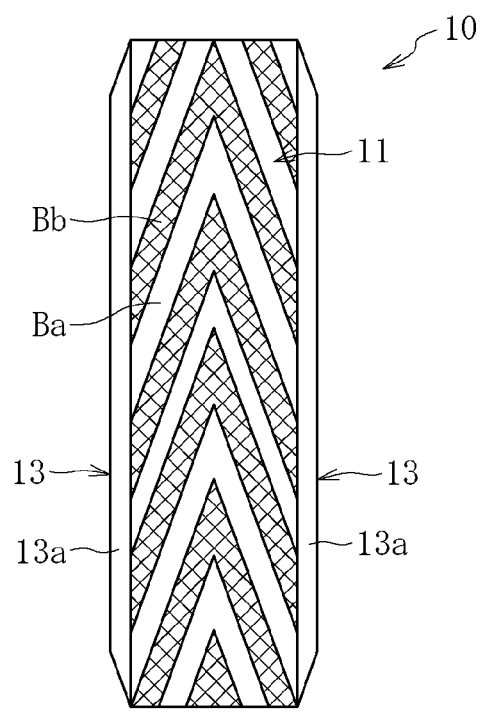
[FIG. 37] A side view of the inner member.

The inner member 10 is obtained, for example, by forming a metal into a ring shape. In this embodiment, the inner member 10 is made of a sintered metal. An outer peripheral surface 11 of the inner member 10 is formed into a shape of a cylindrical surface, and is held in contact with the lubricating oil filling the radial bearing gap R (refer to FIG. 36). A radial dynamic pressure generating portion is formed on the outer peripheral surface 11 of the inner member 10. As illustrated in FIG. 37, the radial dynamic pressure generating portion in this embodiment has a herringbone pattern in which dynamic pressure generating grooves Ba formed all over the outer peripheral surface 11 and each bent into a V-shape and hill portions Bb (indicated by cross-hatching in FIG. 37) defining the dynamic pressure generating grooves Ba are arrayed alternately with each other in the circumferential direction. The dynamic pressure generating grooves Ba are formed, for example, by a rolling process. In this embodiment, the inner member 10 is made of a sintered metal, and hence plastic flow of the outer peripheral surface 11 of the inner member 10, which is generated by compression along with the rolling process, can be absorbed by inner pores of the sintered metal. Thus, swelling of the surface of the inner member 10, which is caused by the plastic flow, is suppressed, and hence the radial dynamic pressure generating portion (dynamic pressure generating grooves Ba and hill portions Bb) can be formed with high accuracy.

As illustrated in FIG. 35, an inner peripheral surface 12 of the inner member 10 has a cylindrical surface 12a and chamfered portions 12b provided at both axial end portions of the cylindrical surface 12a. The inner member 10 is fixed to the rotary shaft 2, for example, by press-fitting (lightly press-fitting) the cylindrical surface 12a to the outer peripheral surface of the rotary shaft 2, or by interposing an adhesive between the cylindrical surface 12a and the outer peripheral surface of the rotary shaft 2.

End surfaces 13 and 13 on both the axial sides of the inner member 10 each have a shape symmetrical with each other with respect to an axial center plane of the inner member 10. As illustrated in FIG. 36 on an enlarged scale, the end surface 13 is formed of a tapered surface 13a provided on the outer diameter side and a flat surface 13b provided on the inner diameter side. The tapered surface 13a is provided while being inclined toward the outer diameter side and an axial central portion side (that is, side on which the end surfaces 13 and 13 come close to each other). The flat surface 13b extends from an inner diameter end of the tapered surface 13a toward the inner diameter side. The tapered surface 13a and the flat surface 13b are held in contact with the lubricating oil in the thrust bearing gaps T. In this embodiment, the tapered surface 13a and the flat surface 13b are each formed of an even and smooth surface.

The outer member 20 has a shape of a ring arranged on the outer diameter side with respect to the inner member 10, and comprises a core metal M and a resin molded portion N formed by injection molding with use of the core metal M as an insert component. The core metal M is obtained, for example, by forming a metal into a ring shape. In this embodiment, the core metal M is made of a sintered metal. As illustrated in FIG. 35, all of an outer peripheral surface M1 and both axial end surfaces M2 and M2 of the core metal M, and both axial end portions of an inner peripheral surface M3 are held in an adhering manner by the resin molded portion N.

The outer member 20 has a substantially C-shape opened to the inner diameter side in axial cross-section, and has a large-diameter inner peripheral surface 21, a pair of small-diameter inner peripheral surfaces 22 and 22 respectively provided on both axial sides of the large-diameter inner peripheral surface 21, and a pair of shoulder surfaces 23 and 23 formed between both axial end portions of the large-diameter inner peripheral surface 21 and the small-diameter inner peripheral surfaces 22 and 22. The large-diameter inner peripheral surface 21 is formed into a shape of a smooth cylindrical surface, and in this embodiment, is formed of the inner peripheral surface M3 of the core metal M. The large-diameter inner peripheral surface 21 faces the outer peripheral surface 11 of the inner member 10 across the radial bearing gap R (refer to FIG. 36).

The small-diameter inner peripheral surface 22 is formed on the resin molded portion N, and is radially smaller than the large-diameter inner peripheral surface 21. In this embodiment, the small-diameter inner peripheral surface 22 is positioned within a radial range of the flat surface 13b of the end surface 13 of the inner member 10 (in the illustration, at substantially central portion in the radial direction of the flat surface 13b). Note that, the small-diameter inner peripheral surface 22 may be applied with an oil repellent agent for preventing the lubricating oil from leaking to the outside.

The pair of shoulder surfaces 23 and 23 is formed in the resin molded portion N, and each have a shape symmetrical with each other with respect to the axial center plane. As illustrated in FIG. 36 on an enlarged scale, the shoulder surface 23 is formed of a tapered surface 23a provided on the outer diameter side and a flat surface 23b provided on the inner diameter side. The tapered surface 23a is provided while being inclined toward the outer diameter side and an axial central portion side (that is, side on which the shoulder surfaces 23 and 23 come close to each other). The flat surface 23b extends from an inner diameter end of the tapered surface 23a toward the inner diameter side. The tapered surface 23a and the flat surface 23b respectively face the tapered surface 13a and the flat surface 13b of the end surface 13 of the inner member 10 across the thrust bearing gaps T. In this embodiment, the tapered surface 23a and the flat surface 23b are each formed of an even and smooth surface.

An axial dimension of the core metal M is larger than an axial dimension of the inner member 10. In detail, both the axial end surfaces M2 and M2 of the core metal M are positioned on an axially outer side with respect to the flat surfaces 13b and 13b of the end surfaces 13 and 13 of the inner member 10 and the flat surfaces 23b (described in detail below) of the shoulder surfaces 23 and 23 of the outer member 20, which face the flat surfaces 13b and 13b in the axial direction. With this, on the inner diameter side with respect to the core metal M, parts of the resin molded portion N project to the axial center side with respect to both the axial end surfaces M2 and M2 of the core metal M.

An outer peripheral surface 24 of the outer member 20 is formed on the resin molded portion N, and as illustrated in FIG. 35, has a cylindrical surface 24a to serve as a mounting surface with respect to the housing 5 (refer to FIG. 34), and chamfered portions 24b provided along both axial end portions of the cylindrical surface 24a. The cylindrical surface 24a (mounting surface) is fitted to the inner peripheral surface of the housing 5 across a gap. With this, the outer member 20 can be slid in the axial direction with respect to the housing 5.

The lubricating oil is filled into an interior space of the fluid dynamic bearing device 4 structured as described above, including the inner pores of the inner member 10 and the core metal M made of a sintered metal. As illustrated in FIG. 36, the lubricating oil fills the entire radial bearing gap R and the thrust bearing gaps T up to vicinities of inner diameter ends thereof. A capillary force of the thrust bearing gaps T causes the lubricating oil to be drawn into an outer diameter side (radial bearing gap R side). An oil level of the lubricating oil is maintained in each of the thrust bearing gaps T. It is preferred that the oil level of the lubricating oil be maintained at the cylindrical portion of the thrust bearing gaps T (gap between the flat surfaces 13b and 23b).

As illustrated in FIG. 34, in the bearing unit 1 incorporating the above-mentioned fluid dynamic bearing devices 4, the spring 7 urges the outer member 20 of the fluid dynamic bearing device 4 on the right side of FIG. 34 into a left direction of FIG. 34. Thus, in a static state of the rotary shaft 2 (state of FIG. 34), the outer member 20 urged by the spring 7 is held in abutment against the inner member 10, and hence the inner member 10 and the rotary shaft 2 are urged to the left direction of FIG. 34. With this, the inner member 10 of the left fluid dynamic bearing device 4 of FIG. 34 is urged to the left direction of FIG. 34, with the result of being held in abutment against and engaged with the outer member 20. In other words, in this bearing unit 1, the housing 5 and the spring 7 apply a preload in a direction in which the pair of fluid dynamic bearing devices 4 and 4 come close to each other.

When the rotary shaft 2 is rotated, in each of the fluid dynamic bearing devices 4, an oil film is formed in the radial bearing gap R between the outer peripheral surface 11 of the inner member 10 and the large-diameter inner peripheral surface 21 of the outer member 20 (inner peripheral surface M3 of the core metal M). Then, in accordance with the rotation of the rotary shaft 2, pressure of the oil film in the radial bearing gap R is increased by the radial dynamic pressure generating portion (dynamic pressure generating grooves Ba and hill portions Bb). Such a dynamic pressure action of the oil film causes the rotary shaft 2 and the inner member 10 to be supported in a non-contact manner in a radial direction with respect to the static-side member and the outer member 20.

Simultaneously, in each of the fluid dynamic bearing devices 4, oil films are formed respectively in the thrust bearing gaps T between both the side surfaces 13 and 13 of the inner member 10 and the shoulder surfaces 23 and 23 of the outer member 20 respectively facing both the side surfaces 13 and 13. In accordance with the rotation of the rotary shaft 2, pressure of the oil films in the thrust bearing gaps T is increased. In this way, the rotary shaft 2 and the inner member 10 are supported in a non-contact manner in both thrust directions with respect to the static-side member and the outer member 20 (refer to FIG. 38). Note that, the radial bearing gap R and the thrust bearing gaps T in FIG. 38 are exaggerated in size.

Figure 38:
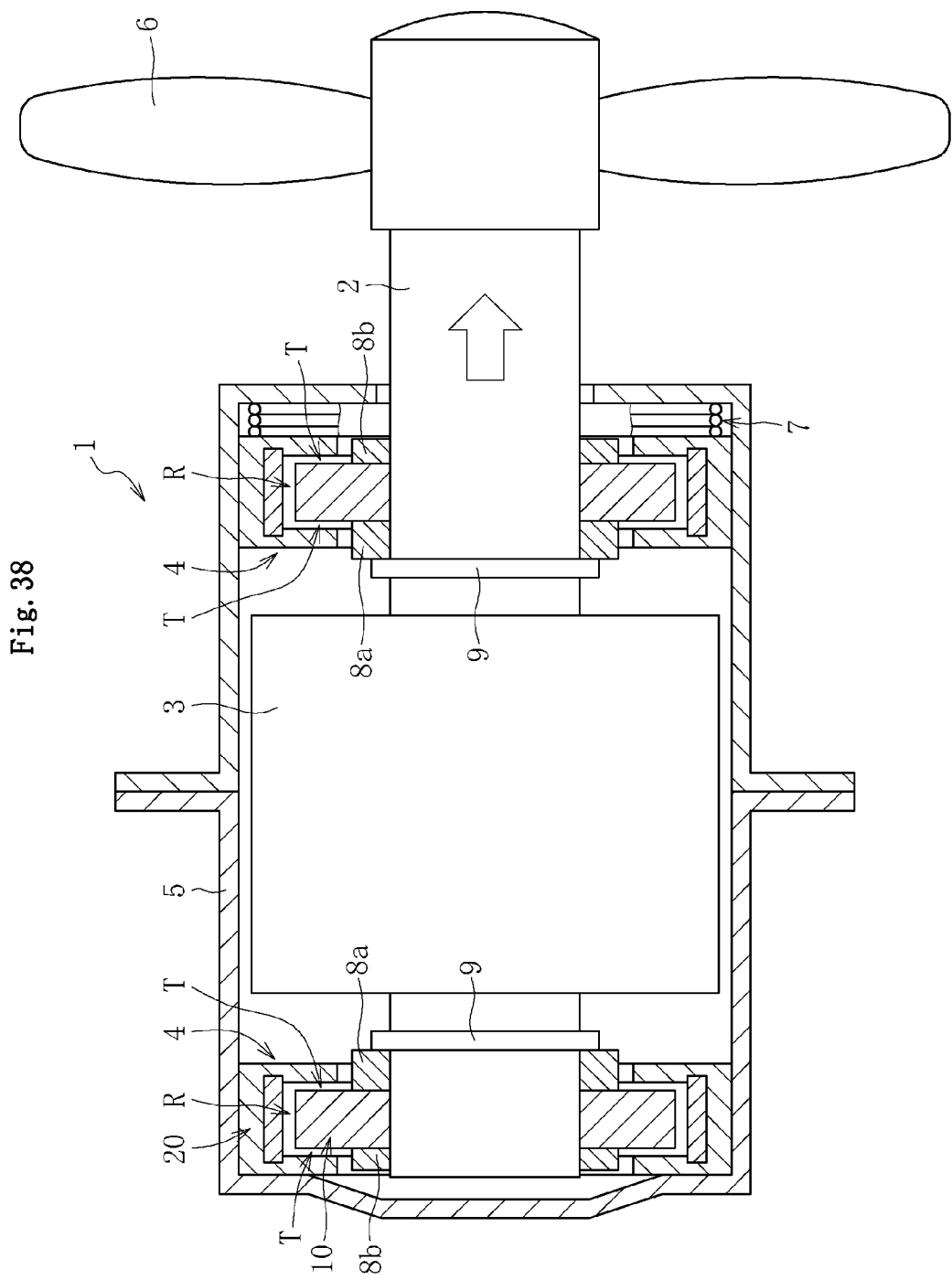
[FIG. 38] A sectional view of a bearing unit (when the motor is rotated).

When pressure is generated in the lubricating oil in the thrust bearing gaps T by the rotation of the rotary shaft 2, the rotary shaft 2 bears a load to the right side in FIG. 38 (refer to a hollow arrow in FIG. 38). At this time, the outer member 20 of the right fluid dynamic bearing device 4 of FIG. 38 is slid to the right side of FIG. 38 while compressing the spring 7. With this, the thrust bearing gaps T are secured in each of both the fluid dynamic bearing devices 4 and 4. In this way, when the outer member 20 is not fixed to the housing 5, but is fitted to the housing 5 in a manner that the outer member 20 is axially movable with respect to the housing 5, the thrust bearing gaps T can be set with high accuracy despite the assembly accuracy of the outer member 20 to the housing 5. With this, the inner member 10 is reliably supported in a non-contact manner with respect to the outer member 20. As a result, noise generation that may be caused by contact sliding is more reliably prevented.

Further, in this bearing unit 1, the spring 7 applies an axial preload to both the fluid dynamic bearing devices 4 and 4. Thus, even under a state in which the outer member 20 is fitted to the housing 7 across a gap, a situation in which the outer member 20 is rotated in accordance with the rotation of the rotary shaft 2 is prevented. Meanwhile, when an elastic force of the spring 7 is excessively large, the inner member 10 and the outer member 20 may come into sliding contact with each other. Thus, the elastic force of the spring 7 is set within such a range that the outer member 20 is prevented from being rotated and the outer member 20 and the inner member 10 are prevented from coming into sliding contact with each other. For example, it is desired that the elastic force of the spring 7 be set approximately to range from 20% to 80% of a load capacity of the pressure generated in the thrust bearing gaps T.

In the fluid dynamic bearing device 4 structured as described above, the inner member 10 is provided in the axial direction between the shoulder surfaces 23 and 23 of the outer member 20. Thus, when the shoulder surfaces 23 and 23 of the outer member 20 and the end surfaces 13 and 13 of the inner member 10 are respectively engaged with each other in the axial direction, the inner member 10 is prevented from dropping off from an inner periphery of the outer member 20. With this, the inner member 10 and the outer member 20 are prevented from being separated from each other, and hence the fluid dynamic bearing device 4 can be integrally treated. As a result, the fluid dynamic bearing device 4 is more easily mounted to the rotary shaft 2 and the housing 5.

Further, in accordance with the rotation of the rotary shaft 2, a centrifugal force acts on the lubricating oil in the thrust bearing gaps T. Thus, the lubricating oil is pushed into an outer diameter side (radial bearing gap R side). With this centrifugal force and the capillary force which is generated by the thrust bearing gaps T, leakage of the lubricating oil to the outside is prevented. Thus, it is unnecessary to provide a special sealing mechanism to the fluid dynamic bearing device 4. As a matter of course, such a sealing mechanism may be provided to the fluid dynamic bearing device 4. For example, a sealed space having a wedge-like shape in cross-section may be provided by forming any one of the flat surface 13b of the end surface 13 of the inner member 10 and the flat surface 23b of the shoulder surface 23 of the outer member 20 into a shape of a tapered surface.

In the following, description is made of a manufacturing method for the fluid dynamic bearing device 4, in particular, mainly of an injection molding step for the outer member 20.

FIG. 39 illustrates a die set 30 for injection molding of the outer member 20. The die set 30 mainly comprises a fixed die 31, a movable die 32, and a core pin 33.

First, the inner member 10 is fitted to an outer peripheral surface of the core pin 33 provided to the fixed die 31, and the core metal M is fitted to the outer peripheral surface 11 of the inner member 10. In this state, by sliding the movable die 32 to perform clamping, a cavity 34 is formed. At this time, the inner member 10 is sandwiched by an axial projecting portion 31a provided to the fixed die 31 and an axial projecting portion 32a provided to the movable die 32 from both the axial sides. In this way, the inner member 10 is positioned in the cavity 34 in the axial direction. At this time, it is necessary to set a radial gap between the outer peripheral surface 11 of the inner member 10 and the inner peripheral surface M3 of the core metal M (gap corresponding to the radial bearing gap R) to a value at which a molten resin to be injected into the cavity 34 does not intrude into this radial gap and the inner member 10 and the outer member 20 (core metal M) are smoothly rotatable relative to each other. For example, the radial gap is set to range from 10 μm to 50 μm, preferably, to range from 20 μm to 40 μm. In this embodiment, the inner member 10 and the core metal M are each made of a sintered metal excellent in formability, and hence the inner member 10 and the core metal M can be molded with high dimensional accuracy. Therefore, the gap to be formed therebetween also can be set with high accuracy, and hence can be set to fall within the minute ranges as described above.

In this state, a molten resin is injected from a gate 35 into the cavity 34. As a main component resin of the molten resin, it is preferred to use resins excellent in shrinkage rate (1% or more). For example, it is possible to use polyacetal (POM), polyphenylene sulfide (PPS), polyamide (PA), or liquid crystal polymer (LCP). Of those, polyacetal, which is particularly excellent in shrinkage rate, is optimum. Such a main component resin, which is mixed with various fillers such as a reinforcing material and a conducting material as necessary, is used as the molten resin. When types and formulation amounts of the fillers to be mixed with the molten resin are appropriately set, at the time of injection of the molten resin into the cavity 34, the molten resin is less liable to intrude into the radial gap between the inner member 10 and the core metal M.

When the die set is opened after the molten resin is filled into the cavity 34 and cured therein, there is obtained a single product of the inner member 10 and the outer member 20 adhering to the inner member 10. Then, this single product is released from the fixed die 31 and the core pin 33.

Figure 40:
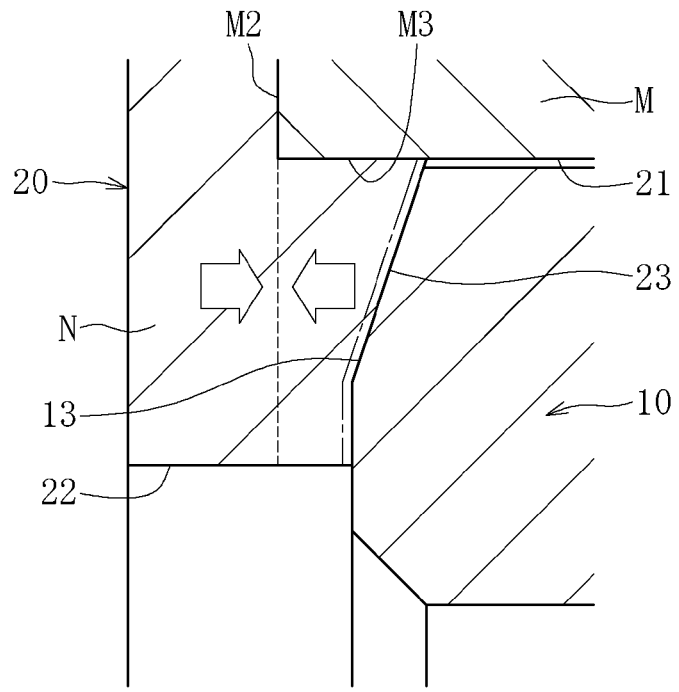
[FIG. 40] A sectional view illustrating how a resin molded portion of the outer member undergoes molding shrinkage.

In the above-mentioned single product, the resin molded portion N of the outer member 20 undergoes molding shrinkage. Generally, molding shrinkage of a resin molded product occurs toward a central portion in a thickness direction. When the resin molded portion N illustrated in FIG. 35 undergoes molding shrinkage to the axial center side, the shoulder surfaces 23 of the outer member 20 may be pressed against the end surfaces 13 of the inner member 10. As a countermeasure, in this embodiment, the core metal M is arranged as an insert component in the outer member 20. The core metal M is larger in axial dimension than at least parts of the inner member 10, which are arranged in the cavity 34, and is provided to protrude to both the axial sides of the inner member 10. This core metal M prevents the shrinkage of the resin molded portion N to the axial center side. That is, as illustrated in FIG. 40, molding shrinkage in the axial direction of the shoulder surface of the outer member 20 occurs with an axial position of corresponding one of both the axial end surfaces M2 of the core metal M (position indicated by a dotted line) as a reference, and in this region, the resin of the resin molded portion N shrinks from both the axial sides toward the reference position (dotted line position). As a result, the shoulder surface 23 of the outer member 20, which has remained adhering to the end surface 13 of the inner member 10, shrinks in a direction of separating from the inner member 10, with the result of retracting to a position indicated by a chain line in FIG. 40. In this way, an axial gap is formed between the end surface 13 of the inner member and the shoulder surface 23 of the outer member 20, and this gap functions as the thrust bearing gap T. Note that, description is made of the molding shrinkage of one of the shoulder surfaces 23 with reference to FIG. 40. As a matter of course, another of the shoulder surfaces 23 similarly shrinks, and separates from the end surface 13 of the inner member 10.

The lubricating oil is injected into the gaps between the inner member 10 and the outer member 20 molded as described above, including the inner pores of the inner member 10 and the core metal M each made of a sintered metal. After that, heating is performed up to a maximum temperature expected in a use environment of the fluid dynamic bearing device 4. Then, apart of the lubricating oil, which has overflowed from the inner-diameter-side end portions of the thrust bearing gaps T due to thermal expansion at this time, is wiped off. After that, by cooling down to a normal temperature, the lubricating oil shrinks. As a result, the oil level is retracted to the bearing interior side (outer diameter side), and is maintained in the cylindrical portion of the thrust bearing gaps T (gap between the flat surfaces 13b and 23b). With this, the lubricating oil does not overflow from the thrust bearing gaps T due to thermal expansion within an expected temperature range. In this way, the fluid dynamic bearing device 4 is completed.

The present invention is not limited to the above-mentioned embodiment. In the following, description is made of other embodiments of the third invention of the present application. In the following description, parts having the same functions as those in the above-mentioned embodiment are denoted by the same reference symbols, and redundant description thereof is omitted.

Figure 41:
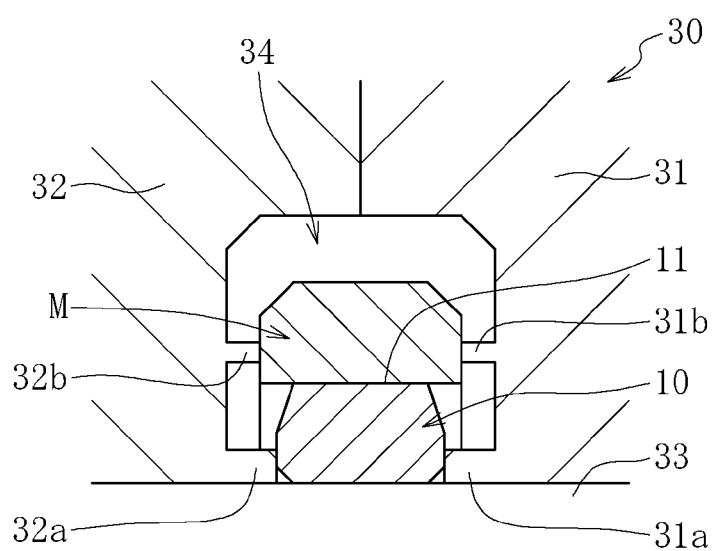
[FIG. 41] A sectional view of a die set for molding the outer member according to another embodiment of the third invention of the present application.

For example, in the die set 30 illustrated in FIG. 41, the fixed die 31 and the movable die 32 are respectively provided with projecting portions 31b and 32b to abut against an end surface of the core metal M arranged in the cavity 34 from both the axial sides. The projecting portions 31b and 32b are arranged, for example, at an equal interval at a plurality of points spaced apart from each other in the circumferential direction. The projecting portions 31b and 32b enable the core metal M to be reliably positioned in the axial direction in the cavity 34. In this case, through both the axial end surfaces of the outer member 20 after molding, axial holes are formed by the projecting portions 31b and 32b to extend from the end surface of the outer member 20 to the core metal M (not shown). After the inner member 10 and the outer member 20 are taken out from the die set 30, the axial holes are closed by an adhesive, a resin, or the like.

Figure 42:
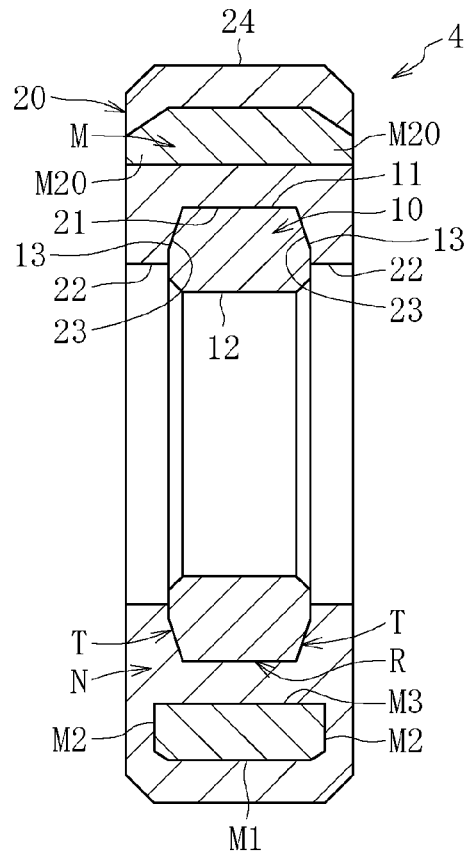
[FIG. 42] A sectional view of a fluid dynamic bearing device according to still another embodiment of the third invention of the present application.

Further, in a case described in the above-mentioned embodiment, the large-diameter inner peripheral surface 21 of the outer member 20 is formed of the inner peripheral surface M3 of the core metal M, and the radial bearing gap R is formed between the core metal M and the inner member 10. However, the present invention is not limited thereto. For example, as illustrated in FIG. 42, the large-diameter inner peripheral surface 21 of the outer member 20 may be formed of the resin molded portion N. In the illustration, the outer peripheral surface 11 of the inner member 10 and the core metal M are spaced apart from each other in the radial direction, and the resin molded portion N is provided in this radial gap. When the inner member 10 is rotated, the radial bearing gap R is formed between the large-diameter inner peripheral surface 21 formed of the resin molded portion N of the outer member 20 and the outer peripheral surface 11 of the inner member 10. The thrust bearing gaps T are formed between the pair of shoulder surfaces 23 and 23 formed of the resin molded portion N of the outer member 20 and both the axial end surfaces 13 and 13 of the inner member 10.

Figure 43:
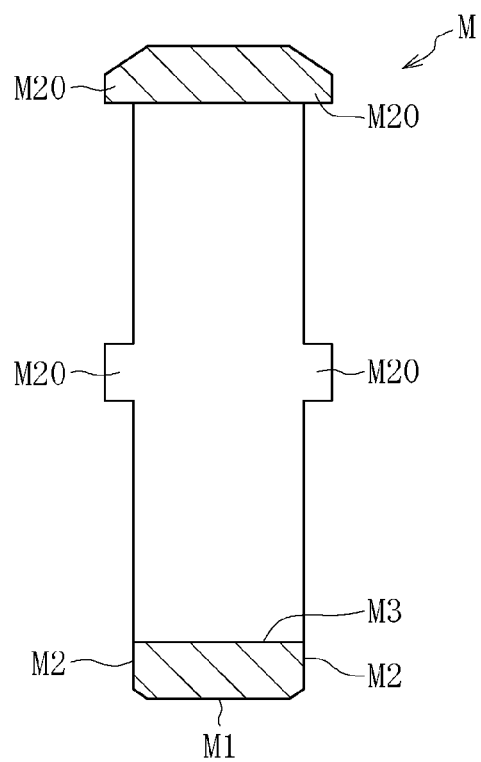
[FIG. 43] A sectional view of a core metal of the fluid dynamic bearing device of FIG. 42.
Figure 44:
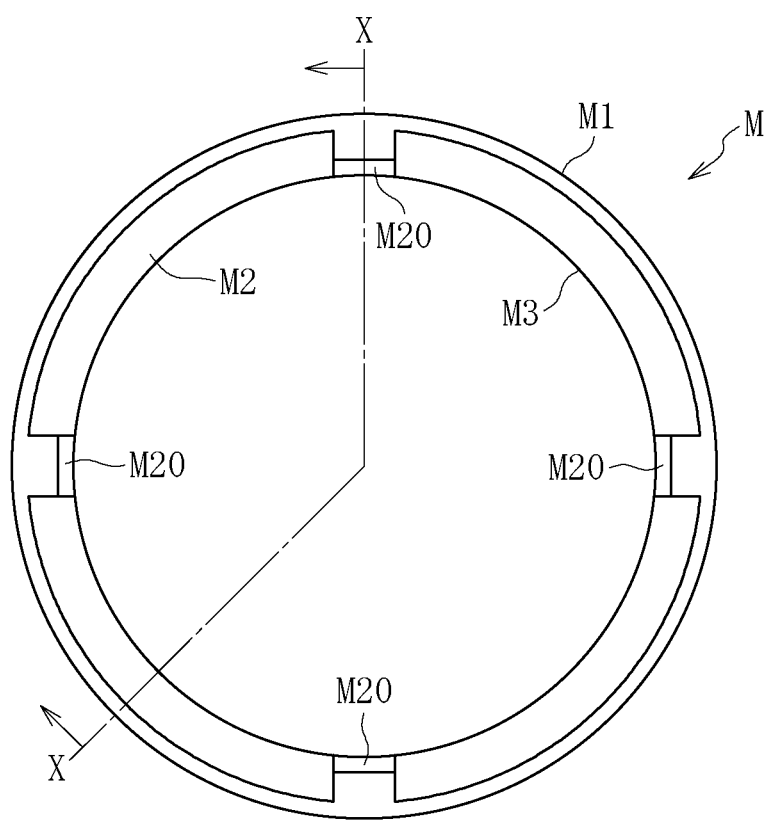
[FIG. 44] A plan view of the core metal of FIG. 43.

The core metal M in this embodiment has a ring shape as illustrated in FIGS. 43 and 44, and comprises projecting portions M20 projecting from end surfaces on both sides in the axial direction. In this embodiment, the projecting portions M20 are provided at an equal interval at a plurality of points spaced apart from each together in the circumferential direction (for example, at four points, refer to FIG. 44). Both the axial end surfaces of each of the projecting portions M20 are exposed to be flush with both the axial end surfaces of the outer member 20 (refer to FIG. 42).

FIG. 45 illustrates a state in which the core metal M illustrated in FIGS. 43 and 44 is arranged in the cavity 34 of the die set 30. At this time, the projecting portions M20 and M20 projecting from both the axial end surfaces M2 and M2 of the core metal M are sandwiched by the fixed die 31 and the movable die 32 from both the axial sides. In this way, the core metal M is positioned in the cavity 34. In this state, a molten resin is injected from the gate 35 so that the molten resin is filled in the cavity 34.

After that, as a result of molding shrinkage in the radial direction of the resin molded portion N, the resin molded portion N separates from the inner member 10. Specifically, the molding shrinkage of the resin molded portion N occurs in the radial direction with the core metal M as a reference, and the large-diameter inner peripheral surface 21 of the outer member 20, which is formed of the resin molded portion N, is retracted to a side on which the large-diameter inner peripheral surface 21 comes close to the core metal M, that is, to the outer diameter side. As a result, the large-diameter inner peripheral surface 21 separates from the outer peripheral surface 11 of the inner member 10. Further, molding shrinkage of the resin molded portion N occurs in the axial direction with both the axial end surfaces M2 and M2 of the core metal M as references. As a result, the shoulder surfaces 23 and 23 of the outer member 20, which are formed of the resin molded portion N, separate from both the axial end surfaces 13 and 13 of the inner member 10. In this way, the resin molded portion N of the outer member 20 separates from the inner member 10, and gaps formed by the separating function as the radial bearing gap R and the thrust bearing gaps T.

Figure 46:
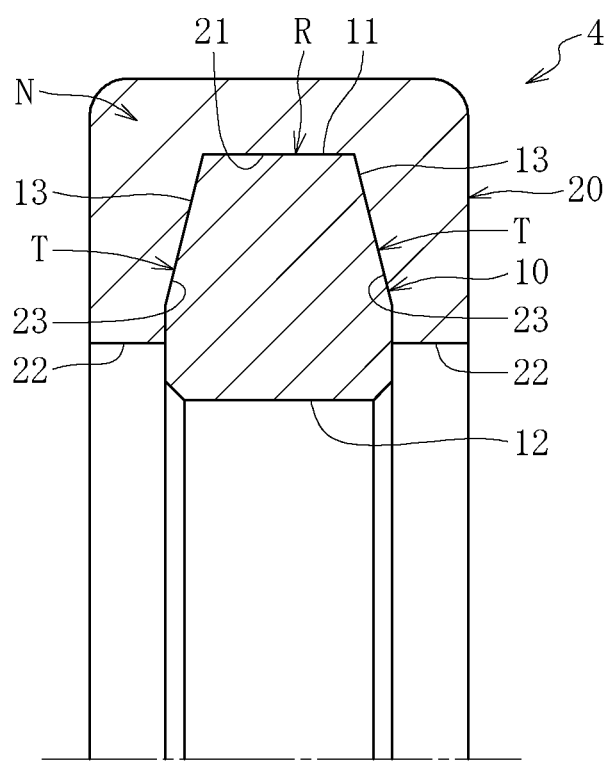
[FIG. 46] A sectional view of a fluid dynamic bearing device according to yet another embodiment of the third invention of the present application.

Further, in a case illustrated in the above-mentioned embodiment, the outer member 20 comprises the core metal M. However, the present invention is not limited thereto. For example, as illustrated in FIG. 46, the outer member 20 may be formed only of the resin molded portion N. In this case, the outer member 20 is formed by injection molding of a resin with use of the inner member 10 as an insert component. After the injection molding, molding shrinkage of the resin molded portion N causes the large-diameter inner peripheral surface 21 and end surfaces 23 and 23 of the outer member 20 to separate from the inner member 10. At this time, even when the outer member 20 is not provided with the core metal M, it is necessary to form the resin molded portion N with such a material that the large-diameter inner peripheral surface 21 and the end surfaces 23 and 23 of the outer member 20 undergo molding shrinkage in a direction of separating from the inner member 10. For example, when the resin molded portion is made of a resin containing liquid crystal polymer (LCP) as a main component, the molding shrinkage as described above can be caused.

In the above-mentioned embodiment, the end surfaces 13 of the inner member 10 and the shoulder surfaces 23 of the outer member 20, which face the thrust bearing gaps T, are each formed of an even and smooth surface. However, the present invention not limited thereto. For example, any one of the surfaces facing each other across the thrust bearing gaps T may be provided with a thrust dynamic pressure generating portion (not shown) for actively generating a dynamic pressure action in the lubricating oil in the thrust bearing gaps T. The thrust dynamic pressure generating portion may be formed of dynamic pressure generating grooves, for example, in a herringbone pattern, a spiral pattern, or a stepped pattern. In particular, when the thrust dynamic pressure generating portion is formed of dynamic pressure generating grooves of a pump-out type, which push the lubricating oil in the thrust bearing gaps T into the outer diameter side (radial bearing gap R side), the lubricating oil can be drawn into the radial bearing gap R side. As a result, oil leakage is more reliably prevented. When the thrust dynamic pressure generating portion is provided to the inner member 10 made of a sintered metal, simultaneously with sizing of the inner member 10, the thrust dynamic pressure generating portion can be formed by molding. Meanwhile, when the thrust dynamic pressure generating portion is provided to the resin molded portion N of the outer member 20, simultaneously with injection molding of the outer member 20, the thrust dynamic pressure generating portion can be formed by molding.

Further, in a case illustrated in the above-mentioned embodiment, the radial dynamic pressure generating portion (dynamic pressure generating grooves Ba and hill portions Bb) is formed on the outer peripheral surface 11 of the inner member 10. However, the present invention is not limited thereto. For example, the outer peripheral surface 11 of the inner member 10 may formed into a shape of a cylindrical surface, and the radial dynamic pressure generating portion may be formed on the large-diameter inner peripheral surface 21 of the outer member 20, which faces the outer peripheral surface in the radial direction. Alternatively, what is called a cylindrical bearing may be formed by forming each of the outer peripheral surface 11 of the inner member 10 and the large-diameter inner peripheral surface 21 of the outer member 20, which face each other across the radial bearing gap R, into a shape of a cylindrical surface. In this case, none of the outer peripheral surface 11 and the large-diameter inner peripheral surface 21 is provided with the radial dynamic pressure generating portion. However, in accordance with rotation of the inner member 10, the lubricating oil in the radial bearing gap R is fluidized, and hence a dynamic pressure action is generated.

The structures described in the above-mentioned embodiments of the first to third inventions of the present application can be combined appropriately with each other.

REFERENCE SIGNS LIST 1 bearing unit
2 rotary shaft
3 motor rotor
4 fluid dynamic bearing device
10 inner member
10a projecting portion
10b sleeve portion
11a dynamic pressure generating groove
11R radial bearing surface
12a dynamic pressure generating groove
12T thrust bearing surface
13a dynamic pressure generating groove
13T thrust bearing surface
20 outer member
20a outside outer member
20b inside outer member
21a projection portion
22a dynamic pressure generating groove
22T thrust bearing surface
23a dynamic pressure generating groove
23T thrust bearing surface
27a projection portion
29R radial bearing surface
40 nozzle
44 identification groove
A outer diameter dimension
B outer diameter dimension
F fixing jig
G moving jig
H axial line
R radial bearing gap
T thrust bearing gap

The invention claimed is:
1. A fluid dynamic bearing device, comprising:
an outer member having a radial bearing surface and thrust bearing surfaces respectively formed on both axial sides of the radial bearing surface; and an inner member arranged on an inner diameter side with respect to the outer member and having a radial bearing surface and thrust bearing surfaces respectively facing the radial bearing surface of the outer member and the thrust bearing surfaces of the outer member, the inner member is supported in a freely rotatable manner with respect to the outer member, the radial bearing surface of the outer member and the radial bearing surface of the inner member forming a radial bearing gap therebetween, one of the thrust bearing surfaces of the outer member and one of the thrust bearing surfaces of the inner member forming one thrust bearing gap therebetween, another of the thrust bearing surfaces of the outer member and another of the thrust bearing surfaces of the inner member forming another thrust bearing gap therebetween, the radial bearing gap and the thrust bearing gaps having a lubricating oil interposed therein, wherein the outer member comprises a member formed by a pressing process on a plate member, the radial bearing surface and at least the one of the thrust bearing surfaces of the outer member being formed by the pressing process, and wherein at least a part of the inner member, which forms the radial bearing surface and the thrust bearing surfaces of the inner member, is made of a sintered metal, wherein the outer member comprises a first outer portion and a second outer portion, wherein each of the first outer portion and the second outer portion is composed of the plate member having a substantially L-shape in vertical cross-section and each comprises a cylindrical portion and a radial portion provided at one end of the cylindrical portion, wherein an axial length of the cylindrical portion of the first outer portion is substantially the same as an axial length of the cylindrical portion of the second outer portion, wherein the one of the thrust bearing surfaces is formed on an inside surface of the radial portion of the first outer portion, wherein the radial bearing surface is formed on an inner peripheral surface of the cylindrical portion of the second outer portion, wherein the another of the thrust bearing surfaces is formed on an inside surface of the radial portion of the second outer portion, and wherein an outer peripheral surface of the cylindrical portion of the second outer portion is fitted and fixed to an inner peripheral surface of the cylindrical portion of the first outer portion.

2. The fluid dynamic bearing device according to claim 1, wherein each of the radial bearing surface of the inner member and the thrust bearing surfaces of the outer member has dynamic pressure generating grooves formed therein.

3. The fluid dynamic bearing device according to claim 1, wherein each of the radial bearing surface of the inner member and the thrust bearing surfaces of the inner member has dynamic pressure generating grooves formed therein, and wherein the radial bearing surface of the outer member and the thrust bearing surfaces of the outer member are formed of an even and smooth surface.

4. The fluid dynamic bearing device according to claim 1, wherein the first outer portion and the second outer portion respectively have surfaces different from each other in hue for identification of a rotational direction.

5. The fluid dynamic bearing device according to claim 1, wherein the inner peripheral surface of the cylindrical portion of the first outer portion and the outer peripheral surface of the cylindrical portion of the second outer portion are fixed to each other by adhesion, and wherein another end of the cylindrical portion of the first outer portion is positioned to be near side to the radial portion of the first outer portion in an axial direction than an outside surface of the radial portion of the second outer portion.

6. The fluid dynamic bearing device according to claim 1, further comprising a projection portion which projects toward an inner peripheral side from the inner peripheral surface of the cylindrical portion of the first outer portion, and the projection portion is press-fitted to the outer peripheral surface of the cylindrical portion of the second outer portion.

7. The fluid dynamic bearing device according to claim 1, wherein the inner member is formed as a single member.

8. The fluid dynamic bearing device according to claim 1, further comprising a shaft fixed to the inner member, wherein the inner member comprises a projecting portion having the radial bearing surface and the thrust bearing surfaces and a sleeve portion fixed to the shaft, the projecting portion and the sleeve portion being respectively formed as separate members, the projecting portion being made of the sintered metal.

9. The fluid dynamic bearing device according to claim 7 or 8, wherein the sintered metal of the part of the inner member, which forms the radial bearing surface and the thrust bearing surfaces, comprises a copper-iron based metal, and wherein a formulation ratio of the copper ranges from 20% to 80%.

10. A fluid dynamic bearing device according to claim 1, wherein, in the sintered metal of the part of the inner member, which forms the radial bearing surface and the thrust bearing surfaces, a surface pore rate of at least the radial bearing surface ranges from 2% to 20%.

11. An exhaust fan motor, comprising:
a plurality of the fluid dynamic bearing devices according to claim 1, arranged apart from each other in an axial direction; and
a motor rotor arranged between the fluid dynamic bearing devices.

12. The fluid dynamic bearing device according to claim 1, further comprises a projection portion which projects toward outer peripheral side from the outer peripheral surface of the cylindrical portion of the second outer portion, and the projection portion is press-fitted to the inner peripheral surface of the cylindrical portion of the first outer portion.

13. A fluid dynamic bearing device, comprising:
an outer member having a radial bearing surface and thrust bearing surfaces respectively formed on both axial sides of the radial bearing surface; and
an inner member arranged on an inner diameter side with respect to the outer member and having a radial bearing surface and thrust bearing surfaces respectively facing the radial bearing surface of the outer member and the thrust bearing surfaces of the outer member, the inner member is supported in a freely rotatable manner with respect to the outer member, the radial bearing surface of the outer member and the radial bearing surface of the inner member forming a radial bearing gap therebetween, one of the thrust bearing surfaces of the outer member and one of the thrust bearing surfaces of the inner member forming one thrust bearing gap therebetween, another of the thrust bearing surfaces of the outer member and another of the thrust bearing surfaces of the inner member forming another thrust bearing gap therebetween, the radial bearing gap and the thrust bearing gaps having a lubricating oil interposed therein, wherein the outer member comprises a first outer portion and a second outer portion, wherein each of the first outer portion and the second outer portion is composed of a plate member having substantially L-shape in vertical cross-section and each comprises a cylindrical portion and a radial portion provided at one end of the cylindrical portion, wherein an axial length of the cylindrical portion of the first outer portion is substantially the same as an axial length of the cylindrical portion of the second outer portion, wherein the one of the thrust bearing surfaces is formed on an inside surface of the radial portion of the first outer portion, wherein the radial bearing surface is formed on an inner peripheral surface of the cylindrical portion of the second outer portion, wherein the another of the thrust bearing surfaces is formed on an inside surface of the radial portion of the second outer portion, and wherein an outer peripheral surface of the cylindrical portion of the second outer portion is fitted and fixed to an inner peripheral surface of the cylindrical portion of the first outer portion.

* * * * *